(12) United States Patent
Guard et al.

(10) Patent No.: US 11,382,383 B2
(45) Date of Patent: Jul. 12, 2022

(54) SMART FOOTWEAR WITH WIRELESS CHARGING

(71) Applicant: Brilliant Sole, Inc., Wilmington, NC (US)

(72) Inventors: Jeffrey William Guard, Wilmington, NC (US); Michael Jon Bower, Wilmington, NC (US); William Fleming, Wilmington, NC (US); Andrew Keener, Mooresville, NC (US)

(73) Assignee: BRILLIANT SOLE, INC., Wilmington, NC (US)

( * ) Notice: Subject to any disclaimer, the term of this patent is extended or adjusted under 35 U.S.C. 154(b) by 134 days.

(21) Appl. No.: 16/731,998

(22) Filed: Dec. 31, 2019

(65) Prior Publication Data

US 2020/0253320 A1 Aug. 13, 2020

Related U.S. Application Data

(60) Provisional application No. 62/947,315, filed on Dec. 12, 2019, provisional application No. 62/803,673, filed on Feb. 11, 2019.

(51) Int. Cl.
| | |
|---|---|
| *G06F 1/16* | (2006.01) |
| *A63F 13/212* | (2014.01) |
| *A63F 13/211* | (2014.01) |
| *A43B 3/34* | (2022.01) |
| *G06F 3/01* | (2006.01) |
| *G06F 3/033* | (2013.01) |
| *G06F 3/0487* | (2013.01) |

(52) U.S. Cl.
CPC ............... *A43B 3/34* (2022.01); *G06F 1/163* (2013.01); *G06F 3/011* (2013.01); *G06F 3/0334* (2013.01); *G06F 3/0487* (2013.01); *A63F 13/211* (2014.09); *A63F 13/212* (2014.09)

(58) Field of Classification Search
CPC ....... A43B 3/0005; G06F 1/163; G06F 3/011; G06F 3/0334; G06F 3/0487
USPC .......................................................... 463/39
See application file for complete search history.

(56) References Cited

U.S. PATENT DOCUMENTS

| | | | |
|---|---|---|---|
| 5,864,333 A | 1/1999 | O'Heir | |
| 6,646,643 B2 | 11/2003 | Templeman | |
| 6,978,684 B2 * | 12/2005 | Nurse | A61H 3/00 73/862.041 |
| 7,454,309 B2 | 11/2008 | Lawrence et al. | |
| 7,924,152 B1 | 4/2011 | Daniel | |
| 7,927,253 B2 | 4/2011 | Vincent et al. | |
| 8,868,373 B2 | 10/2014 | Eng et al. | |
| 8,956,228 B2 | 2/2015 | Shum et al. | |
| 9,002,680 B2 | 4/2015 | Nurse et al. | |
| 9,267,793 B2 | 2/2016 | Vock et al. | |
| 9,625,485 B2 | 4/2017 | Oleson et al. | |
| 9,795,884 B2 | 10/2017 | Short et al. | |
| 10,238,959 B2 | 3/2019 | Shum et al. | |
| 10,292,453 B2 | 5/2019 | Bertagna et al. | |
| 10,314,361 B2 | 6/2019 | Amos et al. | |

(Continued)

*Primary Examiner* — Albert K Wong
(74) *Attorney, Agent, or Firm* — Neo IP

(57) ABSTRACT

A smart footwear system including a wireless charging system directed to measuring and capturing pressure data exerted on a shoe footwear item. The smart footwear system is operable to be used with virtual reality systems and provide controlled movements for an avatar in a virtual environment based on a user's movements.

20 Claims, 54 Drawing Sheets

(56) References Cited

U.S. PATENT DOCUMENTS

| | | |
|---|---|---|
| 10,315,115 B2 | 6/2019 | Pawlowski et al. |
| 10,350,138 B2 | 7/2019 | Eim et al. |
| 10,353,489 B2 | 7/2019 | Hiroi et al. |
| 10,369,474 B2 | 8/2019 | Walling |
| 10,416,756 B2 | 9/2019 | Perlin et al. |
| 2007/0260421 A1* | 11/2007 | Berner .................. A43B 13/00 702/160 |
| 2008/0318679 A1 | 12/2008 | Tran et al. |
| 2010/0035688 A1 | 2/2010 | Picunko |
| 2011/0275956 A1 | 11/2011 | Son et al. |
| 2011/0285853 A1 | 11/2011 | Chu |
| 2012/0186101 A1 | 7/2012 | Sanchez |
| 2014/0031123 A1 | 1/2014 | Sarrafzadeh et al. |
| 2014/0130381 A1 | 5/2014 | Jung |
| 2014/0135591 A1 | 5/2014 | Jung |
| 2015/0226619 A1 | 8/2015 | Rice et al. |
| 2015/0321086 A1 | 11/2015 | Gracia |
| 2017/0070078 A1* | 3/2017 | Hwang .................. H02J 7/045 |
| 2017/0188950 A1 | 7/2017 | Gazdag et al. |
| 2017/0262049 A1 | 9/2017 | Kim |
| 2017/0336870 A1 | 11/2017 | Everett et al. |
| 2018/0046215 A1 | 2/2018 | Gosieski et al. |
| 2018/0224929 A1 | 8/2018 | Mullen |
| 2018/0236352 A1 | 8/2018 | El-Sheimy et al. |
| 2018/0326286 A1 | 11/2018 | Rathi et al. |
| 2019/0204909 A1 | 7/2019 | Xiao |
| 2019/0261725 A1 | 8/2019 | Beers et al. |
| 2019/0339791 A1 | 11/2019 | Alanajadah et al. |
| 2020/0020165 A1* | 1/2020 | Tran ...................... G06N 20/10 |
| 2020/0229736 A1* | 7/2020 | Saporito .............. G06K 9/6265 |

* cited by examiner

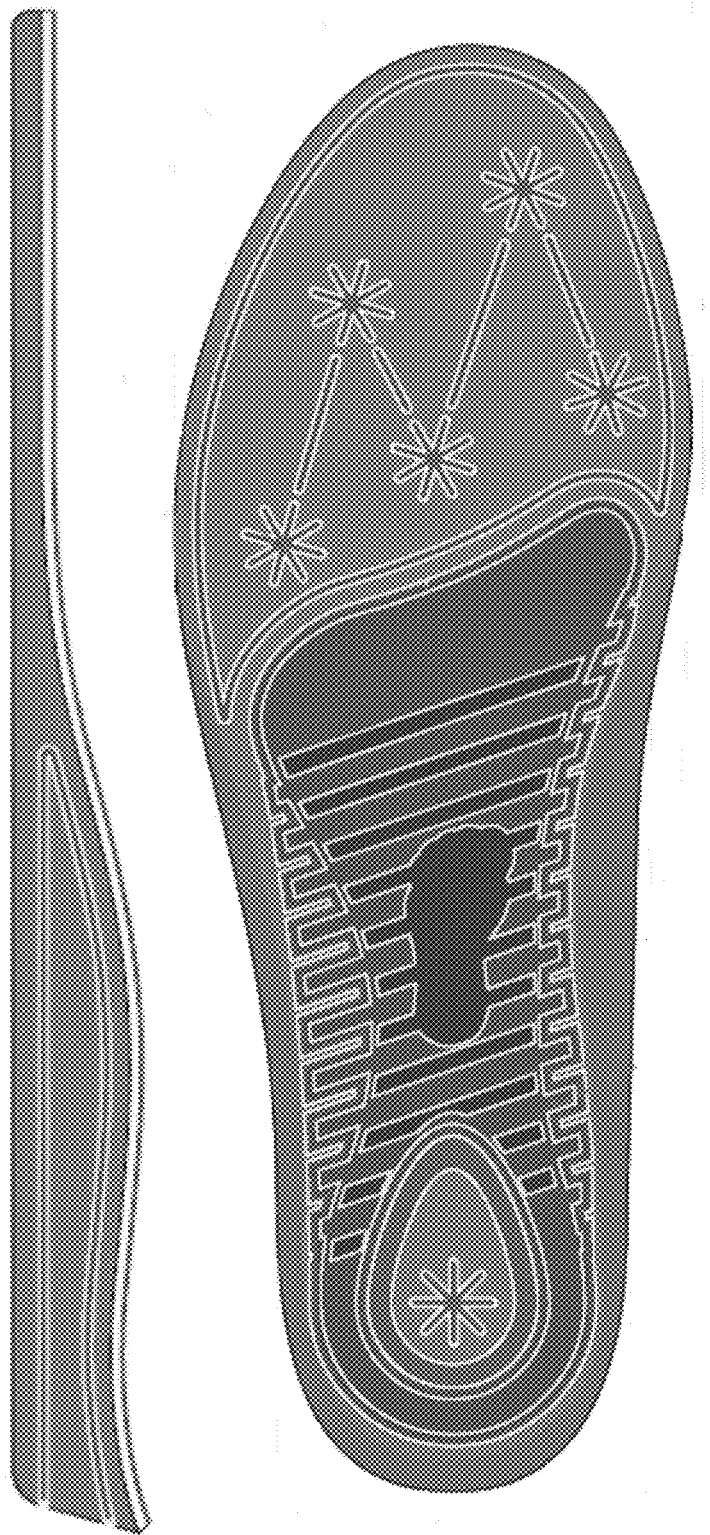
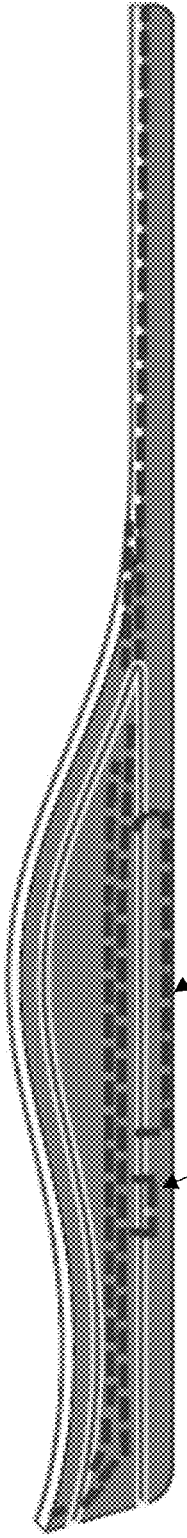
FIG. 14A  FIG. 14B  FIG. 14C

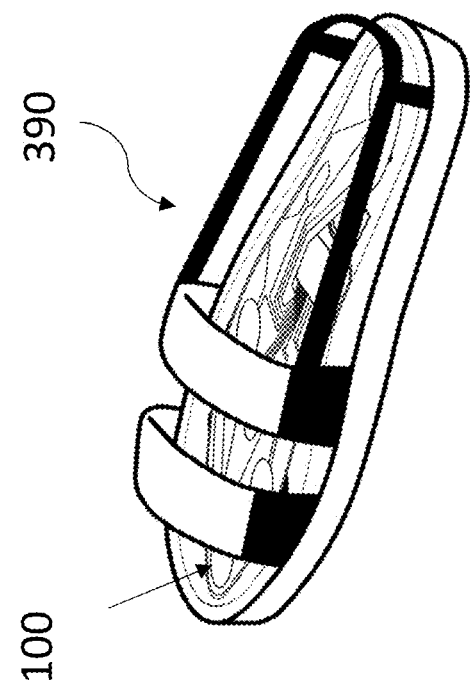
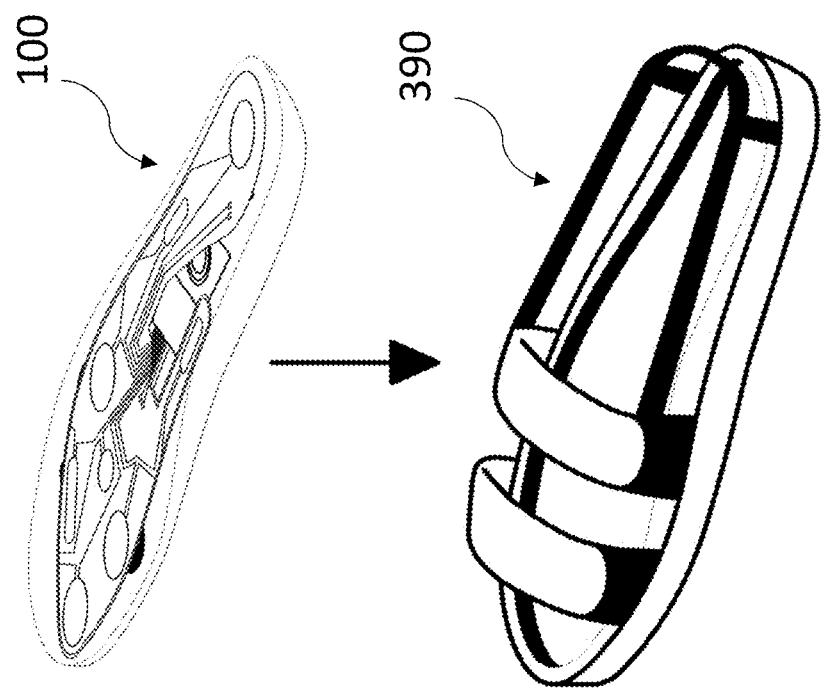
FIG. 23B
FIG. 23A

SMART FOOTWEAR WITH WIRELESS CHARGING

CROSS REFERENCES TO RELATED APPLICATIONS

This application is related to and claims priority from the following US patents and patent applications: U.S. Provisional Patent Application No. 62/803,673, filed Feb. 11, 2019, and U.S. Provisional Patent Application No. 62/947,315, filed Dec. 12, 2019, each of which is incorporated herein by reference in its entirety.

BACKGROUND OF THE INVENTION

1. Field of the Invention

The present invention relates to smart footwear and more specifically to smart footwear for controlling an avatar in a virtual environment.

2. Description of the Prior Art

It is generally known in the prior art to provide a shoe with pressure sensors.

Prior art patent documents include the following:

U.S. Patent Publication No. 2019/0261725 for article of footwear and a charging system for an article of footwear by inventor Beers et al., filed Feb. 27, 2019 and published Aug. 29, 2019, is directed to a charging system including provisions for providing power to various systems or components associated with the article of footwear. A charging system may include a charging device dimensioned to be used with one or more articles of footwear, where the articles of footwear can include different sizes. In some cases, the charging system can be used to facilitate the transfer of power to components in a motorized tensioning system.

US Patent Publication No. 2014/0130381 for footwear able to be wirelessly charged and wireless charging device used for the same by inventor Jung, filed Nov. 7, 2013 and published May 15, 2014, is directed to a footwear able to be wirelessly charged, the footwear including: an insole; an outer cover installed on the insole and having a wear space formed therein; a heel attached to a lower surface of the insole; an ion generator installed in the wear space to create an ionization effect; a battery supplying a power to the ion generator; a secondary coil receiving a wireless power signal from an external wireless charging device; a rectifying module configured to rectify an induced electromotive force generated from the secondary coil; and a controller configured to charge the battery by receiving a power from the rectifying module, and to control an operation of the ion generator, and a wireless charging device used for the same.

US Patent Publication No. 2014/0135591 for footwear capable of being wirelessly charged and transmitting biological information, method of managing health in wireless communication system including the footwear, and wireless communication system to which the method is applied, filed Nov. 7, 2013 and published May 15, 2014, is directed to a method for managing health in a wireless communication system including a footwear using a wireless charging technology, the method including obtaining a biological information of a user from a biological information detecting sensor of the footwear using a power obtained through a wireless power receiving device installed therein, and transmitting the biological information to an external electronic device via a communication module; a footwear able to be wirelessly charged and to transmit a biological information; and a wireless communication system which performs the method.

U.S. Pat. No. 10,350,138 for mobile terminal, wireless charger and wearable device by inventor Eim et al., filed Aug. 14, 2015 and granted Jul. 16, 2019, is directed to a wearable mobile terminal that includes a base provided in an insole of a shoe, a pressure sensing unit provided in the base to sense a pressure selectively applied when a user walks, an acupressure unit provided to apply an acupressure to the user's foot, when the pressure is applied to the pressure sensing unit; and a wireless communication unit synchronized with an external mobile terminal.

U.S. Pat. No. 10,292,453 for system and method for embedding a tracking device in a footwear insole by inventor Bertagna et al., filed Dec. 29, 2017 and issued May 21, 2019, is directed to a novel tracking system. In one embodiment, a long-range tracking device is incorporated into a removable footwear insole and a short-range tracking device is incorporated into another removable footwear insole. The long-range tracking device includes a location determining device, a wireless communication device, and a power source. In a more particular embodiment, the location determining device is a GPS receiver, and the communication device is a cellular modem.

US Patent Publication No. 2012/0186101 for vibrating insole with Bluetooth wireless, rechargeable battery, and vibrate motors integrated by inventor Sanchez, filed Jan. 21, 2011 and published Jul. 26, 2012, is directed to vibrating insoles with Bluetooth wireless components, vibrate motors, and built in rechargeable battery all integrated in the insole. Slip on insoles that vibrate the feet and are remotely activated via Bluetooth wireless cell phone application. The vibrate motors oscillate and uses vibration to massage the feet. A remote control application from a cell phone uses Bluetooth wireless technology to power on the vibrating motors of the insoles. Vibrate motors get electricity from rechargeable battery that is inside the insoles. Bluetooth wireless activates the vibrate motors and insoles continues vibrating to massage and relax the feet while wearing shoes. Vibrating insole can be used with any shoe allowing user with Bluetooth wireless cell phone to remote control the massaging motion of the vibrating insoles to massage the feet anywhere on the go. Vibrating insole can be slipped into any shoe allow users to remote activate via Bluetooth wireless or wireless radio frequency that powers on the vibrating motors to massages the feet while walking. Portable cordless shoe insole that vibrates and massage the feet inside the shoe.

U.S. Pat. No. 8,868,373 for adjustable virtual reality system by inventor Eng et al., filed Aug. 19, 2009 and issued Oct. 21, 2014, is directed to virtual reality systems, in particular immersive virtual reality systems, their parts, construction and use. The systems and/or parts thereof may be used by adults or children, and may be adapted to support, often within a single device, a large range of users of different sizes and medical condition. Users with physical disabilities have difficulties using existing immersive technologies such as those using accessories like head-mounted displays and data gloves. Such users are provided with immersive virtual reality outputs that allow them to see virtual representations of their body parts which appear in a correct spatial position relative to the users' viewpoint.

US Patent Publication No. 2019/0204909 for apparatus and method of for natural, anti-motion-sickness interaction towards synchronized visual vestibular proprioception interaction including navigation (movement control) as well as target selection in immersive environments such as VR/AR/ simulation/game, and modular multi-use sensing/processing system to satisfy different usage scenarios with different form of combination by inventor Xiao, filed Dec. 28, 2017 and published Jul. 4, 2019, is directed to a method and apparatus to provide realistic and anti-motion-sickness of movement/navigation simulation in VR. More specifically about using an innovated "user-intentional head/body motion/acc initiating/surge movement" detection method/ apparatus to determine user's intention of movement (such as acceleration aptitude and speed) from user's self-motion and mapping to self-motion in the virtual worlds, with optional haptics/tactile feedback to enable "same spot" (single step range) navigation/movement in simulated environment that towards significantly reduced or eliminated motion sickness caused by the "artificial acceleration/deceleration (including rotation)" in virtual environment (that does not match 100% in real life). This could (optionally) with multi-use modular sensing/processing system to satisfy different usage scenarios requiring different ways of interaction with different form of combination of hardware.

US Patent Publication No. 2018/0326286 for augmented and/or virtual reality footwear by inventor Rathi et al., filed May 9, 2018 and published Nov. 15, 2018, is directed to a physical position of motorized footwear in a physical environment may be tracked, and movement of the footwear may be translated into corresponding movement in a virtual environment. When a distance between the motorized footwear and a boundary of an operational zone defined in the physical environment is less than or equal to a threshold distance, a motor of the motorized shoe may be actuated. Actuation of the motor may in turn actuate a locomotion device of the motorized footwear, to move the motorized footwear back into a return zone defined within the operational zone. This may allow the user to walk, seemingly endlessly in the virtual environment, while remaining within a defined physical space in the physical environment.

US Patent Publication No. 2015/0321086 for device for children's footwear including wireless sensor and control for games and applications by inventor Gracia, filed Mar. 11, 2015 and published Nov. 12, 2015, is directed to a wireless sensor and control for games and applications to be applied to children's footwear, including a microchip, a 20/32 battery, a PVC protective capsule, a cover, screws and orifices for the shoestring, to be used as a wireless sensor and control for games and applications to be applied to children footwear and clothes.

US Publication No. 2010/0035688 for electronic game that detects and incorporates a user's foot movement by inventor Picunko, filed Nov. 9, 2007 and published Feb. 11, 2010, is directed to an electronic video system incorporating the foot movements of a user into a video program. The system includes a receiver and a computer processor. The receiver is configured to wirelessly receive signals transmitted from footwear worn by a user. The signals correspond to a series of foot movements of the user. The computer processor is operatively connected to the receiver and is configured to run the video program, which utilizes the signals received by the receiver as input data. The processor processes the input data to recognize the series of foot movements of the user, and outputs video signals simulating the series of foot movements.

U.S. Pat. No. 7,454,309 for foot activated user interface by inventor Lawrence et al., filed Jun. 21, 2005 and issued Nov. 18, 2008, is directed to a wearable computing apparatus including a processor; a device for presenting information from the processor to a user, and a device for providing user input to the processor in response to the information presented to the user. The device is adapted to be activated wholly or partly by a foot of the user.

US Patent Publication No. 2019/0339791 for foot controller computer input device by inventor Alanajadah et al., filed May 7, 2018 and published Nov. 7, 2019, is directed to a foot controller for use with a computer having a graphics display. The foot controller includes a foot platform to sense actions of a user's feet, the foot platform including left and right foot pads. Each foot pad includes a toe sensor, a heel sensor, a left-side sensor, and a right-side sensor. Sensor circuits provide a stream of time-based measurements from each foot pad sensor. The foot controller includes a controller circuit to receive signals from each sensor circuit. The foot controller also includes a communication interface to transmit signals from the controller circuit to application software. The foot controller can use standard commands, and can easily be programmed to interface with many types of application software. The foot controller enables the user to use his/her feet to control a computer having a graphics display, thereby providing an addition to, or an alternative to, hand-based interactions with the application software.

U.S. Pat. No. 5,864,333 for foot force actuated computer input apparatus and method by inventor O'Heir, filed Feb. 26, 1996 and issued Jan. 26, 1999, is directed to an apparatus and method for generating control signals for manipulating viewpoints and other objects of a computer generated virtual three dimensional space according to forces exerted by the feet of the user. The apparatus includes shoes, or pads, used beneath the user's feet containing sensors and circuitry for detecting force balances within and between the feet. Force balance signals are input to the computer system and used for generating program control data thereto. The control data are used as thrust and torque vectors for manipulating the location of the viewpoint, and orientation of the view within the virtual space. By intermixing the assignment of force balance signals to thrust or torque vectors various methods are derived for operating the apparatus to navigate the virtual space. The invention also functions as a man-machine interface for vehicular control and other machine control based on a user's exerted foot force or weight balance.

US Patent Publication No. 2008/0318679 for foot game controller with motion detection and/or position detection by inventor Tran et al., filed Jun. 21, 2007 and published Dec. 25, 2008, is directed to systems and methods are disclosed having a mesh network such as a ZigBee mesh network, a game controller coupled to the mesh network; and a display device coupled to the mesh network.

US Patent Publication No. 2017/0336870 for foot gesture-based device by inventor Everett et al., filed Oct. 23, 2015 and published Nov. 23, 2017, is directed to a hands-free, heads up and discrete system and method for controlling a peripheral device using foot gestures. The system includes a foot-based sensory device that includes one or more sensors, such as pressure sensors, gyroscopes, and accelerometers, that receive sensory information from a user's foot, interpret the information as being linked to specific commands, and transmit the commands to at least one display device for controlling the display device. The system also includes a feedback system for providing tactile, visual and/or auditory feedback to the user based on the actions performed, information provided by the display device and/or information provided from another user.

U.S. Pat. No. 9,002,680 for foot gestures for computer input and interface control by inventor Nurse et al., filed Mar. 18, 2011 and issued Apr. 7, 2015, is directed to non-video game computer user interfaces utilizing human foot action to generate input for controlling the interface (e.g., a graphical user interface). Computer systems that use such input may include: (a) at least one input system including one or more sensing devices for sensing action by one or more feet; (b) a data transmission system for transmitting the sensed foot action to (c) a processing system that utilizes the foot action input to provide control data input for a user interface; and (d) an output device for producing a non-video game computer output based, at least in part, on data provided by the processing system. The control data relating to the foot action is used, at least in part, for controlling a user interface associated with the computer output.

U.S. Pat. No. 10,353,489 for foot input device and head-mounted display device by inventor Hiroi et al., filed Apr. 7, 2017 and issued Jul. 16, 2019, is directed to a foot input device worn on a foot of a user and configured to output an operation signal used by an external apparatus including an operation section configured to detect a state of a sole of the foot of the user and output the operation signal corresponding to the detected state of the sole of the foot. The operation section detects, as the state of the sole of the foot, a load received from the sole of the foot of the user and outputs the operation signal corresponding to the detected load.

U.S. Pat. No. 10,416,756 for foot operated navigation and interaction for virtual reality experiences by inventor Perlin et al., filed Oct. 29, 2018 and issued Sep. 17, 2019, is directed to an apparatus for creating movement in a virtual reality for a user including a computer includes a virtual reality headset in communication with the computer that is worn on the head of the user so the user sees the virtual reality shown by the headset and produced by the computer in the headset. The apparatus includes a foot controller in communication with the computer against which the user moves at least one of his feet to create control signals with the foot to cause movement in the virtual reality. A method for creating movement in a virtual reality for a user having the steps of the user seeing the virtual reality shown by a virtual headset and produced by a computer in the headset, a virtual reality headset in communication with the computer that is worn on the head of the user. There is the step of the user moving at least one of his feet against a foot controller to create control signals with the foot to cause movement in the virtual reality by the computer, the foot controller in communication with the computer. A computer software program for creating movement in a virtual reality for a user.

U.S. Pat. No. 10,314,361 for footwear having sensor system by inventor Amos et al., filed Oct. 7, 2016 and issued Jun. 11, 2019, is directed to a shoe that has a sensor system operably connected to a communication port. Performance data is collected by the system and can be transferred for further use via the communication port. The shoe may contain an electronic module configured to gather data from the sensors. The module may also transmit the data to an external device for further processing. Users can use the collected data for a variety of different uses or applications.

US Patent Publication No. 2015/0226619 for footwear having sensor system/US by inventor Rice et al., filed Apr. 22, 2015 and published Aug. 13, 2015, is directed to a sensor system adapted for use with an article of footwear and includes an insert member including a first layer and a second layer, a port connected to the insert and configured for communication with an electronic module, a plurality of force and/or compression sensors on the insert member, and a plurality of leads connecting the sensors to the port.

U.S. Pat. No. 8,956,228 for game pod by inventor Shum et al., filed Feb. 10, 2005 and issued Feb. 17, 2015, is directed to a system for promoting physical activity for video game players. A video game player wears an article of footwear with a physical activity monitor or "game pod" mounted thereon while exercising or performing some other type of physical activity. The game pod measures the amount of the player's physical activity, and records that amount in a memory. When the player desires to play a video game according to the invention, the player disengages at least the memory from the article of footwear, and then engages the memory with the computer hosting the video game through a computer interface. The computer then obtains the recorded amount of physical activity, and provides a computer function associated with the recorded amount of physical activity. The computer function may include the initiation of the video game itself, the instantiation of a specified gaming environment within the video game, the instantiation of one or more specified characteristics for the player's avatar within the video game, a lengthened playing time for the user's avatar, allowing the player to access data associated with the video game, or a combination of two or more of these functions.

U.S. Pat. No. 10,315,115 for gaming environment reward system by inventor Pawlowski et al., filed Nov. 21, 2014 and issued Jun. 11, 2019, is directed to systems and methods to track users' progression through an activity simulation, which may resemble related sporting events. One or more performance levels with respect to one or more measurable parameters may be monitored during the same or different times. Physical activity may be monitored. Exceeding a first performance level may provide an option to join a sponsoring organization and exceeding a second threshold (for the same or different parameter of interest) may result in transmitting a redemption code to a contact point for an option to obtain a physical item. The physical item may mimic equipment used in a simulated activity.

US Patent Publication No. 2018/0224929 for home and portable augmented reality and virtual reality game consoles by inventor Mullen, filed Apr. 4, 2018 and published Aug. 9, 2018, is directed to systems and methods for portable or stationary virtual reality and augmented reality video game systems. A game system that is operable of providing visual information to numerous head mounted displays are provided. A game system that is operable to receive, and recharge, numerous rechargeable batteries is also provided.

US Patent Publication No. 2011/0275956 for intelligent orthotic insoles by inventor Son et al., filed Jul. 19, 2011 and published Nov. 10, 2011, is directed to an intelligent insole for generating time sensitive information about the pressure on the foot. The insole includes a custom-made, semi-custom or generically sized orthotic component. The orthotic is laminated with a top cover and an intermediate pressure sensor having an array of capacitive pressure sensors. Signal processing equipment may be embedded in the insole or placed locally with the insole as on the side of a shoe. The processor also can connect to a wireless transmitter for relaying the information to a remote site.

U.S. Pat. No. 9,795,884 for interactive gaming analysis systems and methods by investor Short et al., filed Jan. 11, 2016 and issued Oct. 24, 2017, is directed to an interactive gaming system. The system comprises at least one sensor that conveys information to the system about the physical, intellectual, mental, emotional, psychological or other type of ability of a user. The system uses the information to assess the existence and extent of a disability, and then implements a change to an aspect of the gaming environment, thus optimizing the gaming experience for the game player by accounting for the game player's disabilities.

U.S. Pat. No. 10,238,959 for interactive gaming apparel for interactive gaming by inventor Shum et al., filed Nov. 8, 2016 and issued Mar. 26, 2019, is directed to apparel that can be worn to assist an interactive game in tracking the movement of the wearer. More particularly, the apparel may include one or more tracking marks formed of designs, patterns, or reflective materials that can be easily tracked by an interactive game employing one or more cameras or other detectors for detecting a change in position of an object. The apparel may take the form of, for example, hats, shirts, jackets, pants, gloves, and shoes. The apparel may use reflective materials, and the interactive game can employ a camera and a light source configuration where the camera is located within the observation angle of a player employing retroreflective materials reflecting light from the light source.

U.S. Pat. No. 7,924,152 for interactive video gaming footwear including means for transmitting location information to a remote party by inventor Daniel, filed Feb. 1, 2007 and published Apr. 12, 2011, is directed to an article of footwear containing an integrated video gaming apparatus, a cellular phone, and a GPS receiver, whereby the footwear is able to encode and transmit its own location to a central monitoring station, along with a cell phone number (or other unique identifier) of a remote person. Using the encoded location information of the wearer of the footwear, and the encoded cell phone number of the remote person, the central monitoring station is able to look up the nearest street address corresponding to the location of the wearer and send an SMS text message with that address to the remote person. If the remote person is wearing the inventive footwear, the central monitoring station can send the remote person the street address of the wearer, or route information, with or without map data, for display on their video gaming device, such that they can "intercept" to meet up with one another.

US Patent Publication No. 2011/0285853 for movement detection system and movement sensing footwear by inventor Chu, filed May 18, 2011 and published Nov. 24, 2011 is directed to a movement detection system including: a movement sensing footwear operable for providing an infrared signal, and for generating and wirelessly transmitting a footwear motion signal that corresponds to acceleration of the movement sensing footwear; an image acquisition module for capturing images that contain the infrared signal; and a data processing device connected electrically to the image acquisition module for receiving the images captured by the image acquisition module, including a wireless receiver module for receiving the footwear motion signal transmitted by the wireless transmitter module, and configured to acquire information corresponding to acceleration of the movement sensing footwear based on the footwear motion signal, and to acquire information corresponding to position of the movement sensing footwear relative to the image acquisition module based on the images captured by the image acquisition module.

U.S. Pat. No. 9,267,793 for movement monitoring device for attachment to equipment by inventor Vock et al., filed Feb. 24, 2014 and issued Feb. 23, 2016, is directed to a movement monitoring device attaches to equipment and includes a housing and a transmitter. The housing includes an integrated circuit with (a) a detector sensitive to physical movement of the equipment when the housing is attached to the equipment and (b) a processor for processing data of the detector to determine an event experienced by the equipment. The transmitter communicatively couples with the integrated circuit for communicating the event to a remote receiver.

US Patent Publication No. 2017/0188950 for shoe insert for monitoring of biomechanics and motion by inventor Gazdag et al., filed Dec. 29, 2016 and published Jul. 6, 2017, is directed to systems and methods for a self-contained shoe insole device to monitor biomechanics and motion. The systems and methods allow monitoring for orthopedic diagnostics, fitness tracking, and social/gaming activities using a shoe insole device with multiple sensor locations for pressure, acceleration, rotation rate, all forms of inertial data in three axes, position/location, heart rate, and other physical attributes. The shoe insole device can include a plurality of layers, with one layer containing a plurality of sensors, and an electronics component for collecting, reading, storing and transmitting the sensor data. The shoe insole device can wirelessly connect with external computing devices for monitoring and feedback directly to the user or a health care or fitness training professional, or across multiple users in a social or gaming situation. The system can further be provided for monitoring and tracking physical activity and enable a variety of interactions based upon the collected data.

U.S. Pat. No. 7,927,253 for sports electronic training system with electronic gaming features, and applications thereof by inventor Vincent et al., filed Apr. 1, 2009 and issued Apr. 19, 2011, is directed to a sports electronic training system with electronic gaming features, and applications thereof. The system comprises at least one monitor and a portable electronic processing device for receiving data from the at least one monitor and providing feedback to an individual based on the received data. The monitor can be a motion monitor that measures an individual's performance such as, for example, speed, pace and distance for a runner. Other monitors might include a heart rate monitor, a temperature monitor, an altimeter, et cetera. An input is provided to an electronic game based on data obtained from the at least one monitor that effects, for example, an avatar, a digitally created character, an action within the game, or a game score of the electronic game.

U.S. Pat. No. 9,625,485 for sports electronic training system, and applications thereof by inventor Oleson et al., filed May 3, 2016 and issued Apr. 18, 2017, is directed to a sports electronic training system, and applications thereof. The system comprises at least one monitor and an electronic processing device for receiving data from the at least one monitor and providing feedback to an individual based on the received data. The monitor can be a motion monitor that measures an individual's performance such as, for example, speed, pace and distance for a runner.

U.S. Pat. No. 9,625,485 for sports electronic training system, and applications thereof by inventor Oleson et al., filed May 3, 2016 and issued Apr. 18, 2017, is directed to a sports electronic training system, and applications thereof. The system comprises at least one monitor and an electronic processing device for receiving data from the at least one monitor and providing feedback to an individual based on the received data. The monitor can be a motion monitor that measures an individual's performance such as, for example, speed, pace and distance for a runner.

US Patent Publication No. 2014/0031123 for systems for and methods of detecting and reproducing motions for video games by inventor Sarrafzadeh et al., filed Jan. 19, 2012 and published Jan. 30, 2014, is directed to an instrument that gathers and processes data from one or more capture devices. The data can thereafter be processed using one or more classification techniques to properly detect and/or reproduce motions for an application. The present invention can be used both outdoors and indoors.

U.S. Pat. No. 6,646,643 for user control of simulated locomotion by inventor Templeman, filed Jan. 5, 2001 and issued Nov. 11, 2003, is directed to a method and apparatus for interfacing locomotive 3D movements of a user to a reference in a virtual or remote environment. Initially, a 3D motion of a body portion of a user is sensed as the user takes a gestural pace. This sensing includes the determining of a beginning and an end of the gestural pace taken by the user, the determining of a 3D direction characteristic of the body portion motion during the gestural pace, and the determining of a 3D extent characteristic of the body portion motion during the gestural pace. Next, a 3D direction and extent of motion in the environment corresponding to the determined direction and extent characteristics of the gestural pace is computed. Finally, the computed 3D motion is used to move the reference in the environment.

U.S. Pat. No. 10,369,474 for virtual performance system by inventor Walling, filed May 10, 2017 and issued Aug. 6, 2019, is directed to rewarding users of an electronic game for real-world physical activity. Further aspects relate to altering virtual items based upon physical activity. An electronic game may comprise or otherwise relate to an online world (such as a "Virtual World"). Users may be represented through customized graphical representations, such as avatars. An account of a user (or entity) may be associated a "virtual region." A threshold level of real-world physical activity may result in obtaining a reward that may be associated with a virtual item. A reward may be configured to result in: (1) altering visual appearance of a virtual item within a virtual region; (2) altering a virtual characteristic of a virtual item, such that the first user may engage in at least one additional virtual activity using that virtual item; and/or (3) acquiring a new virtual item for a virtual region.

US Patent Publication No. 2017/0262049 for virtual reality display based on orientation offset by inventor Kim, filed Mar. 11, 2016 and published Sep. 14, 2017, is directed to technologies to orient virtual reality content based on user head and body orientations. In some examples, a virtual reality content display system may display different portions of virtual reality content to a user based on user head and/or body orientation. The virtual reality content display system may use a determined user body orientation to identify a first, forward portion of the virtual reality content. The virtual reality content display system may then determine where the head of the user is oriented with respect to the user body orientation, in the form of a head-body orientation offset. Upon determining a second portion of the virtual reality content corresponding to the user head orientation, the virtual reality content display system may display the second portion of the virtual reality content to the user. Portions of the virtual reality content may include distinct user interfaces of one or more applications.

US Patent Publication No. 2018/0236352 for wearable inertial electronic device by inventor El-Sheimy et al., filed Aug. 26, 2016 and published Aug. 23, 2018, is directed to wearable electronic devices in game play applications. A method may include receiving a signal characteristic of movement of a MEMS inertial sensor configured to generate data in response to movement of a human foot. The method may also include processing the signal received from the MEMS inertial sensor, in a processing device, to generate a command input for an application processing device. Additionally, the method may include communicating the command input to the application processing device for control of an application hosted on the application processing device.

SUMMARY OF THE INVENTION

The present invention relates to systems and methods for smart footwear.

It is an object of this invention to provide a system for controlling an avatar in a virtual environment.

In one embodiment, the present invention provides a smart footwear system including at least one smart footwear article and at least one remote device, wherein the at least one smart footwear article includes at least one processor, at least one memory, a transceiver, at least one sensor, at least one vibration motor, and at least one battery, wherein the at least one sensor includes at least one force sensor, wherein the at least one sensor is operable to generate, determine, and/or calculate sensor data, wherein the sensor data includes a magnitude, a duration, and at least one direction of at least one applied force to the at least one smart footwear article, wherein the at least one smart footwear article and the at least one remote device are operable to communicate via two-way communication in real-time or near real-time, and wherein the at least one smart footwear article is operable to transmit the sensor data to the at least one remote device.

In another embodiment, the present invention provides a smart footwear system including at least one smart footwear article, at least one remote device, and at least one remote server, wherein the at least one smart footwear article includes at least one processor, at least one memory, a transceiver, at least one sensor, at least one vibration motor, and at least one battery, wherein the at least one sensor includes at least one force sensor, wherein the at least one sensor is operable to generate sensor data, wherein the sensor data includes a magnitude, a duration, and at least one direction of at least one applied force to the at least one smart footwear article, wherein the at least one smart footwear article and the at least one remote device are operable to communicate via two-way communication in real-time or near real-time, wherein the at least one remote device and the at least one remote server are operable to communicate via two-way communication in real-time or near real-time, and wherein the at least one smart footwear article is operable to transmit the sensor data to the at least one remote device and/or the at least one remote server.

In yet another embodiment, the present invention provides a smart footwear system including at least one smart footwear article, at least one remote device, and at least one remote server, wherein the at least one smart footwear article includes at least one processor, at least one memory, a transceiver, at least one sensor, at least one vibration motor, and at least one battery, wherein the at least one sensor includes at least one force sensor, wherein the at least one sensor is operable to generate sensor data, wherein the sensor data includes a magnitude, a duration, and at least one direction of at least one applied force to the at least one smart footwear article, wherein the at least one smart footwear article and the at least one remote device are operable to communicate via two-way communication in real-time or near real-time, wherein the at least one remote device and the at least one remote server are operable to communicate via two-way communication in real-time or near real-time, wherein the at least one smart footwear article is operable to transmit the sensor data to the at least one remote device and/or the at least one remote server, wherein the at least one force sensor includes a first force sensor constructed to be positioned under a first phalange of a foot, a second force sensor constructed to be positioned underneath a second phalange, a third phalange, and a fourth phalange of the foot, a third force sensor constructed to be positioned under a first metatarsal, a fourth force sensor constructed to be positioned underneath a second metatarsal, a third metatarsal, and a fourth metatarsal, a fifth force sensor constructed to be positioned under a fifth metatarsal, a sixth force sensor constructed to be positioned under an arch of the foot, a seventh force sensor constructed to be positioned under a lateral column of the foot, and an eighth force sensor under a calcaneus of the foot, and wherein the at least one vibration motor includes a first vibration motor constructed to be positioned under a lateral plantar nerve and a second vibration motor constructed to be positioned under a medial plantar nerve.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 14A is a lateral view of one embodiment of a smart footwear insole.

FIG. 14B is a bottom view of one embodiment of the smart footwear insole shown in FIG. 14A.

FIG. 14C is a medial view of one embodiment of the smart footwear insole shown in FIG. 14A.

FIG. 23A illustrates a smart footwear article according to one embodiment of the present invention.

FIG. 23B illustrates the smart footwear insole according to one embodiment of the present invention.

DETAILED DESCRIPTION

Figure 1:
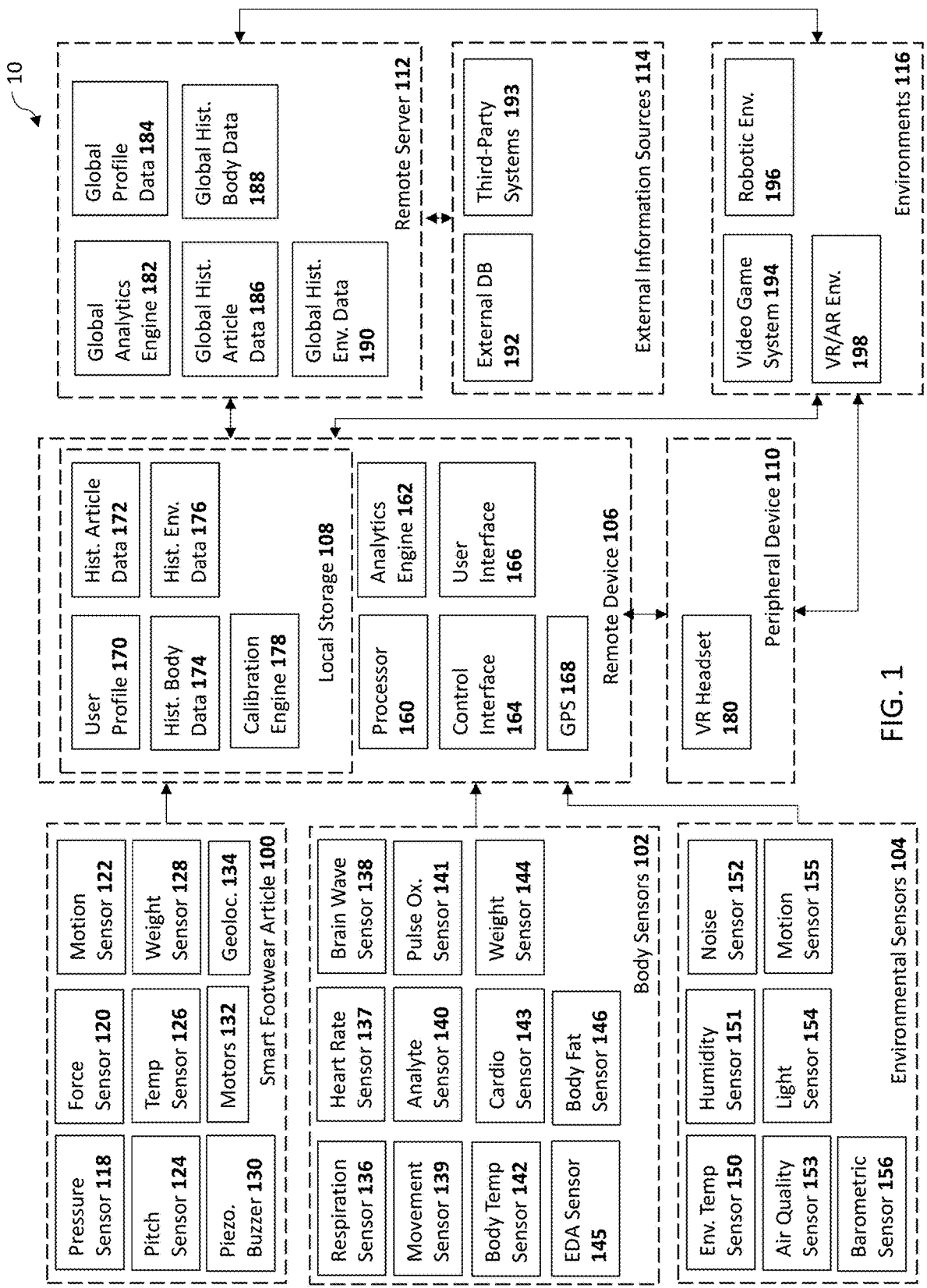
FIG. 1 is a block diagram of one embodiment of a smart footwear system.

The present invention is generally directed to systems and methods for smart footwear.

In one embodiment, the present invention provides a smart footwear system including at least one smart footwear article and at least one remote device, wherein the at least one smart footwear article includes at least one processor, at least one memory, a transceiver, at least one sensor, at least one vibration motor, and at least one battery, wherein the at least one sensor includes at least one force sensor, wherein the at least one sensor is operable to generate, determine, and/or calculate sensor data, wherein the sensor data includes a magnitude, a duration, and at least one direction of at least one applied force to the at least one smart footwear article, wherein the at least one smart footwear article and the at least one remote device are operable to communicate via two-way communication in real-time or near real-time, and wherein the at least one smart footwear article is operable to transmit the sensor data to the at least one remote device.

In another embodiment, the present invention provides a smart footwear system including at least one smart footwear article, at least one remote device, and at least one remote server, wherein the at least one smart footwear article includes at least one processor, at least one memory, a transceiver, at least one sensor, at least one vibration motor, and at least one battery, wherein the at least one sensor includes at least one force sensor, wherein the at least one sensor is operable to generate sensor data, wherein the sensor data includes a magnitude, a duration, and at least one direction of at least one applied force to the at least one smart footwear article, wherein the at least one smart footwear article and the at least one remote device are operable to communicate via two-way communication in real-time or near real-time, wherein the at least one remote device and the at least one remote server are operable to communicate via two-way communication in real-time or near real-time, and wherein the at least one smart footwear article is operable to transmit the sensor data to the at least one remote device and/or the at least one remote server.

In yet another embodiment, the present invention provides a smart footwear system including at least one smart footwear article, at least one remote device, and at least one remote server, wherein the at least one smart footwear article includes at least one processor, at least one memory, a transceiver, at least one sensor, at least one vibration motor, and at least one battery, wherein the at least one sensor includes at least one force sensor, wherein the at least one sensor is operable to generate sensor data, wherein the sensor data includes a magnitude, a duration, and at least one direction of at least one applied force to the at least one smart footwear article, wherein the at least one smart footwear article and the at least one remote device are operable to communicate via two-way communication in real-time or near real-time, wherein the at least one remote device and the at least one remote server are operable to communicate via two-way communication in real-time or near real-time, wherein the at least one smart footwear article is operable to transmit the sensor data to the at least one remote device and/or the at least one remote server, wherein the at least one force sensor includes a first force sensor constructed to be positioned under a first phalange of a foot, a second force sensor constructed to be positioned underneath a second phalange, a third phalange, and a fourth phalange of the foot, a third force sensor constructed to be positioned under a first metatarsal, a fourth force sensor constructed to be positioned underneath a second metatarsal, a third metatarsal, and a fourth metatarsal, a fifth force sensor constructed to be positioned under a fifth metatarsal, a sixth force sensor constructed to be positioned under an arch of the foot, a seventh force sensor constructed to be positioned under a lateral column of the foot, and an eighth force sensor under a calcaneus of the foot, and wherein the at least one vibration motor includes a first vibration motor constructed to be positioned under a lateral plantar nerve and a second vibration motor constructed to be positioned under a medial plantar nerve.

One drawback of controlling an avatar in a virtual or augmented reality environment is that hands are often required to make the avatar move. What is needed is a smart footwear article that is operable to control avatar locomotion within the virtual or augmented reality, thereby freeing up hands to interact with virtual objects. Advantageously, the smart footwear articles of the present invention are operable to control avatar locomotion, which makes immersed experiences and capabilities closer to real world human locomotion and interaction. For instance, when a user moves their legs and feet in the real world, a response is replicated in the virtual or augmented reality environment. In addition to virtual and augmented reality applications, the present invention is operable to be used for robotic technologies. In this manner, the smart footwear articles allow a user to extend their presence to real world places through remote control of robotic devices. For example, the locomotion of robotic devices is accomplished while freeing up the hands of a user to control other purposeful extensions of the robot, such as robotic hands.

None of the prior art discloses a smart footwear system configured for controlling a virtual avatar or robot in response to directional input from a user, wherein the user is applying different amounts of pressure to the smart footwear to control the virtual avatar or robot.

Referring now to the drawings in general, the illustrations are for the purpose of describing one or more preferred embodiments of the invention and are not intended to limit the invention thereto.

FIG. 1 is a block diagram of one embodiment of a smart footwear system. The smart footwear system 10 includes at least one smart footwear article 100, at least one body sensor 102, at least one environmental sensor 104, at least one remote device 106 with local storage 108, at least one peripheral device 110, at least one remote server 112, at least one external information source 114, and/or at least one environment 116.

The at least one smart footwear article 100 includes at least one pressure sensor 118, at least one force sensor 120, at least one motion sensor 122, at least one pitch sensor 124, at least one temperature sensor 126, at least one weight sensor 128, at least one piezoelectric buzzer 130, at least one motor 132 (e.g., vibration motor), and/or at least one geo-location sensor 134 (e.g., global positioning system (GPS) module).

The at least one body sensor 102 includes, but is not limited to, a respiration sensor 136, a heart rate sensor 137, a brain wave sensor 138, a remote movement sensor 139, an analyte sensor 140, a pulse oximetry sensor 141, a body temperature sensor 142, a blood pressure sensor 143, a remote weight sensor 144, an electrodermal activity (EDA) sensor 145, and/or a body fat sensor 146.

The respiration sensor 136 measures a respiratory rate. In one embodiment, the respiration sensor 136 is incorporated into a wearable device (e.g., a chest strap). In another embodiment, the respiration sensor 136 is incorporated into a patch, a bandage, or a ring. Alternatively, the respiratory rate is estimated from an electrocardiogram, a photoplethysmogram (e.g., a pulse oximeter), and/or an accelerometer. In yet another embodiment, the respiratory sensor 136 uses a non-contact motion biomotion sensor to monitor respiration.

The heart rate sensor 137 is preferably incorporated into a wearable device (e.g., FITBIT, APPLE WATCH, SAMSUNG GALAXY WATCH, OURA). Alternatively, the heart rate sensor 137 is attached to the user with a chest strap. In another embodiment, the heart rate sensor 137 is incorporated into a patch, a bandage, or a ring.

The brain wave sensor 138 is preferably an electroencephalogram (EEG) with at least one channel. In a preferred embodiment, the EEG has at least two channels. Multiple channels provide higher resolution data. The frequencies in EEG data indicate particular brain states. The brain wave sensor 138 is preferably operable to detect delta, theta, alpha, beta, and gamma frequencies. In another embodiment, the brain wave sensor 138 is operable to identify cognitive and emotion metrics, including focus, stress, excitement, relaxation, interest, and/or engagement. In yet another embodiment, the brain wave sensor 138 is operable to identify cognitive states that reflect the overall level of engagement, attention and focus and/or workload that reflects cognitive processes (e.g., working memory, problem solving, analytical reasoning).

The movement sensor 139 is an accelerometer and/or a gyroscope. In one embodiment, the accelerometer and/or the gyroscope are incorporated into a wearable device (e.g., FITBIT, APPLE WATCH, SAMSUNG GALAXY WATCH). In another embodiment, the accelerometer and/or the gyroscope are incorporated into a smartphone. In alternative embodiments, the movement sensor 139 is a non-contact sensor. In one embodiment, the movement sensor 139 is at least one piezoelectric sensor. In another embodiment, the movement sensor 139 is a pyroelectric infrared sensor (i.e., a "passive" infrared sensor). In yet another embodiment, the movement sensor 139 a magnetometer.

The analyte sensor 140 monitors levels of an analyte in blood, sweat, or interstitial fluid. In one embodiment, the analyte is an electrolyte, a small molecule (molecular weight<900 Daltons), a protein (e.g., C-reactive protein), and/or a metabolite. In another embodiment, the analyte is glucose, lactate, glutamate, oxygen, sodium, chloride, potassium, calcium, ammonium, copper, magnesium, iron, zinc, creatinine, uric acid, oxalic acid, urea, ethanol, an amino acid, a hormone (e.g., cortisol, melatonin), a steroid, a neurotransmitter, a catecholamine, a cytokine, and/or an interleukin (e.g., IL-6). The analyte sensor 140 is preferably non-invasive. Alternatively, the analyte sensor 140 is minimally invasive or implanted. In one embodiment, the analyte sensor 140 is incorporated into a wearable device. Alternatively, the analyte sensor 140 is incorporated into a patch or a bandage.

The pulse oximeter sensor 141 monitors oxygen saturation. In one embodiment, the pulse oximeter sensor 141 is worn on a finger, a toe, or an ear. In another embodiment, the pulse oximeter sensor 141 is incorporated into a patch or a bandage. The pulse oximeter sensor 141 is preferably wireless. Alternatively, the pulse oximeter sensor 141 is wired. In one embodiment, the pulse oximeter sensor 141 is connected by a wire to a wrist strap or a strap around a hand. In another embodiment, the pulse oximeter sensor 141 is combined with a heart rate sensor 137. In yet another embodiment, the pulse oximeter sensor 141 uses a camera lens on a smartphone or a tablet.

The body temperature sensor 142 measures core body temperature and/or skin temperature. The body temperature sensor 142 is a thermistor, an infrared sensor, or thermal flux sensor. In one embodiment, the body temperature sensor 142 is incorporated into an armband or a wristband. In another embodiment, the body temperature sensor 142 is incorporated into a patch, a bandage, or a ring. In yet another embodiment, the body temperature sensor 142 is an ingestible core body temperature sensor (e.g., CORTEMP). The body temperature sensor 142 is preferably wireless.

The cardio sensor 143 includes an electrocardiogram and/or a blood pressure sensor. In one embodiment, the electrocardiogram and/or blood pressure sensor is incorporated into a wearable device (e.g., smart watch). In one embodiment, the blood pressure (BP) sensor is a sphygmomanometer. The sphygmomanometer is preferably wireless. Alternatively, the blood pressure sensor estimates the blood pressure without an inflatable cuff (e.g., SALU PULSE+).

The body weight sensor 144 is preferably a smart scale (e.g., FITBIT ARIA).

The electrodermal activity sensor 145 measures sympathetic nervous system activity. In one embodiment, the electrodermal activity sensor 145 is incorporated into a wearable device. Alternatively, the electrodermal activity sensor 145 is incorporated into a patch or a bandage.

The body fat sensor 146 is preferably a bioelectrical impedance device. In one embodiment, the body fat sensor 146 is incorporated into a smart scale (e.g., FITBIT ARIA). Alternatively, the body fat sensor 146 is a handheld device.

The at least one environmental sensor 104 includes, but is not limited to, at least one environmental temperature sensor 150, at least one humidity sensor 151, at least one noise sensor 152, at least one air quality sensor 153, at least one light sensor 154, at least one environmental motion sensor 155, and/or at least one barometric sensor 156. In one embodiment, the at least one environmental temperature sensor 150, the at least one humidity sensor 151, the at least one noise sensor 152, the at least one air quality sensor 153, the at least one light sensor 154, the at least one environmental motion sensor 155, and/or the at least one barometric sensor 156 are incorporated into a home automation system (e.g., AMAZON ALEXA, APPLE HOMEKIT, GOOGLE HOME, NEST, IF THIS THEN THAT (IFTTT)). Alternatively, one or more of the at least one environmental temperature sensor 150, the at least one humidity sensor 151, the at least one noise sensor 152, and/or the at least one light sensor 154 are incorporated into a smartphone or tablet. In one embodiment, one or more of the at least one noise sensor 152 is a microphone. In one embodiment, the at least one air quality sensor 153 measures carbon monoxide, carbon dioxide, nitrogen dioxide, sulfur dioxide, particulates, and/or volatile organic compounds (VOCs).

The at least one remote device 106 is preferably a smartphone or a tablet. Alternatively, the at least one remote device 106 is a laptop or a desktop computer. The at least one remote device 106 includes the local storage 108, at least one processor 160, an analytics engine 162, a control interface 164, a user interface 166, and/or a GPS module 168. The local storage 108 includes user profile storage 170, historical article data 172, historical body data 174, historical environmental data 176, and/or a calibration engine 178. The at least one remote device 106 is in network communication with and accepts data from the at least one smart footwear article 100, the body sensors 102, and/or the environmental sensors 104. The at least one remote device 106 also is in network communication and accepts data input from the peripheral device 110, the at least one remote server 112, the external information sources 114, and/or the environments 116. The at least one remote device 106 stores data in a local storage 108.

The local storage 108 on the remote device 106 includes a user profile 170, historical article data 172, historical body data 174, historical environmental data 176, and a calibration engine 178. The user profile 170 stores smart footwear system 10 preferences and information about the user, including but not limited to, age, weight, height, gender, medical history (e.g., medications, diseases), fitness (e.g., fitness level, fitness activities), activity goals, stress level, and/or occupational information (e.g., occupation, shift information).

The at least one peripheral device 110 includes a virtual reality headset 180. In another embodiment, the at least one peripheral device 110 includes a keyboard, a controller, and/or a mouse.

The remote server 112 includes a global analytics engine 182, global profile data 184, global historical article data 186, global historical body sensor data 188, and/or global historical environmental data 190. The global analytics engine 182 is operable to perform calculations using all global profile data 184, global historical article data 186, global historical body sensor data 188, and/or global historical environmental data 190. For example, the global analytics engine 182 is operable to suggest settings to a user based on preferences of other users (e.g., users of similar heights). The global profile data 184 includes user profile data from all users. The global historical article data 186 includes historical article data from all users. The global historical body sensor data 188 includes historical body sensor data from all users. The global historical environmental data 190 includes historical environmental data from all users.

The external information sources 114 include, but are not limited to, external databases 192 and/or third-party systems 193. Examples of information stored in external databases 192 includes, but is not limited to, map data, road data, terrain data, and/or building data. Examples of third-party systems 193 include, but are not limited to, mobile applications related to wearables (e.g., body sensors) and external motion detection sensors. The external motion sensors collect three-dimensional (3D) data, including, but not limited to, 3D body positional data. The external motion sensors utilize infrared and/or 3D video analysis to obtain the 3D body positional data.

The environments 116 include, but are not limited to, a video game system 194, a robotic environment 196, a virtual reality and/or augmented reality environment 198, and real world indoor and outdoor environments. In one embodiment, the real world indoor and outdoor environments are controlled by a mobile interface on the at least one remote device 106.

Article

The present invention includes a smart footwear article. In one embodiment, the smart footwear article includes at least one of the following: an insole, a sandal, a slipper, a shoe, a flip-flop, a boot, a strap, or a sneaker. In another embodiment, the sensors are embedded in an apparatus that is secured to each individual foot (e.g., over footwear).

The two-way communicating embedded pressure sensor, motion, device orientation, and haptic feedback loop design of the smart footwear article system is also operable for use in a glove, clothing (e.g., shirt, pants, undergarments, sleeve/straps), and a lining of a prosthetic device.

In a preferred embodiment, the smart footwear article includes at least one sensor embedded within the smart footwear article or remote from it. The at least one sensor includes, but is not limited to, a force sensor, a pressure sensor, an inertial sensor, a temperature sensor, an altimeter, a piezo pressure sensor, a strain gauge pressure sensor, an Electric Cardiogram (EKG) sensor, an optical sensor, a sweat analyzing sensor, a highly conductive material pressure sensor and/or a pitch measuring sensor. In another embodiment, the smart footwear article includes a global position system (GPS) sensor.

In a preferred embodiment, the present invention includes a force sensor. The force sensor is configured to capture sensor data (e.g., force data) from the force applied to the smart footwear article. The force data includes a magnitude, a duration, and a direction of the force applied to the smart footwear article. The smart footwear article also preferably includes an inertial measurement unit (IMU) (e.g., an accelerometer measuring pitch and motion).

In a preferred embodiment, the smart footwear article includes at least one vibration motor. In one embodiment, the at least one vibration motor includes a linear resonant actuator. In yet another embodiment, the at least one vibration motor is operable for a vibration magnitude of at least 1.2 G, an operational voltage between 9-2 Vrms AC (sine-wave), and a current less than or equal to 95 mA. In yet another embodiment, the at least one vibration motor includes at least one piezo electric actuator.

The smart footwear article includes at least one power supply. In a preferred embodiment, the smart footwear article includes at least one rechargeable battery. Alternatively, the smart footwear article includes at least one non-rechargeable battery. In another embodiment, the smart footwear article is powered via a cord to a direct current (DC) (e.g., an external battery) or an alternating current (AC) power source.

In another embodiment, the at least one rechargeable battery is operable to be recharged using a kinetic energy harvester. Advantageously, this allows the smart footwear article to be charged while the wearer is in motion.

The smart footwear article preferably has at least one processor. By way of example, and not limitation, the at least one processor may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information. In one embodiment, one or more of the at least one processor is operable to run predefined programs stored in at least one memory of the smart footwear article. In another embodiment, the at least one processor includes an ultra-low power (ULP) microcontroller. Advantageously, the ULP microcontroller includes integrated power management, which provides for lower power consumption of the smart footwear article.

In one embodiment, the at least one processor is a microcontroller. The microcontroller includes a transceiver, BLUETOOTH module, WI-FI module, a microprocessor, an ultra-low-power co-processor, read-only memory (ROM), random-access memory (RAM) (e.g., static random-access memory (SRAM)), flash memory, a power management unit, a temperature sensor, and/or a digital-to-analog converter.

The smart footwear article preferably includes at least one transceiver, which allows the smart footwear article to receive and process input data (e.g., calibration information, start and stop commands) from at least one remote device (e.g., smartphone, tablet, laptop computer, desktop computer, gaming system) and/or transfer output data (e.g., sensor data) to the at least one remote device. In a preferred embodiment, the at least one remote device is in wireless network communication with the smart footwear article. The wireless communication is, by way of example and not limitation, radiofrequency, BLUETOOTH, ZIGBEE, WI-FI, wireless local area networking, near field communication (NFC), or other similar commercially utilized standards. Alternatively, the at least one remote device is in wired communication with the smart footwear article through USB, LIGHTNING, or equivalent.

In one embodiment, the smart footwear article includes at least one piezoelectric buzzer. Advantageously, this allows the smart footwear article to provide audio feedback. In a preferred embodiment, the at least one piezoelectric buzzer is operable to provide a multiplicity of sounds. For example, the at least one piezoelectric buzzer is configured to create a "tapping shoe" noise when a user is tapping their toes on the ground.

In yet another embodiment, the smart footwear article includes a sensor under the arch. In one embodiment, the smart footwear article includes a grid system, and there are analog sensors to provide a pressure value at each cross section of the grid. The system is further operable to create a full three-dimensional (3D) image based on the pressure data capture at the grid cross sections.

In one embodiment of the present invention, the smart footwear article includes at least one cavity. In one embodiment, one or more of the at least one cavity holds a printed circuit board (PCB), a sensor, a motor, a magnet, and/or at least one battery. In another embodiment, the at least one cavity in the smart footwear article is filled with a hard urethane or an epoxy-like material. The epoxy-like material is used for heat and shock protection. In another embodiment, the system uses stamped steel. The stamped steel allows for the removal of hardening fillers.

In another embodiment, the smart footwear article includes a linear resonance actuator (LRA) The linear resonant actuator dynamically matches resonant frequency, optimizes power consumption, and provides programmable haptic feedback. In one embodiment, the linear resonant actuator uses a closed-loop architecture to deliver sharp, strong, and consistent haptic effects while optimizing power consumption. The linear resonant actuator preferably uses an internal library and a loopable waveform sequencer with an automatic overdrive and braking when creating haptic effects. In a preferred embodiment, the smart footwear system is operable for auto resonance tracking. Auto resonance tracking allows for the LRA to be driven close to the resonant frequency to improve acceleration performance and provide for an improved haptic feedback response. In one embodiment, the present invention includes an auto resonance engine. The auto resonance engine allows for the system to track the resonant frequency of the linear resonant actuator and to make real-time or near-real-time changes to the vibration generated by the linear resonant actuator. For example, if the frequency of the linear resonant actuator is too low, then the at least one remote device is operable to send an activation signal to the linear resonant actuator to increase frequency.

In another embodiment, the smart footwear article 100, includes an outer mold layer. The electronic components of the smart footwear article 100, (e.g. the at least one sensor) are embedded in the outer mold layer. The outer mold layer providers waterproof protection for the electronic components. In one embodiment, the smart footwear system further includes an external antenna. The external antenna is configured to run alongside the PCB enclosure. In another embodiment, the antenna is mounted in the outer mold layer. In yet another embodiment, the external antenna is embedded in the footwear lining. In one embodiment, the smart footwear article 100 includes a material that allows for a signal (e.g. a radio transmission signal) to pass through the smart footwear article 100.

Figure 2:
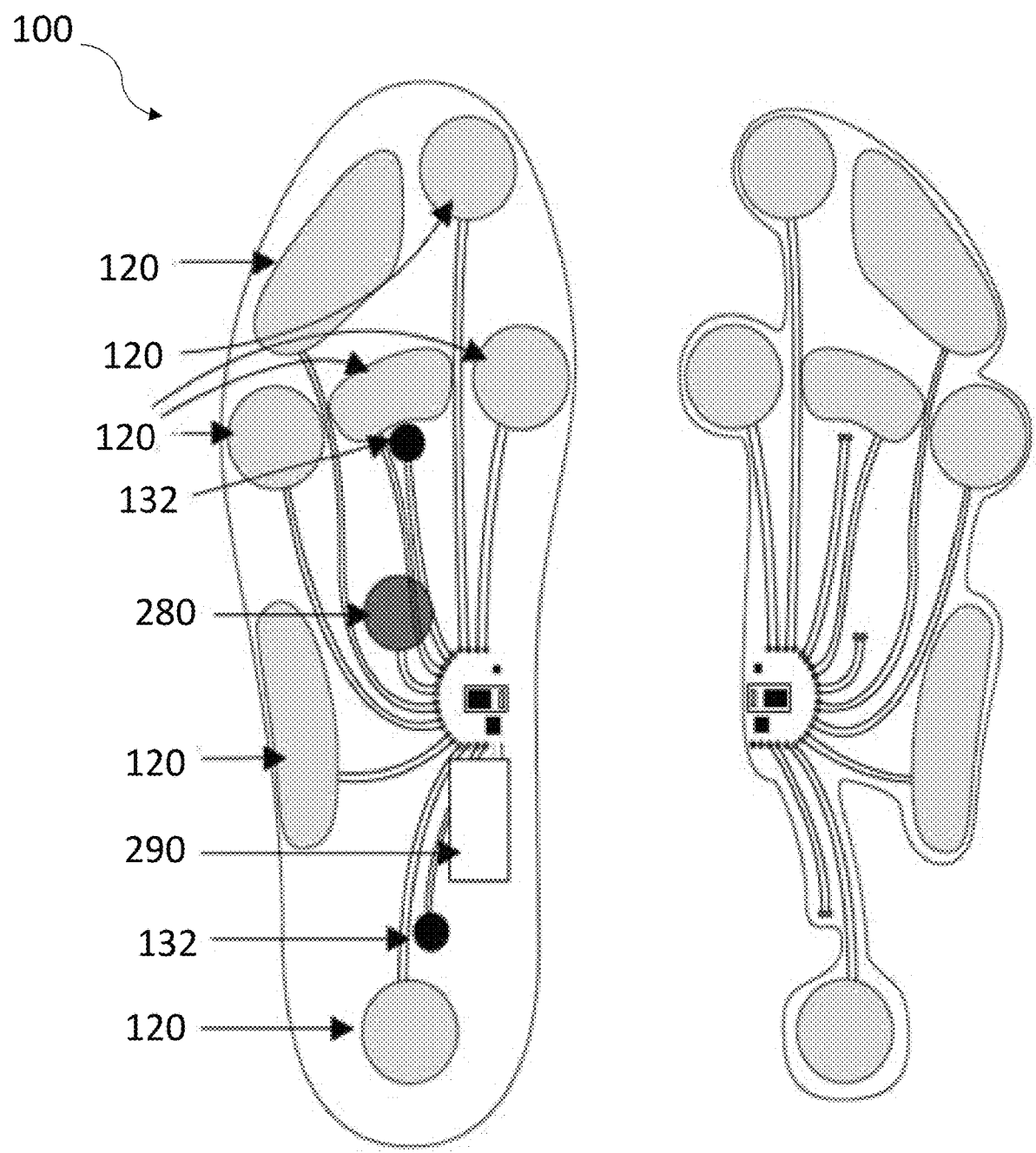
FIG. 2 illustrates a smart footwear article according to one embodiment of the present invention.

FIG. 2 illustrates a smart footwear article 100 according to one embodiment of the present invention. In the embodiment shown in FIG. 2, the smart footwear article 100 is an insole. The smart footwear article 100 includes force sensors 120, vibration motors 132, a wireless charging receiver 280 and a battery 290. The force sensors 120 are placed under the toes, metatarsal head, midfoot, heel, and lateral column. At least one vibration motor 132 is placed under the lateral plantar nerve.

Figure 3:
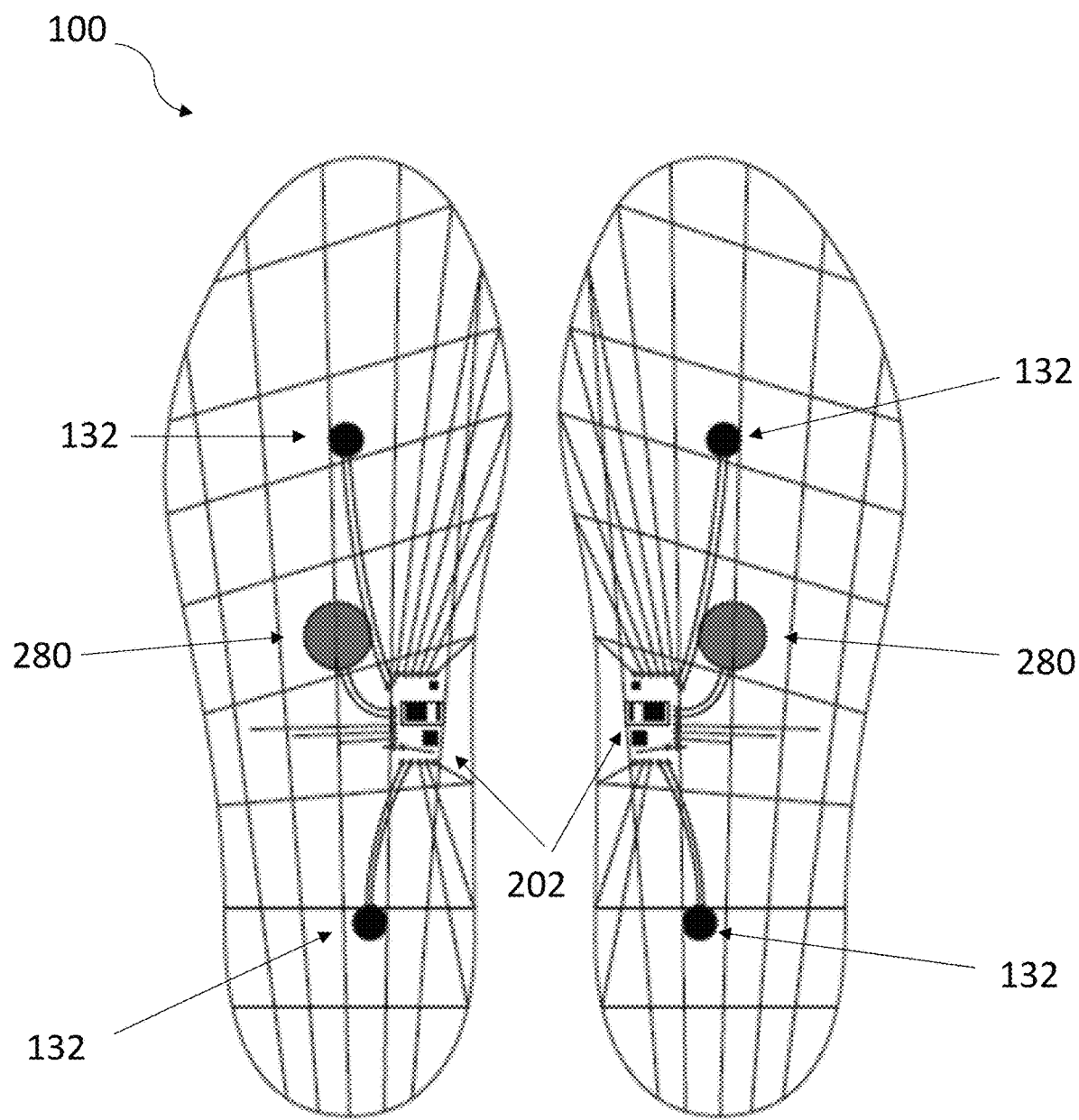
FIG. 3 is an illustrative embodiment of a three-dimensional (3D) grid matrix according to one embodiment of the present invention.

FIG. 3 is an illustrative embodiment wherein the footwear system is measured over a three-dimensional (3D) grid matrix that produces force and location coordinate data points at every cross-section grid.

Figures 4A, 4B:
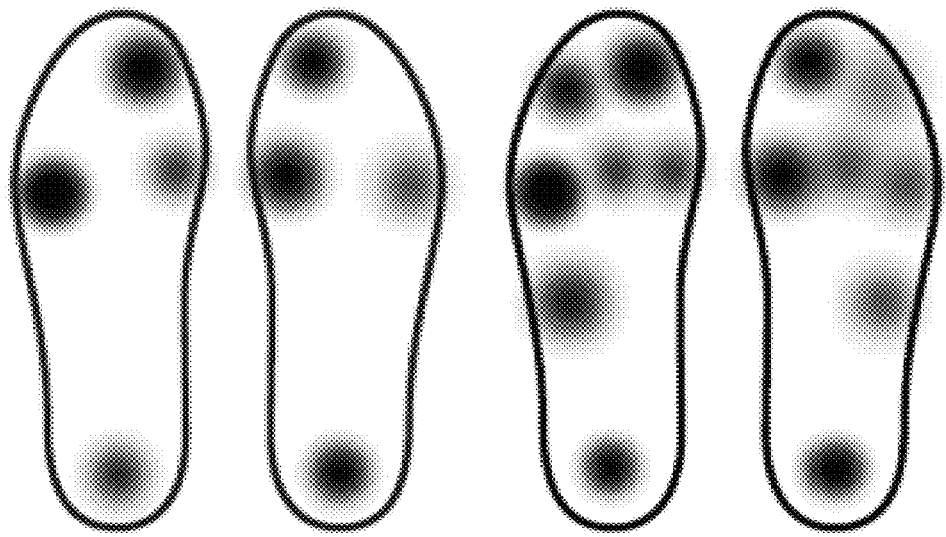
FIG. 4A illustrates a heat map data representation of sensor placement according to FIG. 2.
FIG. 4B illustrates a heat map data representation of sensor placement according to FIG. 2 with a greater force applied than in FIG. 4A.
Figure 4C:
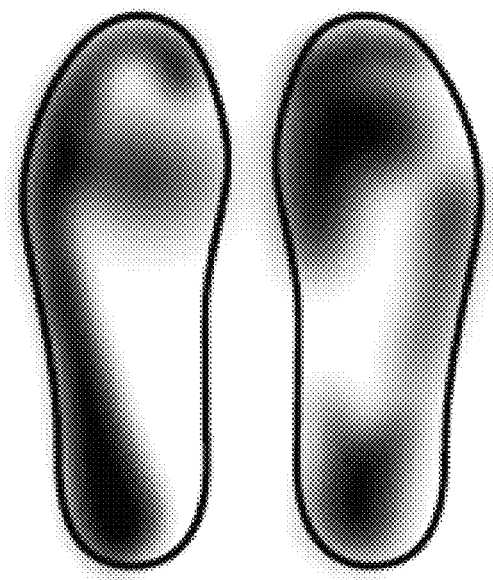
FIG. 4C illustrates a heat map data representation according to FIG. 3.

FIG. 4A illustrates a heat map data representation of sensor placement according to FIG. 2. FIG. 4B illustrates a heat map data representation of sensor placement according to FIG. 2 with a greater force applied than in FIG. 4A. FIG. 4C illustrates a heat map data representation according to FIG. 3.

Figure 5:
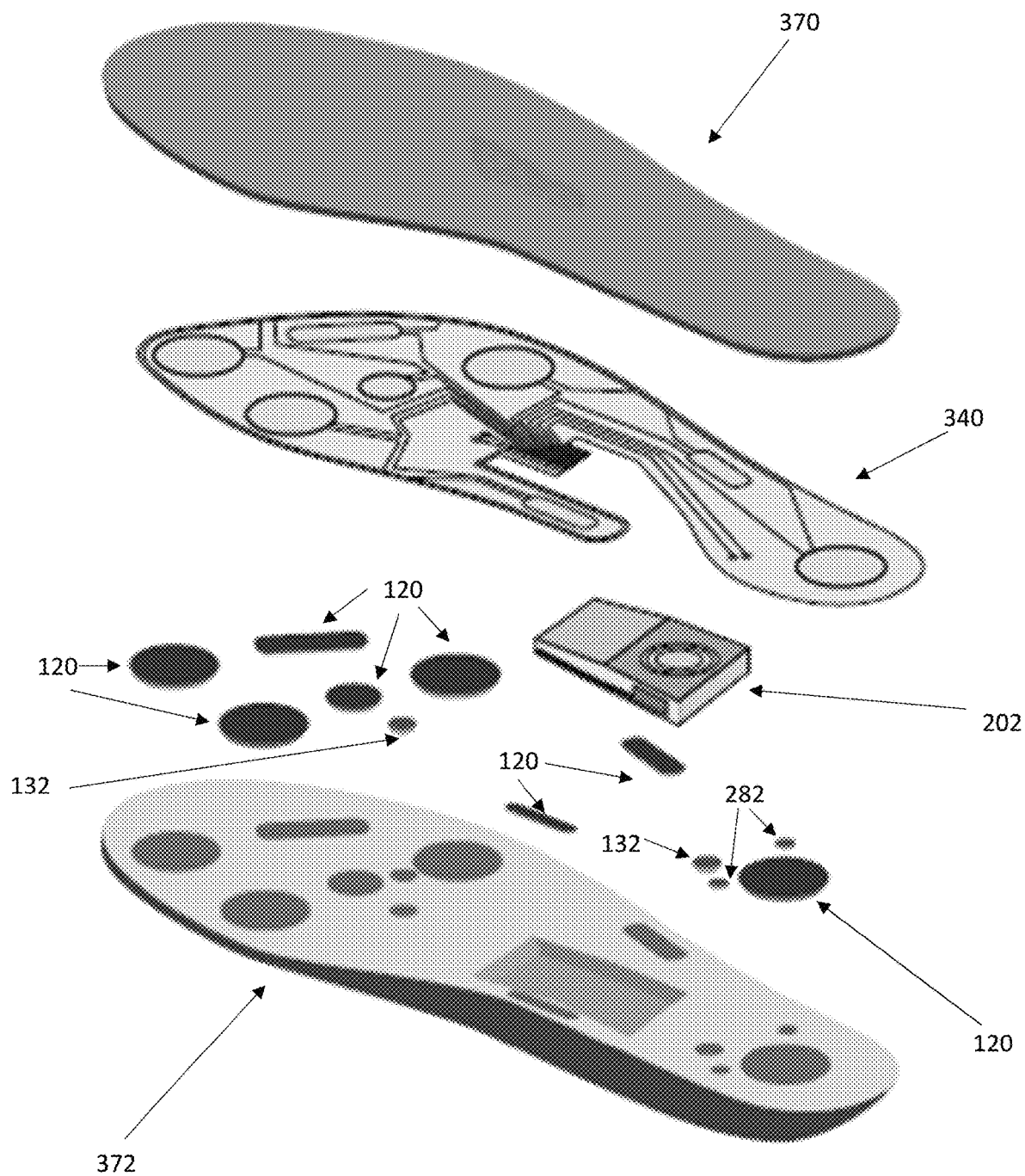
FIG. 5 is an exploded view of one embodiment of the present invention.

FIG. 5 is an exploded view of one embodiment of the present invention. The smart footwear article includes a PCB/Battery enclosure 202, a flexible circuit 340 with printed sensors, at least one force sensor 120, at least one vibration motor 132, at least one magnet 282, a top layer 370, and a bottom mold 372 to receive the PCB/Battery enclosure 202, the at least one force sensor 120, the at least one vibration motor 132, and the at least one magnet 282. In one embodiment, the at least one magnet is formed of neodymium.

Figure 6:
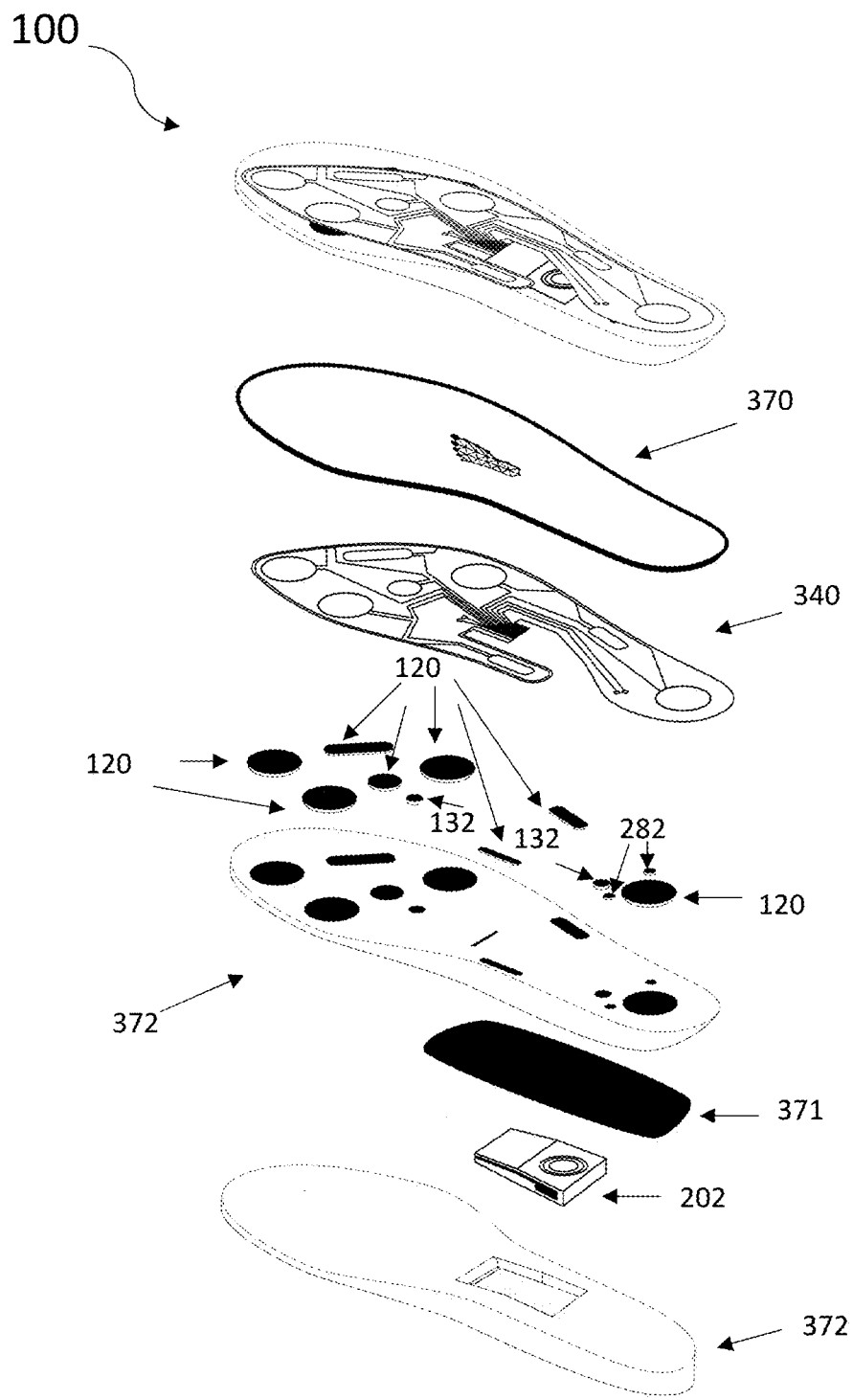
FIG. 6 is an exploded view of one embodiment of the present invention.

FIG. 6 is an exploded view of one embodiment of the present invention. The smart footwear article 100 includes a PCB/Battery enclosure 202, a flexible circuit 340 with printed sensors, at least one force sensor 120, at least one vibration motor 132, at least one magnet 282, a top layer 370, a protective plate 371, and a bottom mold 372 to receive the PCB/Battery enclosure 202. In one embodiment, the protective plate is formed of steel or a plastic (e.g., EVA, TPU).

Figure 7:
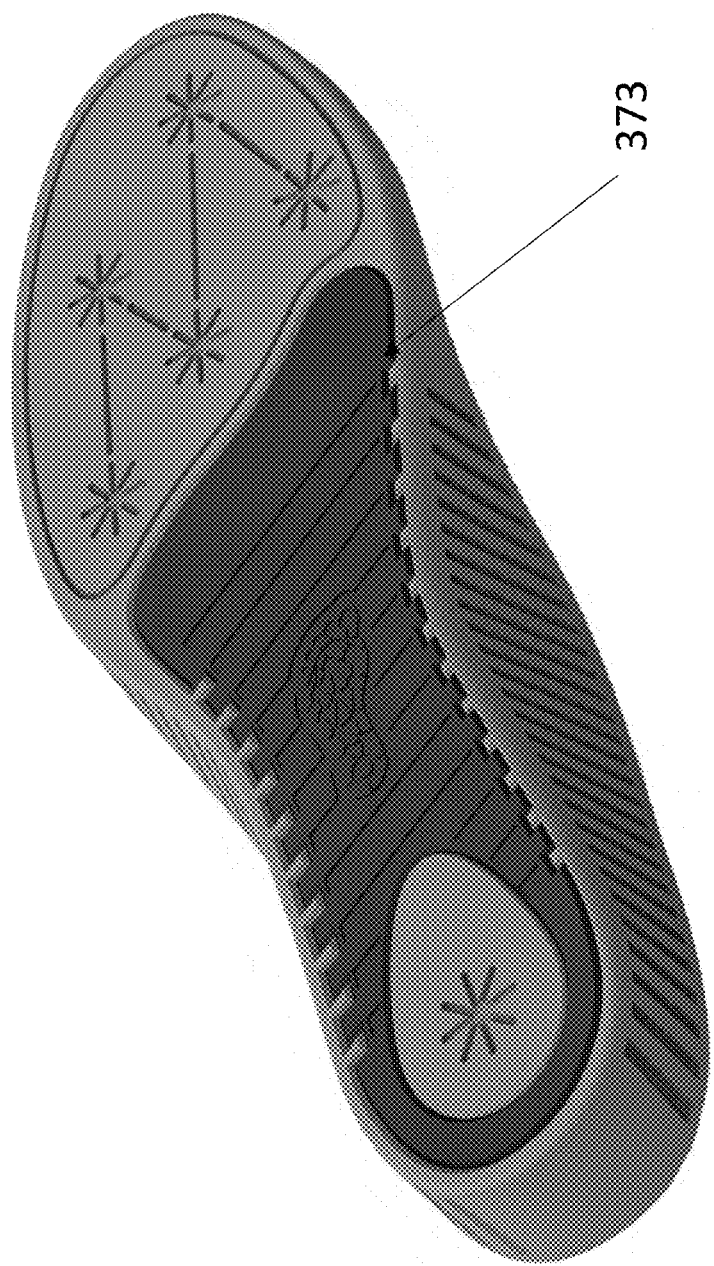
FIG. 7 is a bottom view of one embodiment of the present invention.

FIG. 7 is a bottom view of one embodiment of the smart footwear insole. The smart footwear insole includes a protective plate 373. In one embodiment, the protective plate protects at least one sensor, at least one vibration motor, at least one magnet, at least one battery, and/or a printed circuit board housing.

Figure 8:
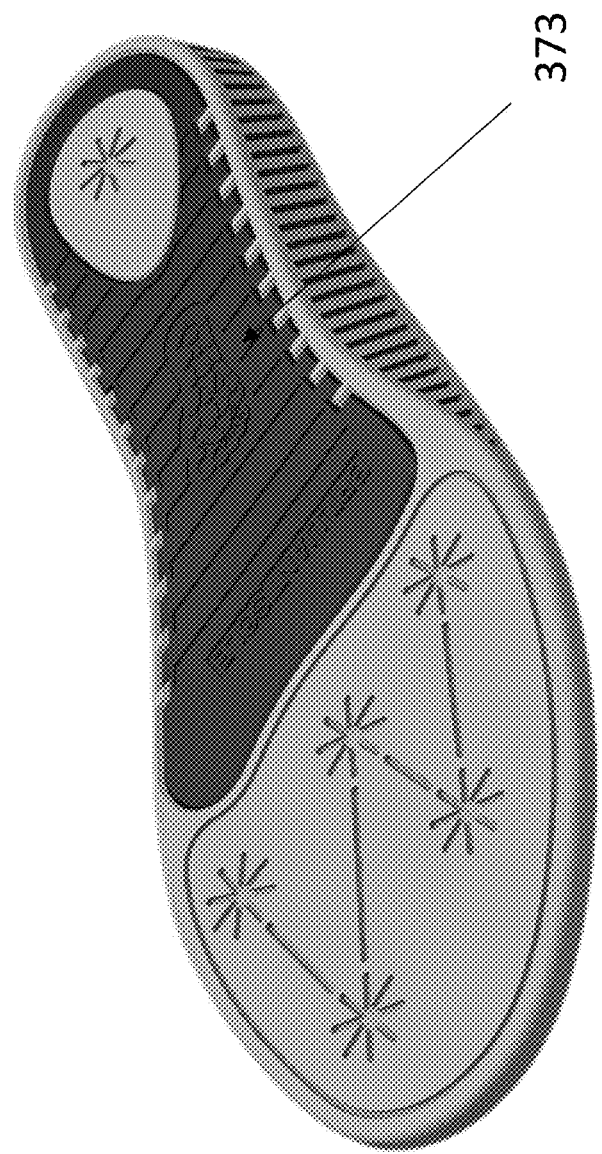
FIG. 8 is a bottom view of one embodiment of the present invention.

FIG. 8 is a bottom view of one embodiment of the smart footwear insole. The smart footwear insole includes a protective plate 373.

Figure 9:
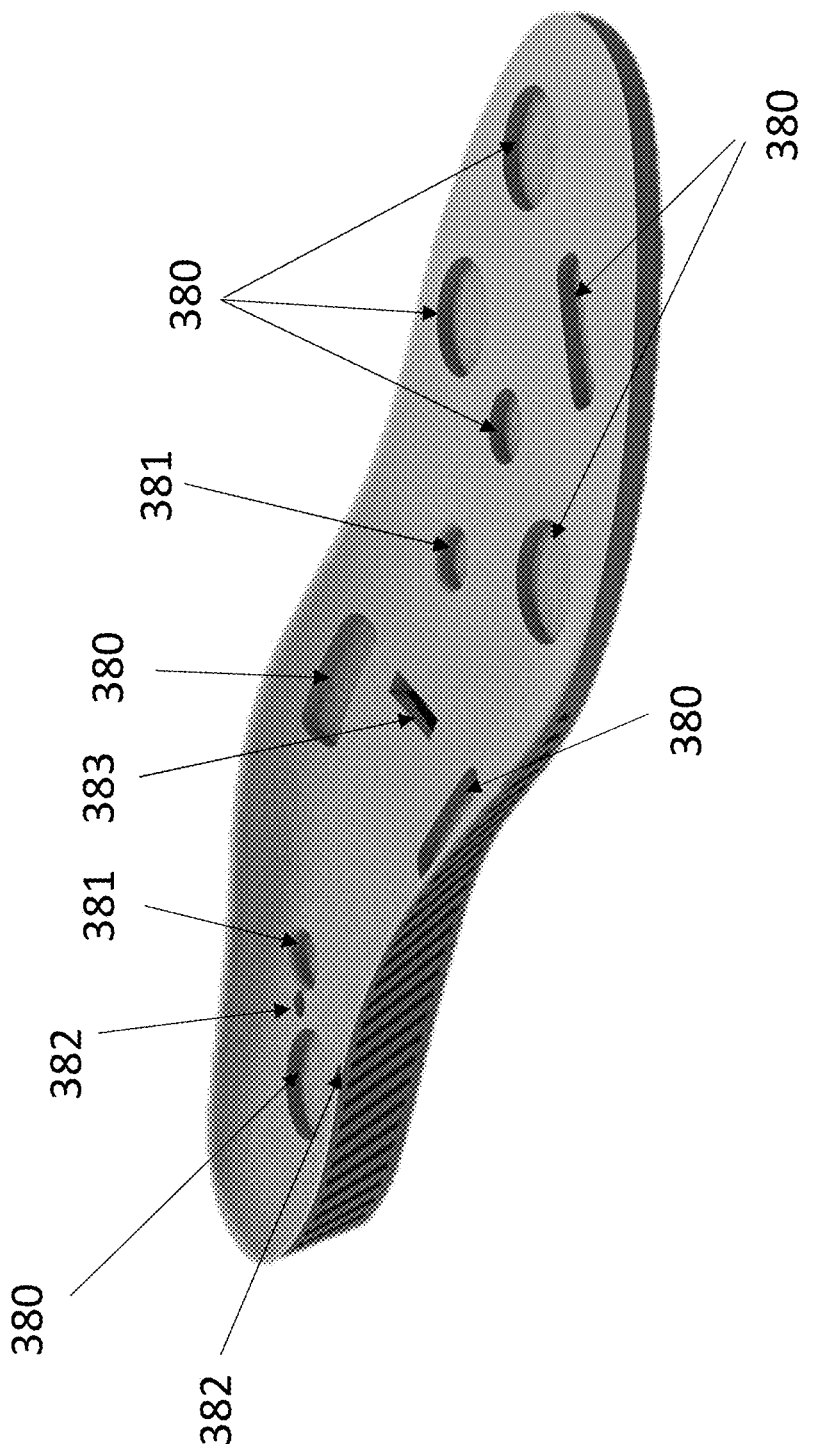
FIG. 9 is a top view of one embodiment of the smart footwear insole.

FIG. 9 is a top view of one embodiment of the smart footwear insole. The smart footwear insole includes at least one sensor cavity 380 for at least one force sensor, at least one motor cavity 381 for at least one vibration motor, at least one magnet cavity 382 for at least one magnet, and a hole for a plug 383 (e.g., for power).

Figure 10:
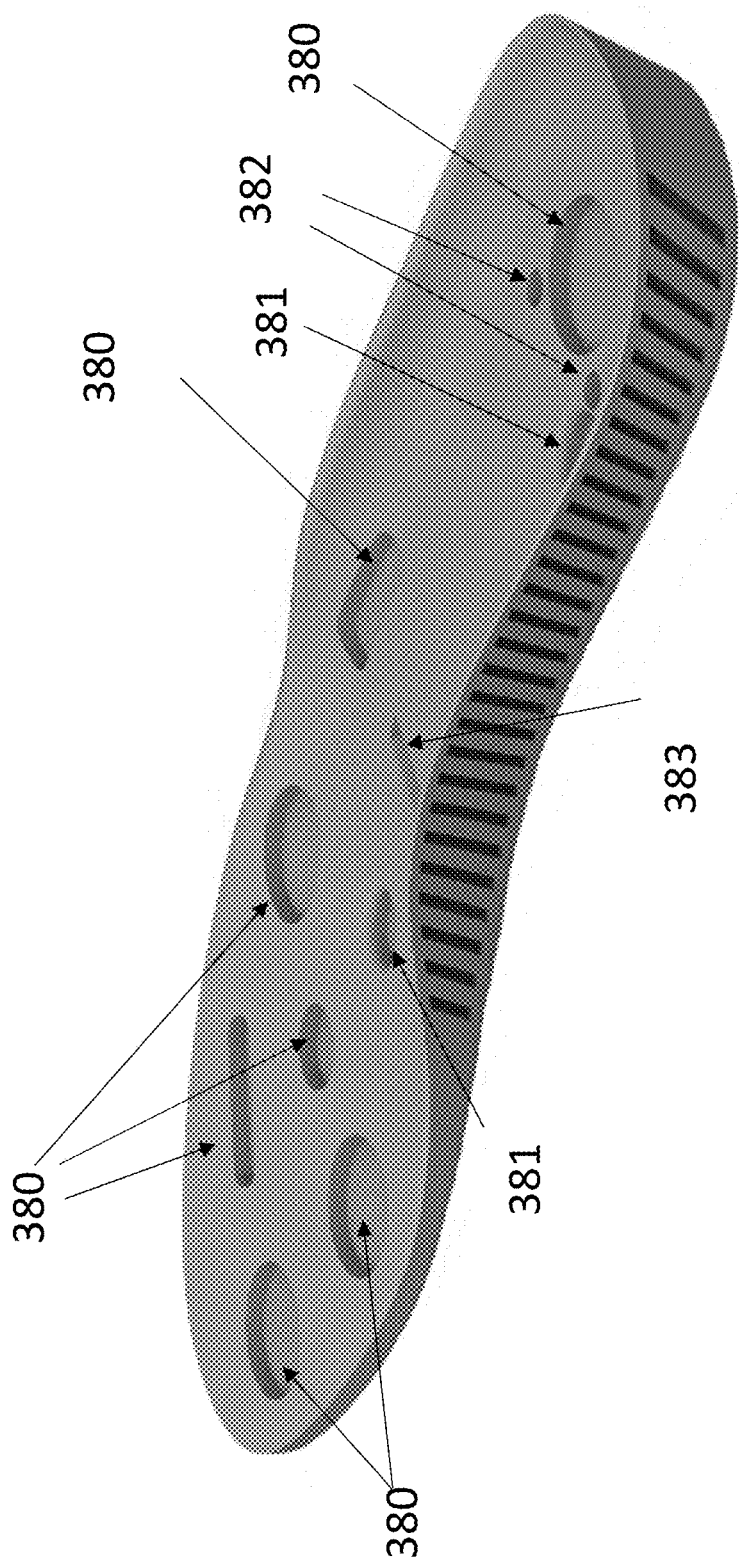
FIG. 10 is a top view of one embodiment of the smart footwear insole.

FIG. 10 is a top view of one embodiment of the smart footwear insole. The smart footwear insole includes at least one sensor cavity 380 for at least one force sensor, at least one motor cavity 381 for at least one vibration motor, at least one magnet cavity 382 for at least one magnet, and a hole for a plug 383 (e.g., for power).

Figures 11A, 11B, 11C:
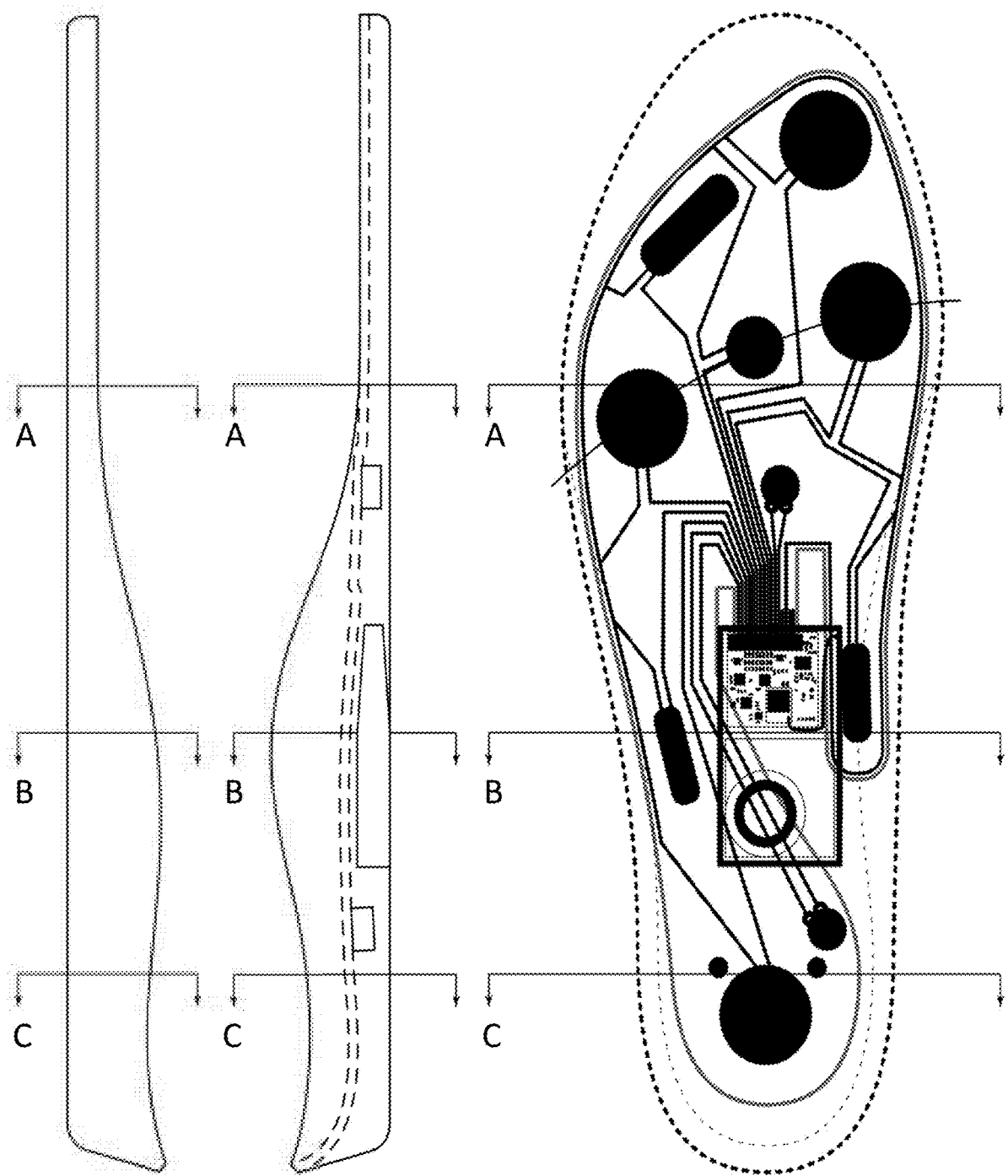
FIG. 11A is a lateral view of one embodiment of a smart footwear insole.
FIG. 11B is a medial view of one embodiment of the smart footwear insole shown in FIG. 11A.
FIG. 11C is a top view of one embodiment of the smart footwear insole shown in FIG. 11A.

FIG. 11A is a lateral view of one embodiment of a smart footwear insole. FIG. 11B is a medial view of one embodiment of the smart footwear insole shown in FIG. 11A. FIG. 11C is a top view of one embodiment of the smart footwear insole shown in FIG. 11A.

Figures 12A, 12B, 12C:
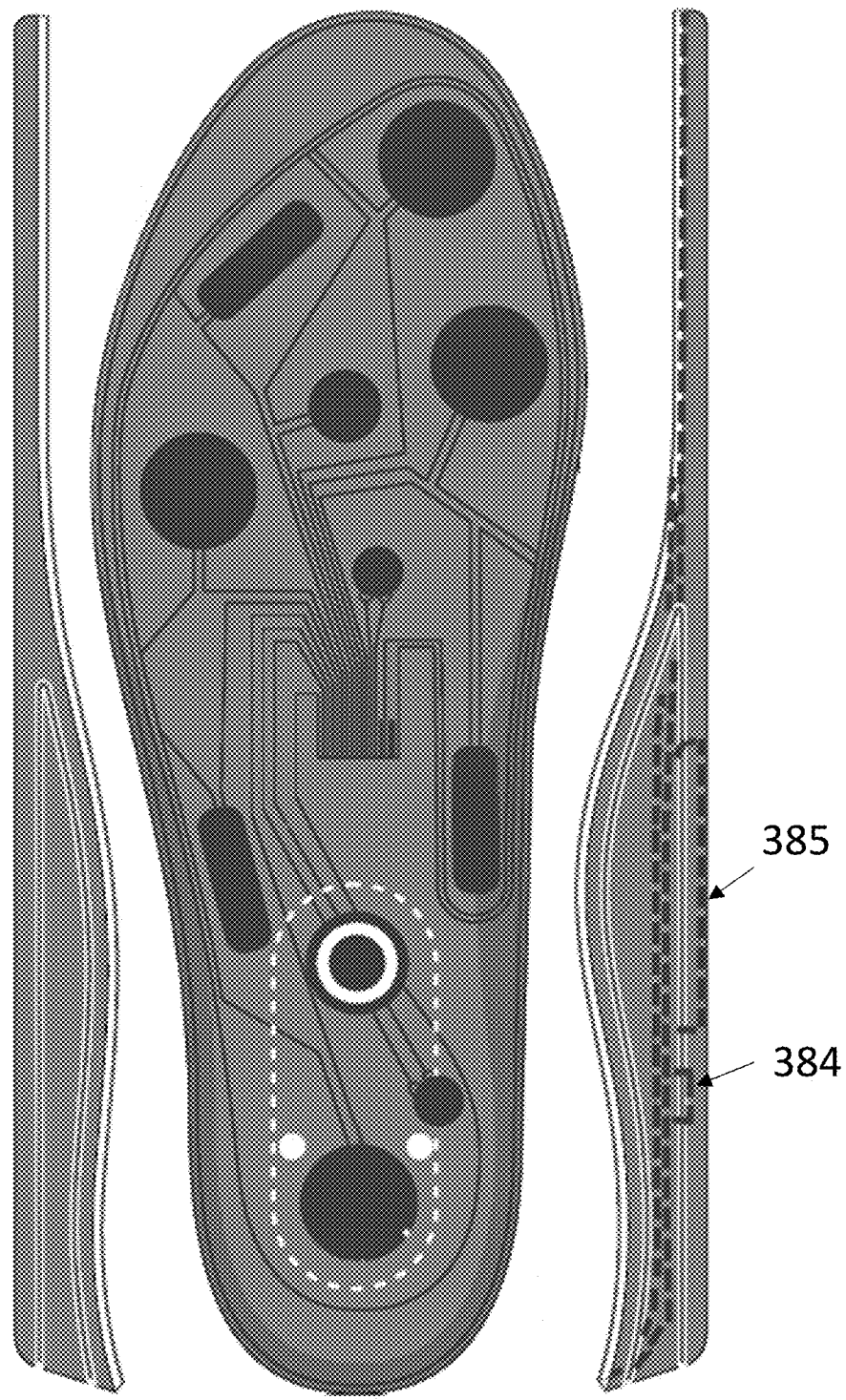
FIG. 12A is a lateral view of one embodiment of the smart footwear insole.
FIG. 12B is a top view of one embodiment of the smart footwear insole shown in FIG. 12A.
FIG. 12C is a medial view of one embodiment of the smart footwear insole shown in FIG. 12A.

FIG. 12A is a lateral view of one embodiment of a smart footwear insole. In one embodiment, the insole is made of ethylene-vinyl acetate (EVA) material. FIG. 12B is a top view of one embodiment of the smart footwear insole shown in FIG. 12A. FIG. 12C is a medial view of one embodiment of the smart footwear insole shown in FIG. 12A. FIG. 12C includes at least one motor cavity 381 for at least one vibration motor and a cavity for the printed circuit board housing 385.

Figures 13A, 13B, 13C:
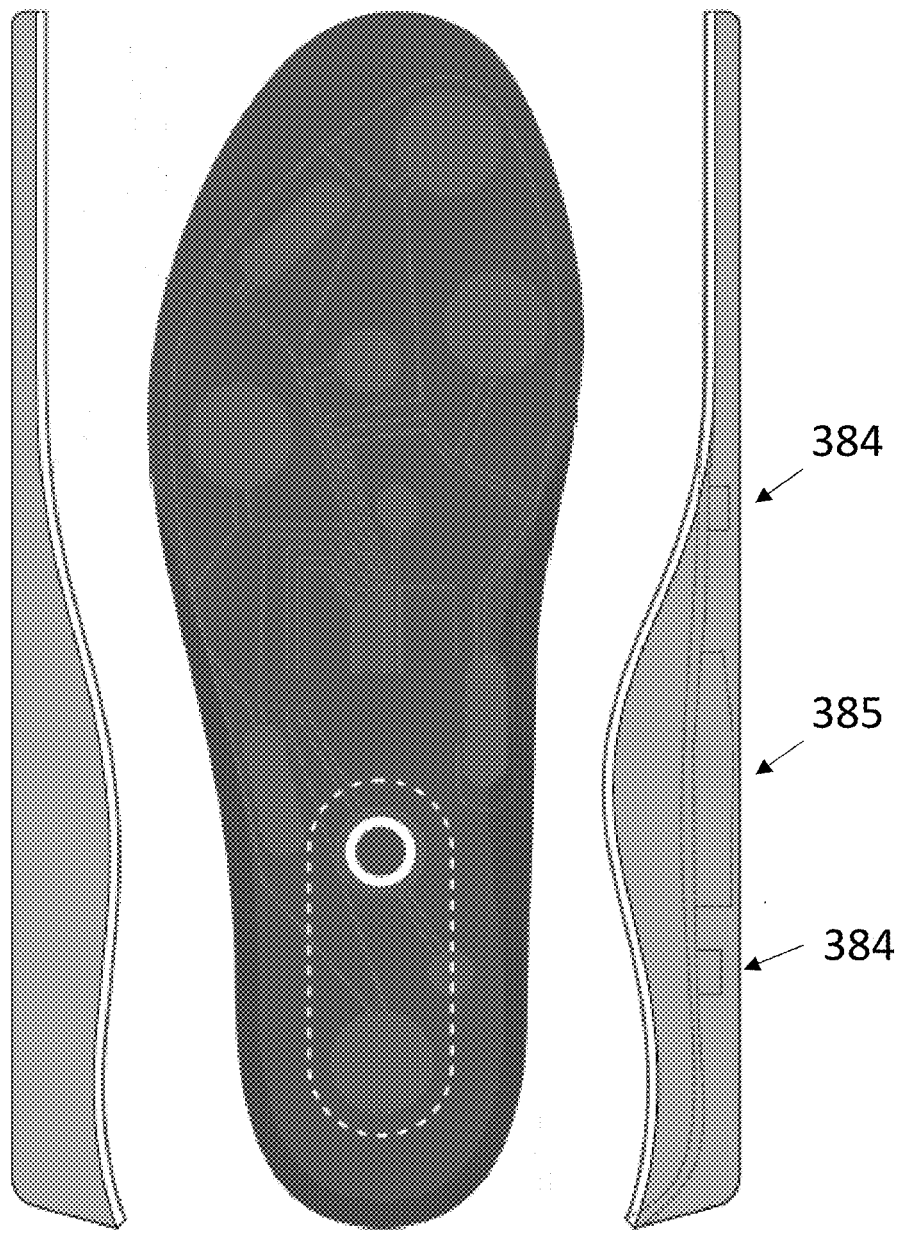
FIG. 13A is a lateral view of one embodiment of the smart footwear insole.
FIG. 13B is a top view of one embodiment of the smart footwear insole shown in FIG. 13A.
FIG. 13C is a medial view of one embodiment of the smart footwear insole shown in FIG. 13A.

FIG. 13A is a lateral view of one embodiment of a smart footwear insole. FIG. 13B is a top view of one embodiment of the smart footwear insole shown in FIG. 13A. FIG. 13C is a medial view of one embodiment of the smart footwear insole shown in FIG. 13A. FIG. 13C includes at least one motor cavity 381 for at least one vibration motor and a cavity for the printed circuit board housing 385.

FIG. 14A is a lateral view of one embodiment of a smart footwear insole. In one embodiment the insole is made of ethylene-vinyl acetate material. FIG. 14B is a bottom view of one embodiment of the smart footwear insole shown in FIG. 14A. FIG. 14C is a medial view of one embodiment of the smart footwear insole shown in FIG. 14A. FIG. 14C includes at least one motor cavity 381 for at least one vibration motor and a cavity for the printed circuit board housing 385.

Figures 15A, 15B, 15C:
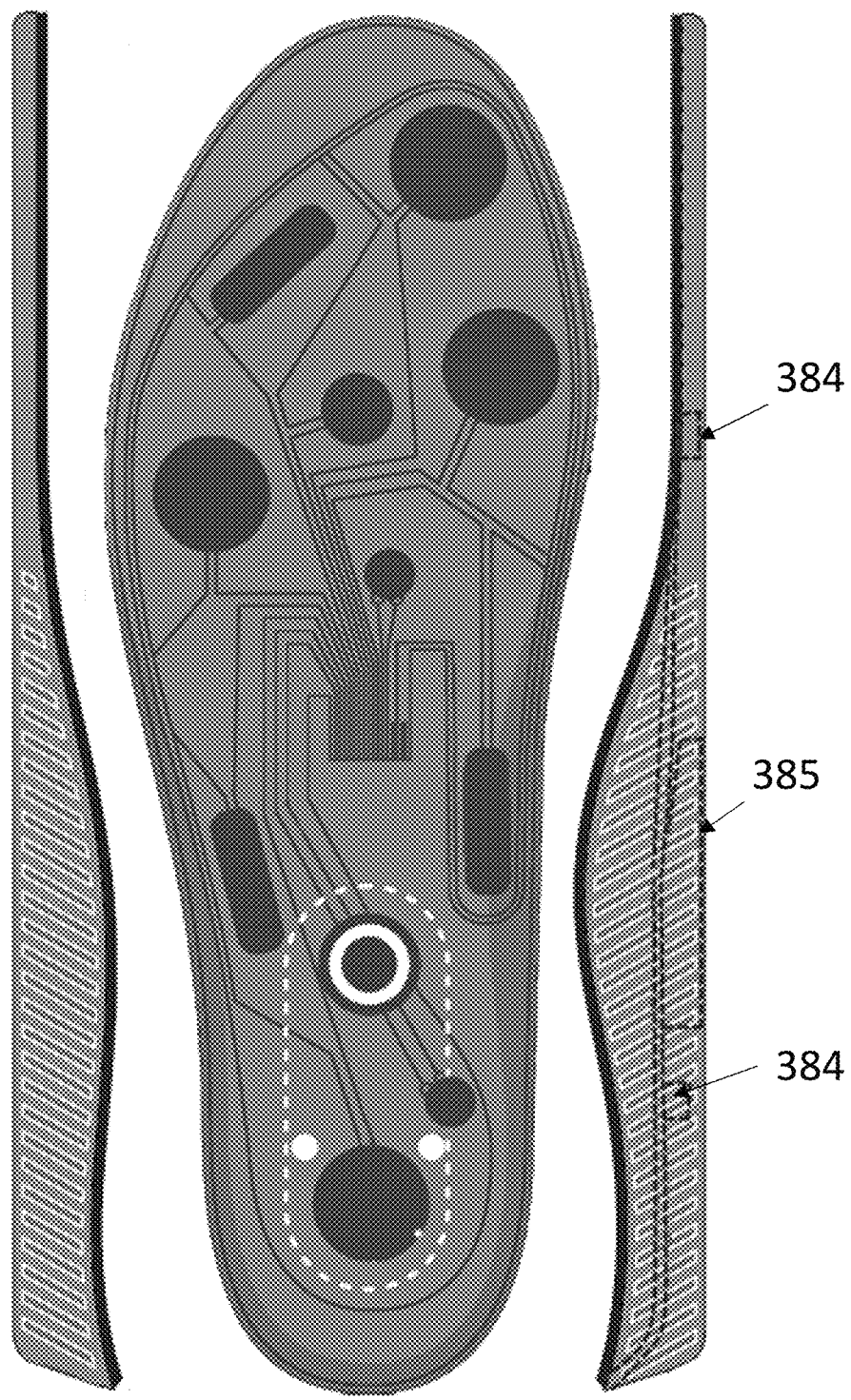
FIG. 15A is a lateral view of one embodiment of a smart footwear insole.
FIG. 15B is a top view of one embodiment of the smart footwear insole shown in FIG. 15A.
FIG. 15C is a medial view of one embodiment of the smart footwear insole shown in FIG. 15A.

FIG. 15A is a lateral view of one embodiment of a smart footwear insole. FIG. 15B is a top view of one embodiment of the smart footwear insole shown in FIG. 15A. FIG. 15C is a medial view of one embodiment of the smart footwear insole shown in FIG. 15A. FIG. 15C includes at least one motor cavity 381 for at least one vibration motor and a cavity for the printed circuit board housing 385.

Figures 16A, 16B, 16C:
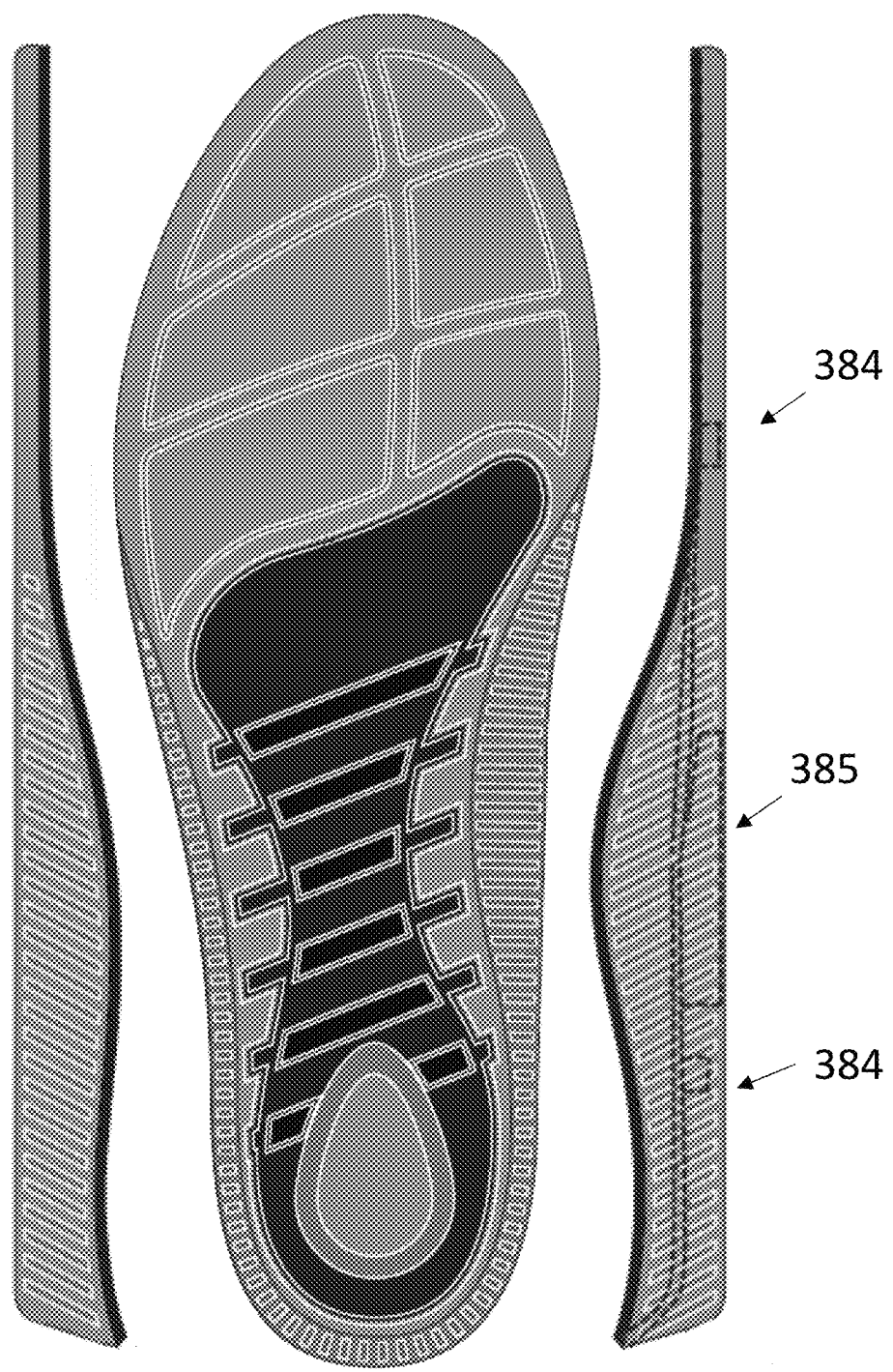
FIG. 16A is a lateral view of one embodiment of a smart footwear insole.
FIG. 16B is a bottom view of one embodiment of the smart footwear insole shown in FIG. 16A.
FIG. 16C is a medial view of one embodiment of the smart footwear insole shown in FIG. 16A.

FIG. 16A is a lateral view of one embodiment of a smart footwear insole. FIG. 16B is a bottom view of one embodiment of the smart footwear insole shown in FIG. 16A. FIG. 16C is a medial view of one embodiment of the smart footwear insole shown in FIG. 16A. FIG. 16C includes at least one motor cavity 381 for at least one vibration motor and a cavity for the printed circuit board housing 385.

Figures 17A, 17B, 17C:
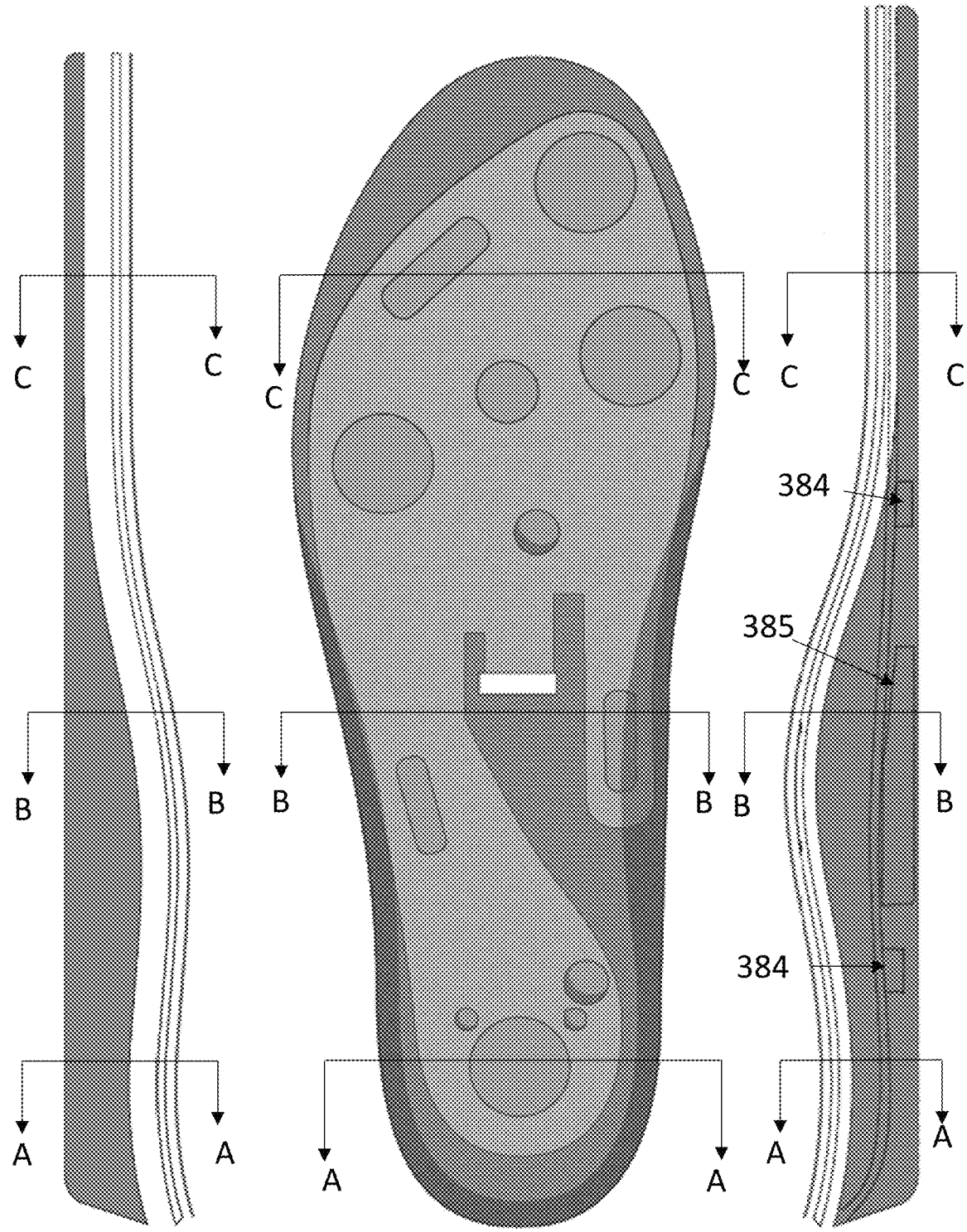
FIG. 17A is a lateral view of one embodiment of a smart footwear insole.
FIG. 17B is a top view of one embodiment of the smart footwear insole shown in FIG. 17A.
FIG. 17C is a medial view of one embodiment of the smart footwear insole shown in FIG. 17A.

FIG. 17A is a lateral view of one embodiment of a smart footwear insole. FIG. 17B is a top view of one embodiment of the smart footwear insole shown in FIG. 17A. FIG. 17C is a medial view of one embodiment of the smart footwear insole shown in FIG. 17A. FIG. 17C includes at least one motor cavity 381 for at least one vibration motor and a cavity for the printed circuit board housing 385.

Figures 18A, 18B, 18C:
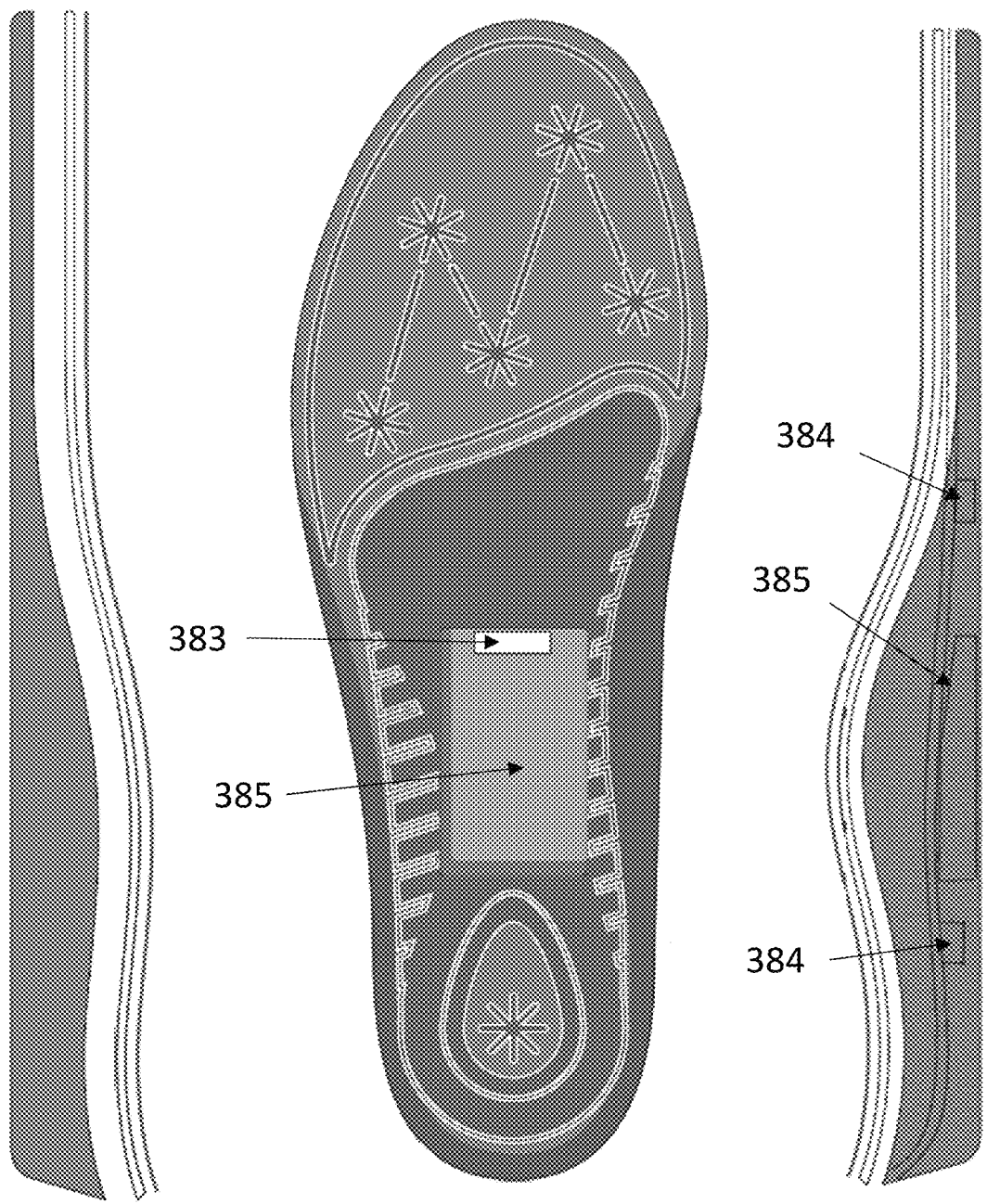
FIG. 18A is a lateral view of one embodiment of a smart footwear insole.
FIG. 18B is a bottom view of one embodiment of the smart footwear insole shown in FIG. 18A.
FIG. 18C is a medial view of one embodiment of the smart footwear insole shown in FIG. 18A.

FIG. 18A is a lateral view of one embodiment of a smart footwear insole. FIG. 18B is a bottom view of one embodiment of the smart footwear insole shown in FIG. 18A, including a cavity for the printed circuit board housing 385 and a hole for a plug 383. FIG. 18C is a medial view of one embodiment of the smart footwear insole shown in FIG. 18A. FIG. 18C includes at least one motor cavity 381 for at least one vibration motor and a cavity the printed circuit board housing 385.

Figures 19A, 19B, 19C:
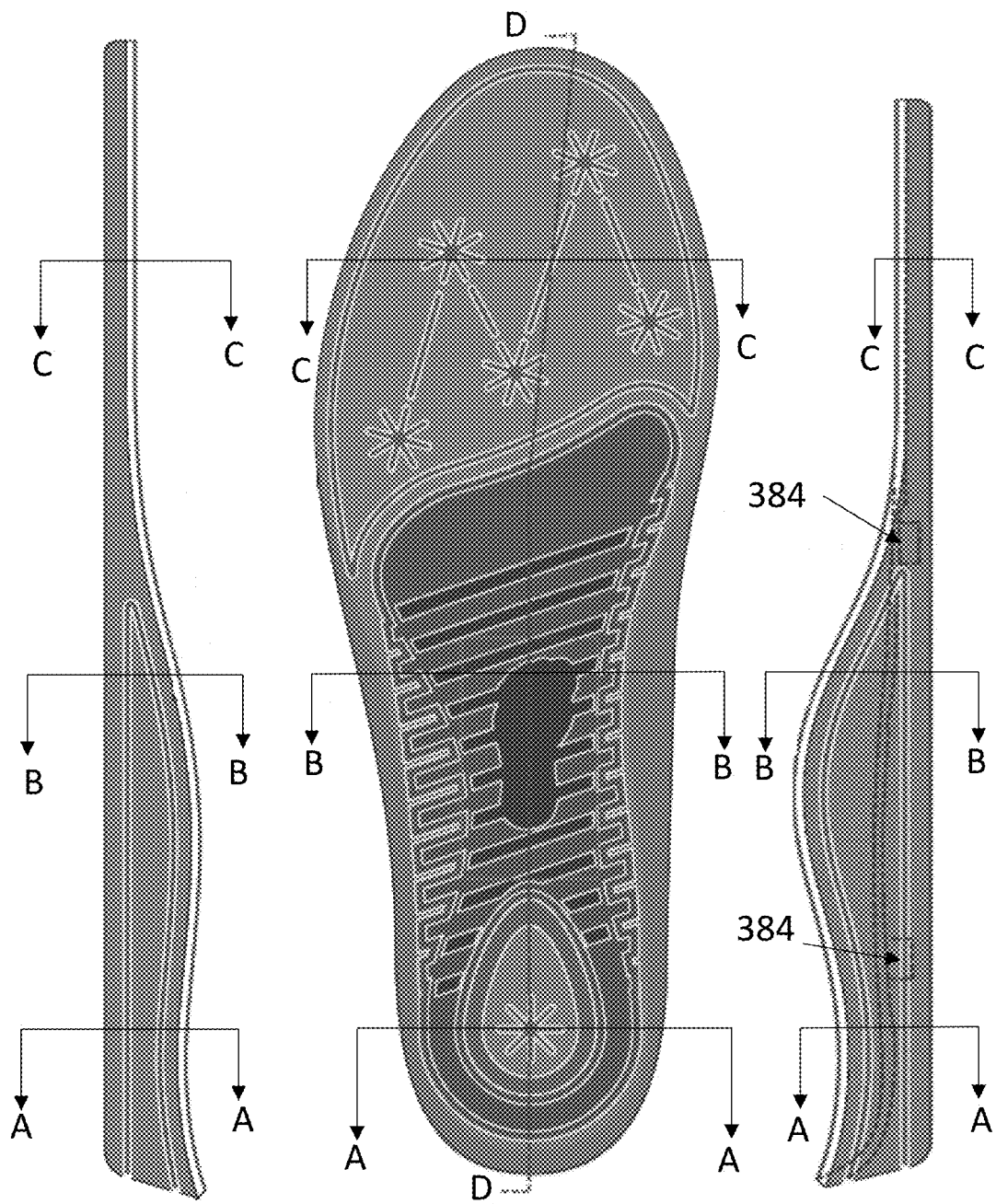
FIG. 19A is a lateral view of one embodiment of a smart footwear insole.
FIG. 19B is a bottom view of one embodiment of the smart footwear insole shown in FIG. 19A.
FIG. 19C is a medial view of one embodiment of the smart footwear insole shown in FIG. 19A.

FIG. 19A is a lateral view of one embodiment of a smart footwear insole. FIG. 19B is a bottom view of one embodiment of the smart footwear insole shown in FIG. 19A FIG. 19C is a medial view of one embodiment of the smart footwear insole shown in FIG. 19A. FIG. 19C includes at least one motor cavity 381 for at least one vibration motor.

Figure 20A:
FIG. 20A is a cross sectional view of the front of one embodiment of a smart footwear insole.
Figure 20B:
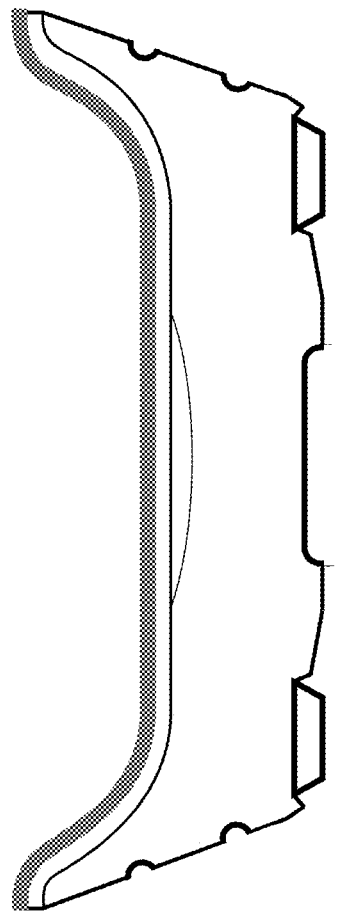
FIG. 20B is a cross sectional view of one embodiment of a smart footwear insole.
Figure 20C:
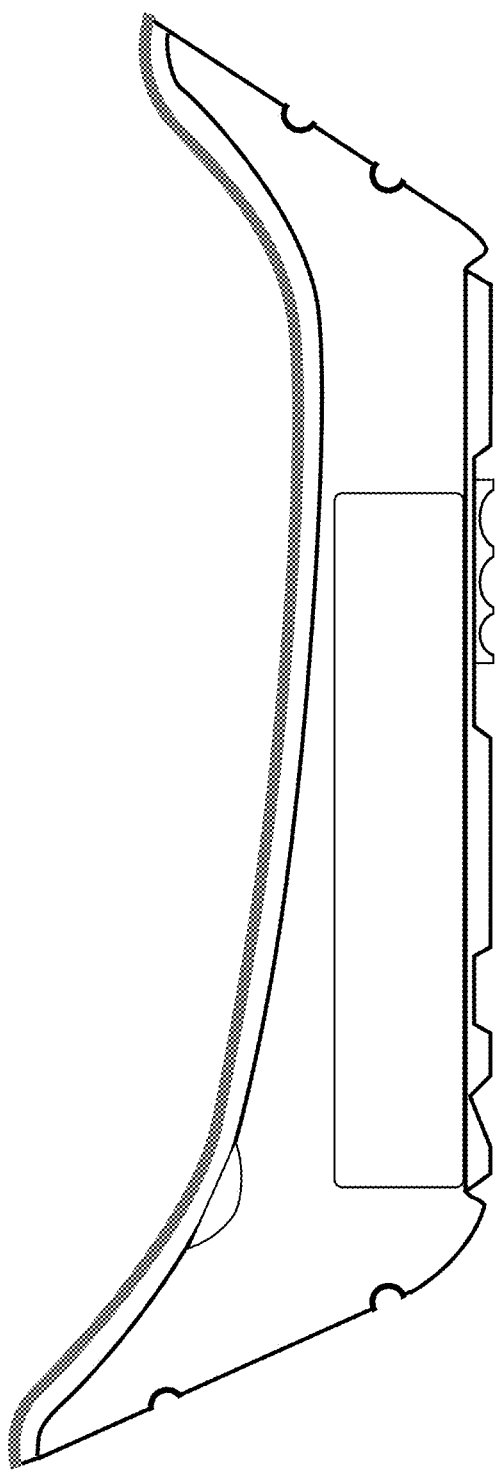
FIG. 20C is a cross sectional view of one embodiment of a smart footwear insole.
Figure 20D:
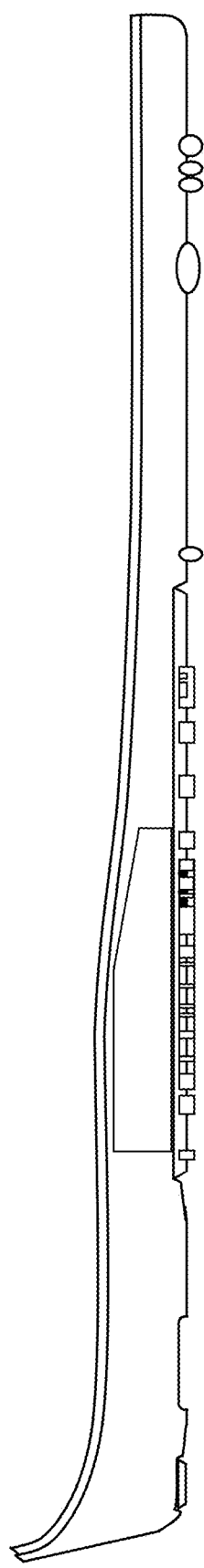
FIG. 20D is a medial view of one embodiment of a smart footwear insole.

FIG. 20A is a cross sectional view of the front of one embodiment of a smart footwear insole. FIG. 20B is a cross sectional view of one embodiment of a smart footwear insole. FIG. 20C is a cross sectional view of one embodiment of a smart footwear insole. FIG. 20D is a medial view of one embodiment of a smart footwear insole.

Figure 21B:
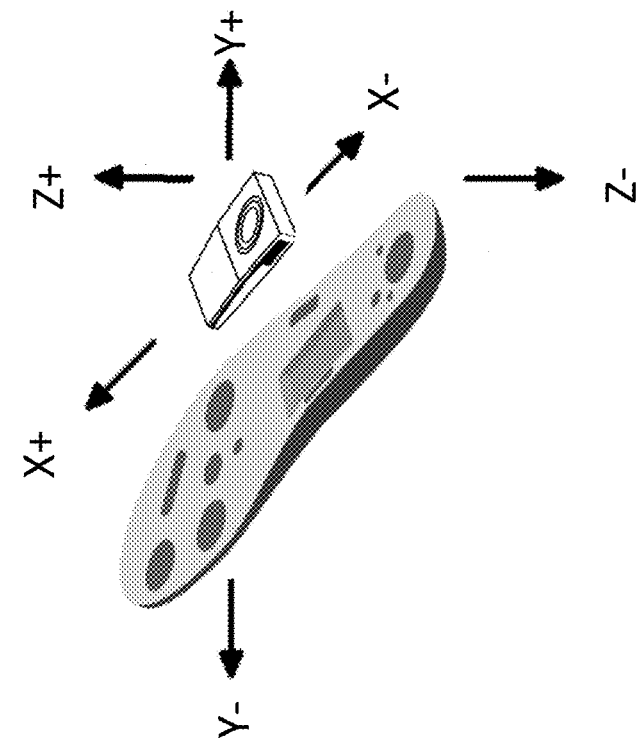
FIG. 21B illustrates the orientation of a magnetometer according to one embodiment of the present invention.
Figure 21A:
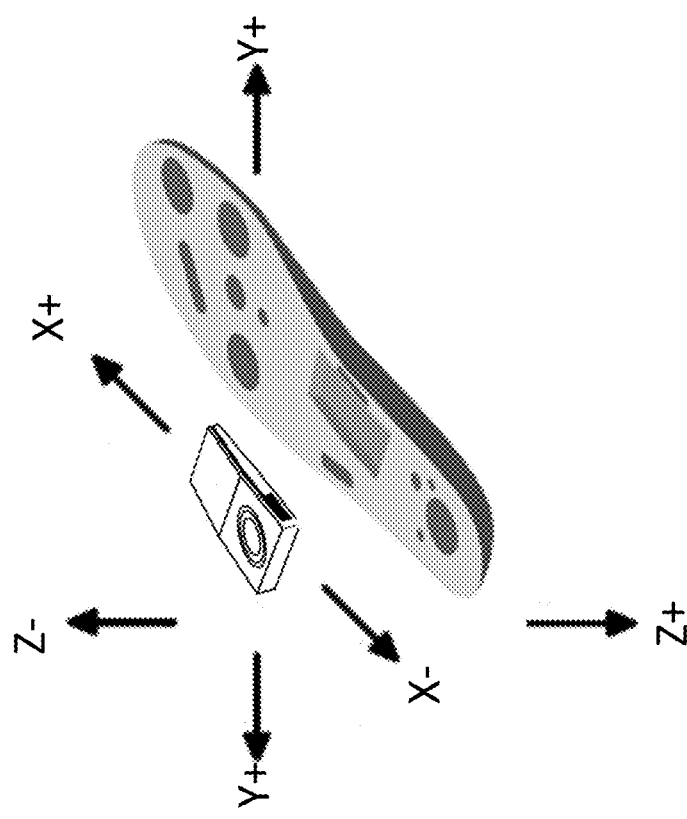
FIG. 21A illustrates the orientation of a magnetometer according to one embodiment of the present invention.

FIG. 21A illustrates the orientation of a magnetometer according to one embodiment of the present invention. The smart footwear system is operable to determine a direction of movement based on force applied to the smart footwear article. An applied force in the positive x direction correlates to forward movement and an applied force in the negative x direction correlates to a reverse movement. An applied force in the positive y direction correlates to leftward movement and an applied force in the negative y direction correlates to rightward movement. An applied force in the positive z direction correlates to downward movement and an applied force in the negative z direction correlates to a upward movement. FIG. 21B illustrates the orientation of a magnetometer according to one embodiment of the present invention. An applied force in the positive x direction correlates to forward movement and an applied force in the negative x direction correlates to a reverse movement. An applied force in the positive y direction correlates to rightward movement and an applied force in the negative y direction correlates to leftward movement. An applied force in the positive z direction correlates to upward movement and an applied force in the negative z direction correlates to a downward movement.

Figure 22B:
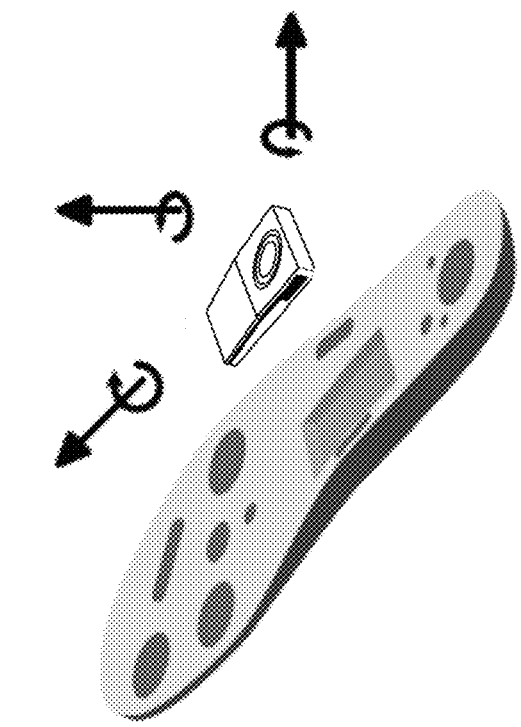
FIG. 22B illustrates the rotational orientation of a gyrometer according to one embodiment of the present invention.
Figure 22A:
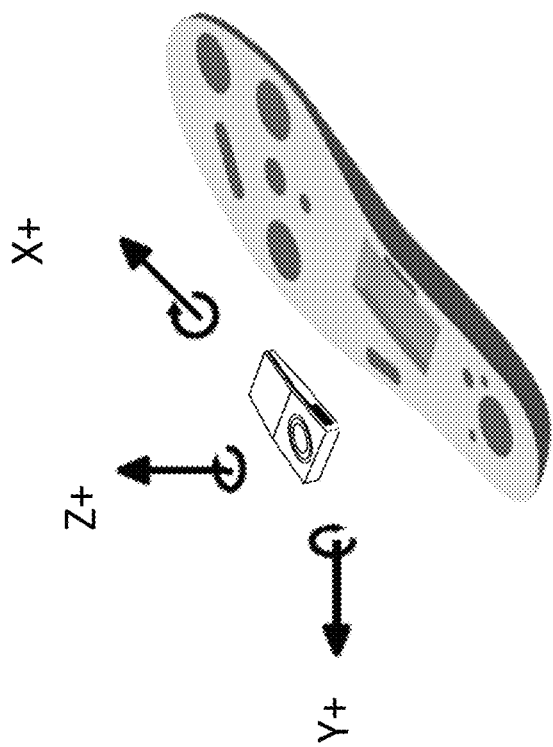
FIG. 22A illustrates the rotational orientation of a gyrometer according to one embodiment of the present invention.

FIG. 22A illustrates the rotational orientation of a gyroscope according to one embodiment of the present invention. An applied force in the positive x direction correlates to a clockwise rotation. An applied force in the positive y direction correlates to clockwise rear tilt down rotation movement. An applied force in the positive z direction correlates to clockwise rotation. FIG. 22B illustrates the rotational orientation of a gyroscope according to one embodiment of the present invention. An applied force in the positive x direction correlates to a clockwise rotation. An applied force in the positive y direction correlates to a counter clockwise forward tilt down rotation. An applied force in the positive z direction correlates to a counter clockwise rotation.

FIG. 23A illustrates the smart footwear article 100 according to one embodiment of the present invention. In one embodiment, the smart footwear insole is embedded in a sandal 390. Alternatively, in another embodiment, the smart footwear insole is removable. For example, and not limitation, the smart footwear insole attaches to the sandal via magnets or is attachable by pressing the insole into the sandal. In a preferred embodiment, the sandal is adjustable using hook and loop table (e.g. VELCRO), at least one snap, at least one buckle, at least one strap, and/or at least one ring (e.g., D-ring). The sandal preferably has at least one strap over the arch of the foot. In another embodiment, the sandal has at least one strap around the heel. FIG. 23B illustrates the smart footwear insole inserted into the sandal.

Figure 24:
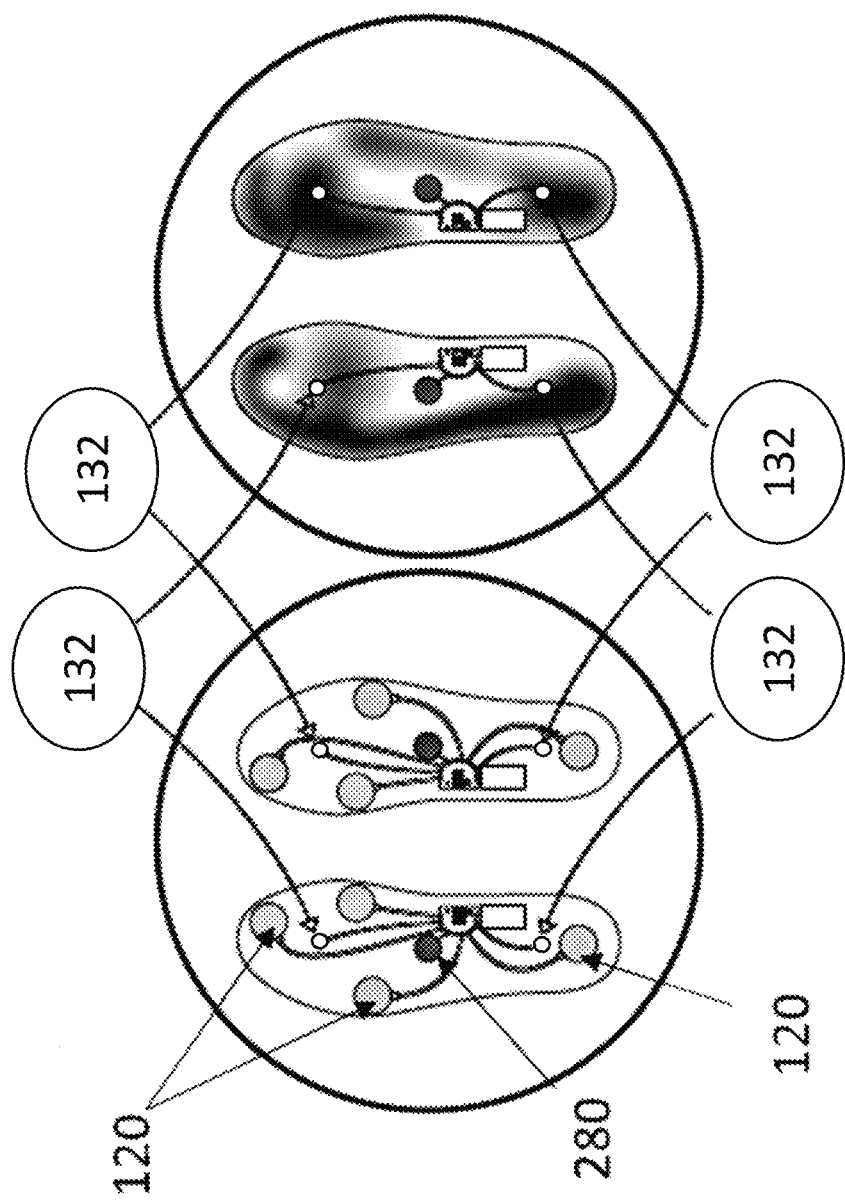
FIG. 24 illustrates one embodiment of a smart footwear article according to the present invention.

FIG. 24 illustrates one embodiment of a smart footwear article that includes force sensors 120, vibration motors 132, a wireless charging receiver 280 on the left side of the figure and a corresponding heat map on the right side of the figure.

Charging

Figure 25A:
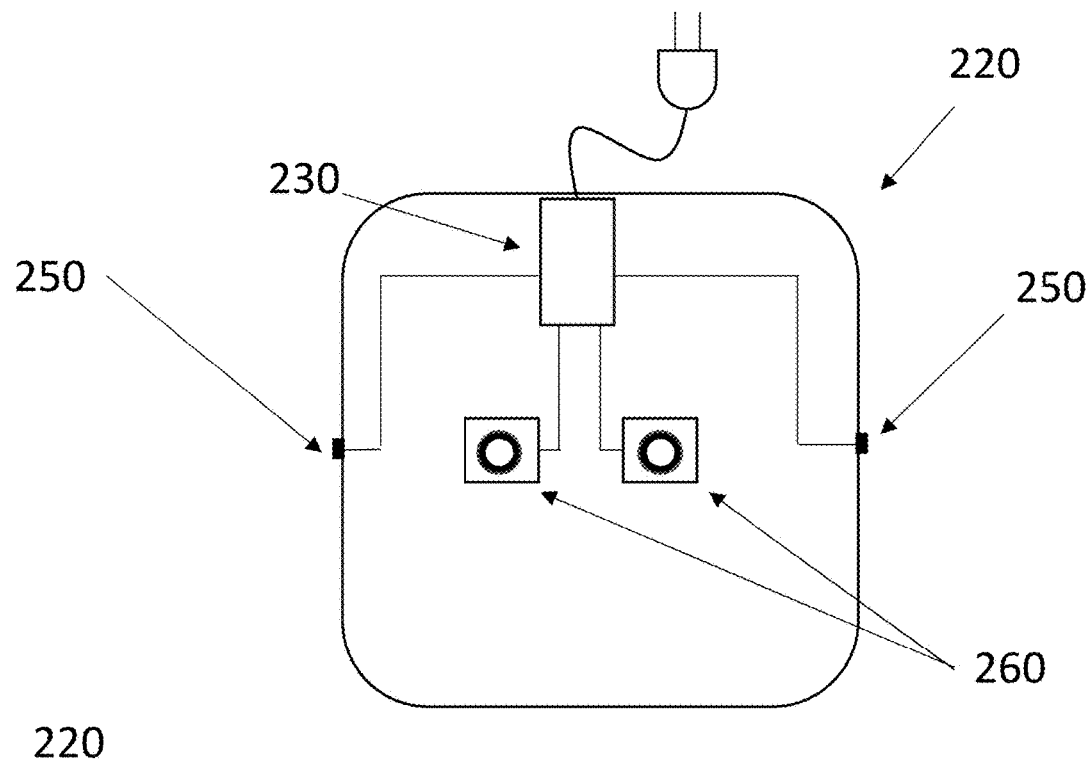
FIG. 25A illustrates an outline of a wireless charging mat according to one embodiment of the present invention.
Figure 25B:
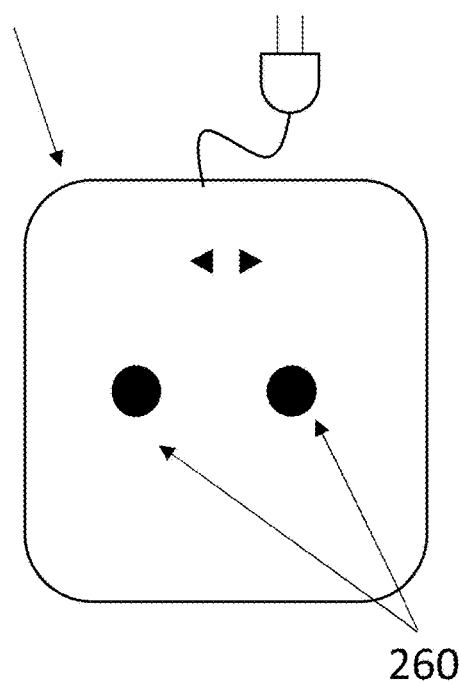
FIG. 25B illustrates a wireless charging mat according to one embodiment of the present invention.
Figure 25C:
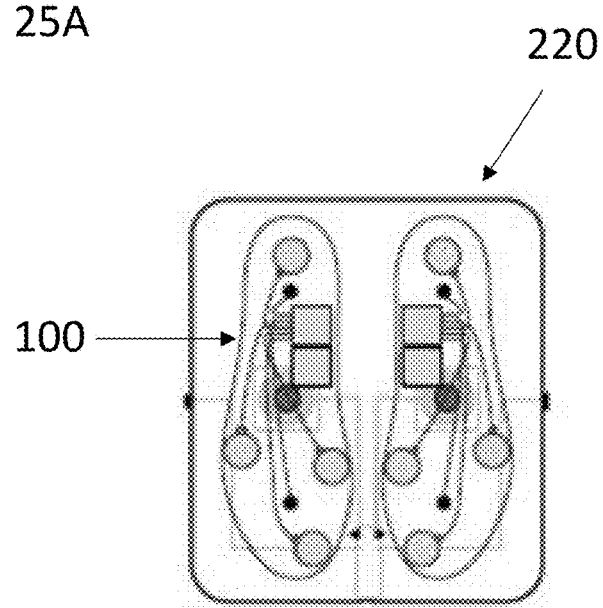
FIG. 25C illustrates a wireless charging mat wirelessly charging a smart footwear article according to one embodiment of the present invention.

FIG. 25A illustrates an outline of a wireless charging mat 220 according to one embodiment of the present invention. The wireless charging mat 220 includes at least one USB connector 250 (e.g., USB female connector), a charging circuit chip 230, and a wireless charging transmitter 260. The charging circuit chip includes an LED state indicator. FIG. 25B illustrates another embodiment of the wireless charging mat 220. FIG. 25C is an illustrative embodiment of the wireless charging mat 220 wirelessly charging a smart footwear article 100.

Figures 26A, 26B:
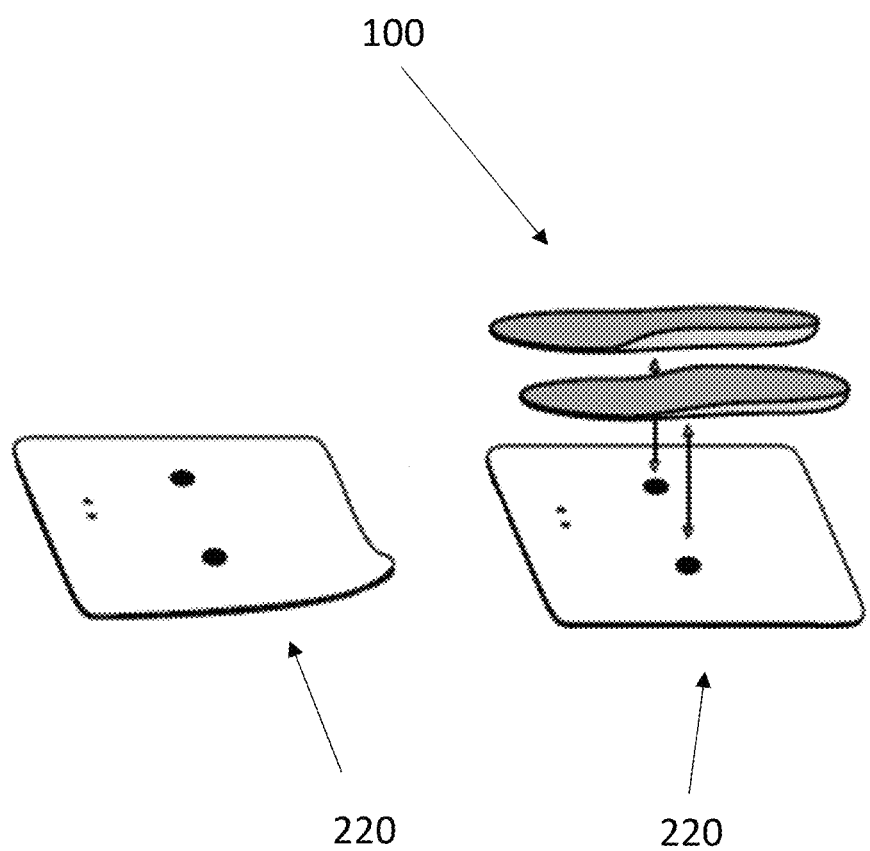
FIG. 26A illustrates a method of attaching the smart footwear article to the wireless charging mat according to one embodiment of the present invention.
FIG. 26B illustrates a method of attaching the smart footwear article to the wireless charging mat according to one embodiment of the present invention.

FIGS. 26A and 26B illustrate one method of attaching the smart footwear article 100 to the wireless charging mat 220. The wireless charging mat 220 is configured to use magnets, buttons, and/or other means of localized attachment to keep the smart footwear article 100 properly attached to the changing mat. In one embodiment, the wireless charging mat includes a wireless charging transmission coil, a circuit, and at least one USB connector (e.g., a USB female connector). FIG. 26A illustrates the wireless charging mat 220 without the smart footwear articles. FIG. 26B illustrates how to position the smart footwear articles 100 to charge using the wireless charging mat 220.

Figure 27:
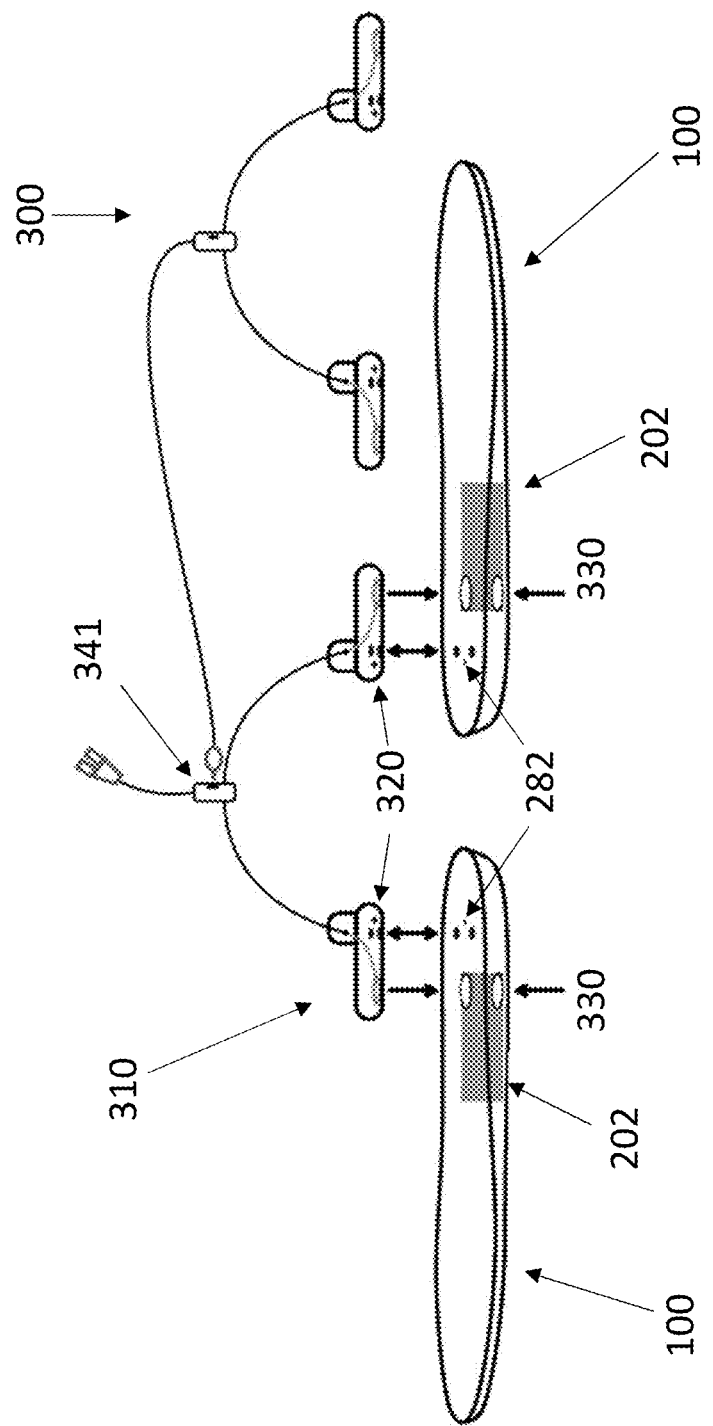
FIG. 27 is an illustrative embodiment of the present invention including a wireless charging system.

FIG. 27 is an illustrative embodiment of the present invention including a wireless charging system 300. The wireless charging system includes a power transmitting unit 310 that is embedded with magnets 320. The smart footwear system is configured for USB connection for modular charging systems. The magnets 320 in the power transmitting unit 310 secure the charger into place on the smart footwear 100. The smart footwear 100 is configured so that the wireless charging receiver coil 330 is on top and bottom of PCB enclosure 202. The wireless charging system 300 is configured to charge from top and bottom of the smart footwear 100. The wireless charging system 300 is operable to be placed inside of footwear so the insole will charge while the smart footwear is inside a footwear and while the footwear is being worn. The wireless charging system further includes a USB connection port 341.

Figure 28:
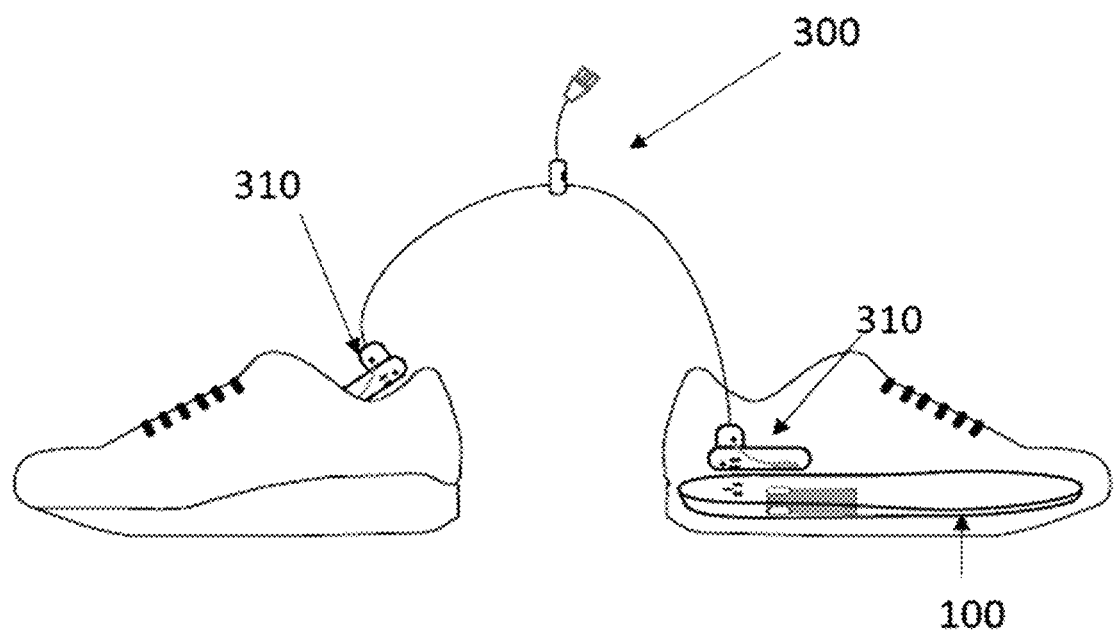
FIG. 28 is an illustrative embodiment of the wireless charging system according to one embodiment of the present invention.

FIG. 28 is an illustrative embodiment of the wireless charging system according to one embodiment of the present invention. The wireless charging system 300 is configured to be placed inside footwear (e.g., shoe) to charge the smart footwear article 100 (e.g., insole) while inside the footwear.

The present invention is configured to capture sensor data in real-time using sensor embedded footwear, wherein the sensor embedded footwear captures the force, inertial measurement unit, pitch, and magnetometer (IMU) sensor data. The footwear data can be interpreted in various ways to intuitively control movement or locomotion of the wearer's first-person character (avatar) in virtual reality (VR), and a similarly controlled presence extending robotic systems. The present invention is further configured to activate multiple vibration motors strategically placed within the footwear, underneath the wearer's feet in patterns. In response to specific input methods employed to control locomotion, (of one's virtual avatar in a virtual simulated environment, or controlled robot using a similar immersive VR like viewport while the wearer in real life remains in a contained position) specific patterns of haptic/vibration motor activation can reaffirm directional first person locomotion and alleviate motion sickness. The present invention also provides haptic feedback to simulate an instructional nudge or physiological response as well as alleviate pain or stimulate blood flow to a user's foot.

The present invention is also configured to analyze a wearer during predefined movements. The smart footwear system is operable to determine a user's weight distribution, momentum, balance, foot angle, direction, and orientation during a predefined movement. A predefined movement includes, but is not limited to, an athletic movement (e.g. golf swing or free throw in basketball) and a dance movement (e.g. moon walk).

In another embodiment, the smart footwear system is used for golfing. The smart footwear system captures a range of motion and pressure data from a golfer's feet. The smart footwear system captures data before, during, and after a golfer's swing. The smart footwear system is operable to provide haptic feedback to correct a golfer's swing. For example, and not limitation, if a user is leaning away from the ball so that they are off balance, the smart footwear system is configured to use the vibration motors near the toes to indicate that more pressure and/or weight needs to be applied to the front of the shoes. The smart footwear system is operable so the haptic feedback moves in relation to a golfer's center of mass. For example, and not limitation, when a golfer goes from applying excess pressure on their toes to evenly distributing the pressure, the smart footwear system is operable to send a vibration down the smart footwear article to illustrate the change in pressure. The smart footwear system is further configured to monitor weight shift during a golfer's backswing. The smart footwear system uses pressure and/or force data to monitor changes in a golfer's weight during the backswing. If a golfer is not shifting enough weight, then the system is configured to provide haptic feedback (e.g. activate a vibration motor) along the outer edge of a golfer's foot, indicating that the golfer should shift apply more pressure in that direction.

In yet another embodiment, the smart footwear system is used for medical applications. The smart footwear system is operable to monitor changes in a user's gait, range of motion, applied pressure, and other physical movements. The smart footwear system is operable to indicate any changes in a wearer's movements that could cause a user pain in the future. The smart footwear system applies haptic feedback (e.g. activate a vibration motor) to a user's feet to indicate when a user is doing something wrong or potentially harmful. For example, if a user is favoring one side of their body while standing or walking or running, then the system will provide haptic feedback on the non-favored side to indicate that additional pressure needs to be applied to the non-favored side. The smart footwear system is further configured to send an alert or message to at least one remote device to indicate when a user is favoring one side of their body or showing other indicators of potentially harmful habits.

Figure 29:
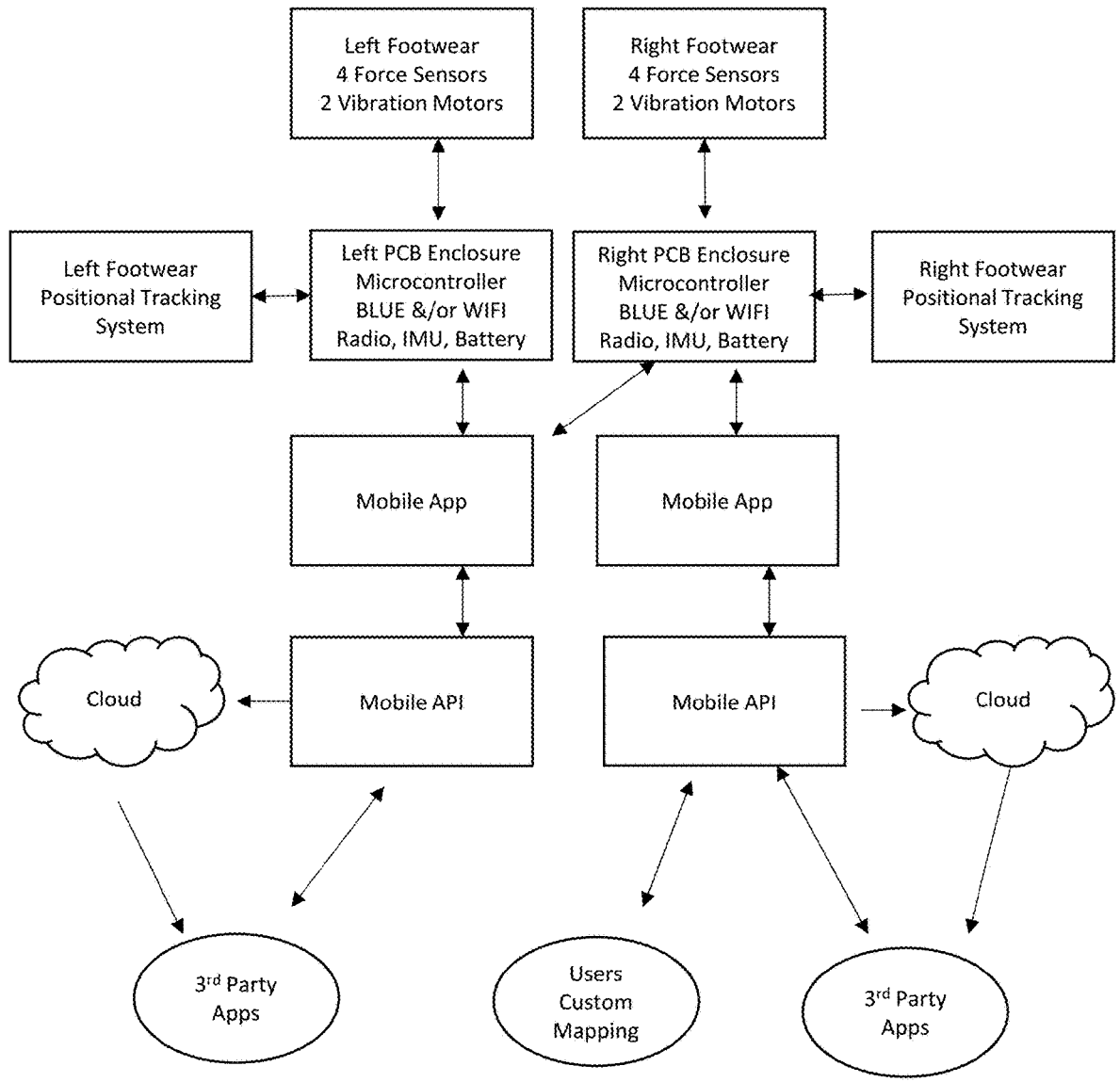
FIG. 29 is a diagram of an illustrative hardware and software environment according to a particular embodiment.

FIG. 29 is a diagram of an illustrative hardware and software environment according to a particular embodiment. In this embodiment, the smart footwear system includes at least one smart footwear article. The at least one smart footwear article includes at least one force sensor (e.g., 4 force sensors) and at least one vibration motor (e.g., 2 vibration motors). The force sensors and the vibration motors are electronically connected to a printed circuit board (e.g., via a wired connection). The printed circuit board further includes a microcontroller, a transceiver, a battery, and/or an accelerometer. Alternatively, the force sensors and the multiplicity of vibration motors are wirelessly connected to the components on the printed circuit board.

According to one embodiment, the multiplicity of electronic units is housed in separate PCB enclosures. In one embodiment, the multiplicity of electronic units attaches via magnets and spring-loaded connectors to the PCB enclosure. The electronic units are configured for wired and/or wireless connection with a positional tracking system. The positional tracking system includes positional or motion tracking sensor units. The multiplicity of electronic units is configured to wirelessly connect to at least one remote device (e.g., smartphone, tablet, laptop, desktop). The present invention includes a software application with an application programming interface (API) on the remote device. The system is operable to transmit footwear sensor data and vibration motor operations to and from the at least one remote device, a cloud server, a third-party application, or an API.

Figure 30:
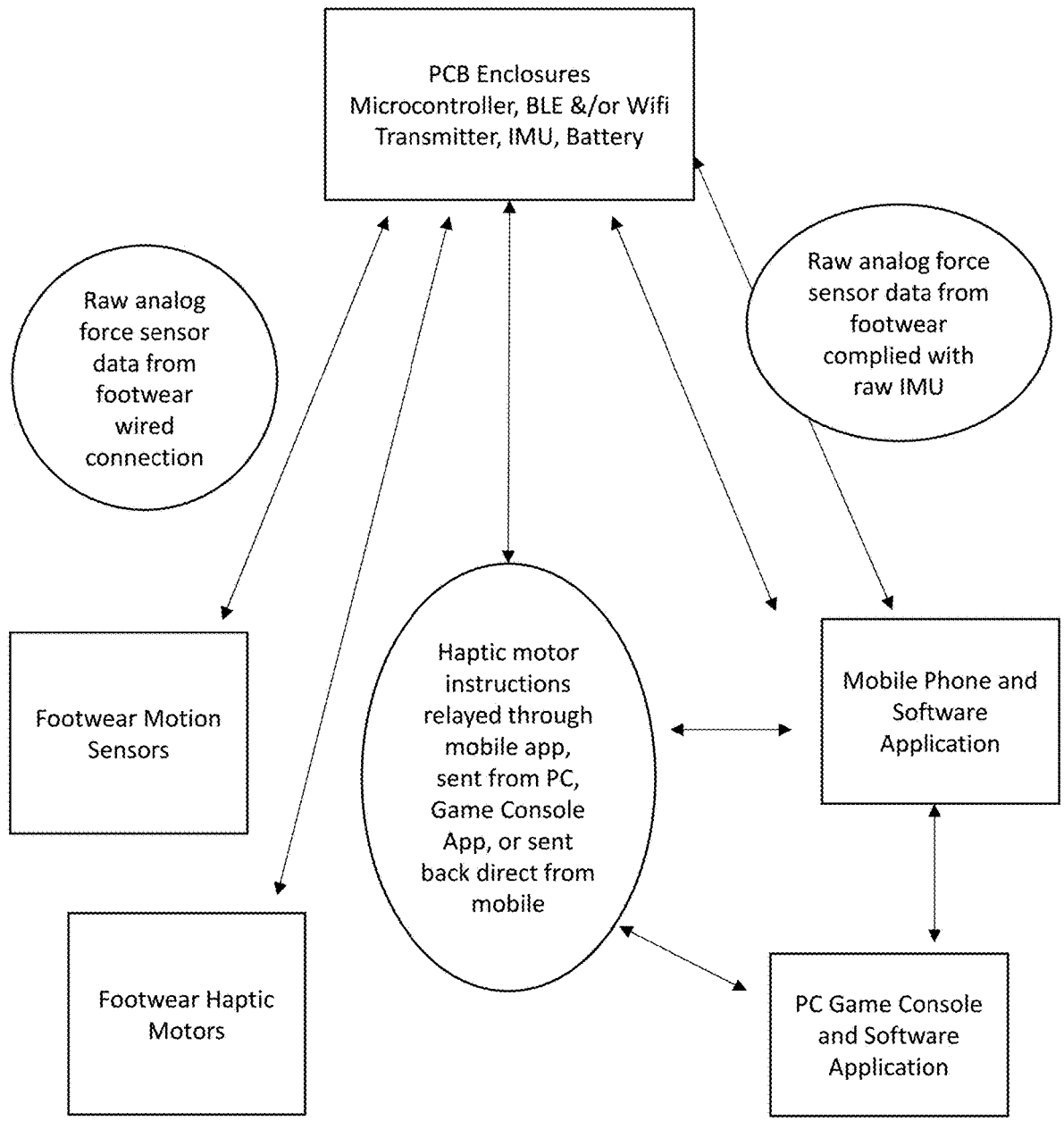
FIG. 30 is a block diagram of a smart footwear system according to one embodiment of the present invention.

FIG. 30 is a block diagram of an embodiment of a smart footwear system. The software is executed by a processor (e.g., microcontroller) that relays raw sensor data to an application (e.g., mobile application). Haptic motor instructions are relayed through the mobile application. FIG. 30 illustrates how the software functions as a controller interface and facilitates direct two-way wireless connectivity in such a manner that a remote or onboard application handles sensor data processing to be sent back as haptic motor instructions. The system is also configured to process sensor data from third-party applications.

Figure 31:
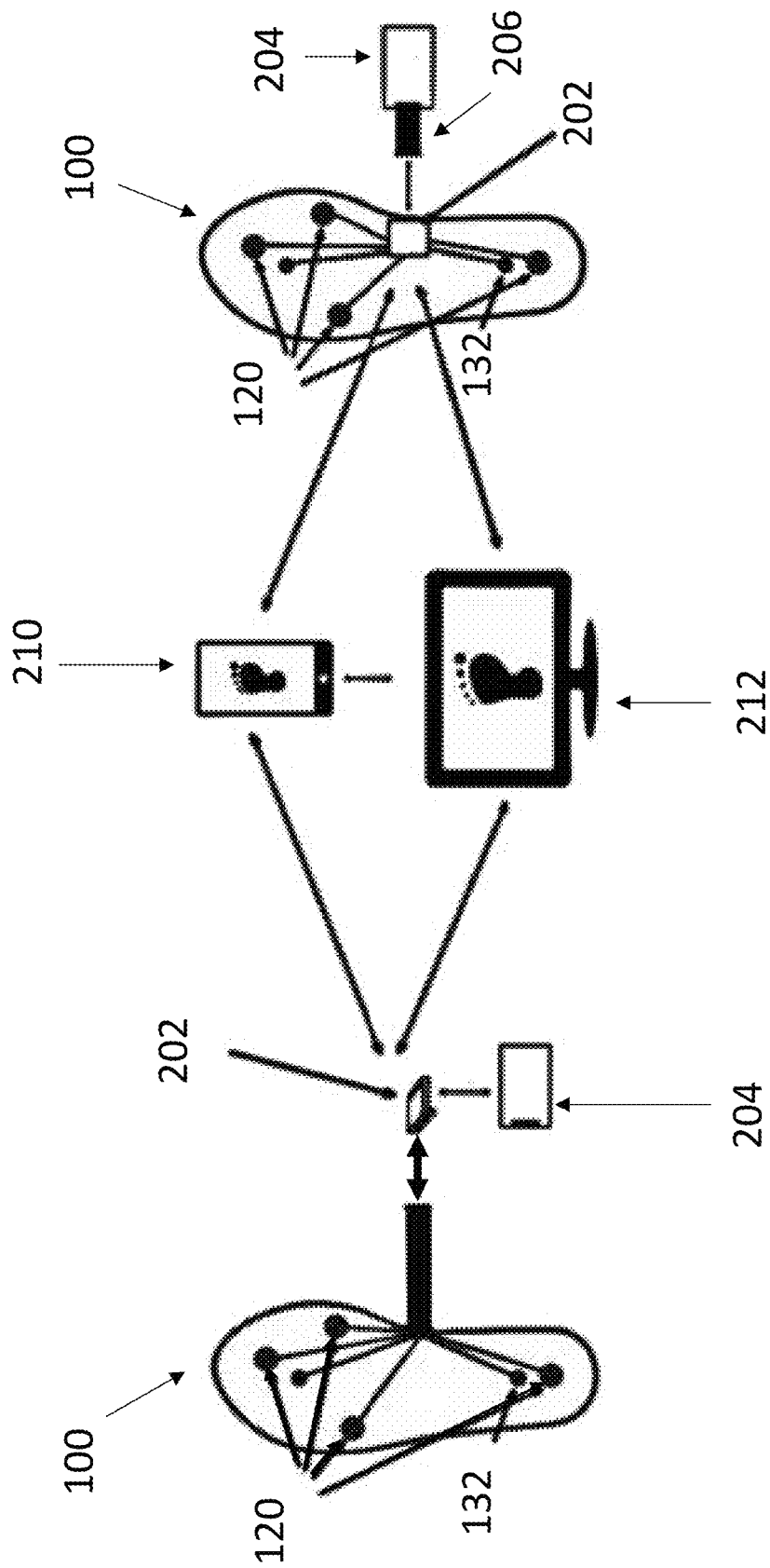
FIG. 31 illustrates another embodiment of a smart footwear system.

FIG. 31 illustrates another embodiment of a smart footwear system. In this embodiment, the present invention includes a smart footwear article 100. The smart footwear article 100 includes a printed membrane circuit with embedded force sensors 120 and vibration motors 132. The smart footwear article 100 further includes a printed circuit board housing 202. The printed circuit board enclosure housing 202 includes a microprocessor, transceiver, inertial measurement unit, accelerometer, and/or a battery. The printed circuit board enclosure housing 202 is connected to the printed membrane circuit via a wired connection. In one embodiment, the printed circuit board enclosure housing 202 is configured for wireless connection to the printed membrane circuit. The printed circuit board enclosure housing 202 is further operable for wired connection with additional hardware 204 (e.g., other sensors and batteries) via a connector 206 that mates with the smart footwear article. The smart footwear system is configured to wirelessly communicate with a software application and a software application controller. The smart footwear system of the present invention further includes a mobile application 210 and a PC/desktop application 212. The mobile application 210 and PC/desktop application 212 are configured for wireless communications with the smart footwear article 100, at least one remote server, at least one peripheral device, at least one external information source, and/or at least one environment.

Figure 32:
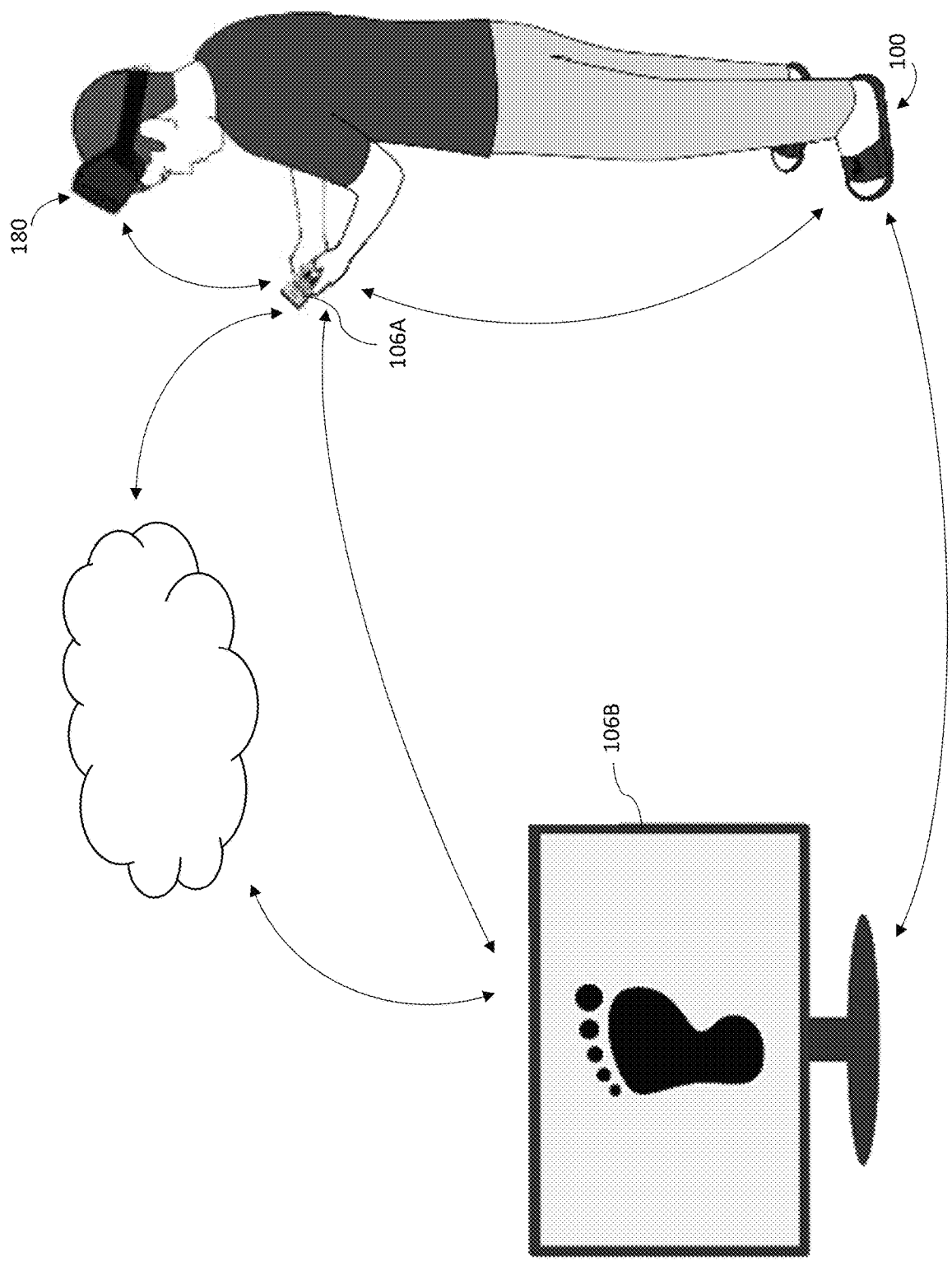
FIG. 32 is a diagram of paths of connectivity for a smart footwear system platform using hardware and software.

FIG. 32 is a diagram of paths of connectivity for a smart footwear system platform using hardware and software. The smart footwear article 100 is operable to connect to a first remote device (e.g., smartphone) 106A, a second remote device (e.g., personal computer (PC)) 106B, and virtual reality (VR) headset 180 via wireless communication (e.g., WI-FI, BLUETOOTH). Footwear data collected from a user is transmitted from a mobile application on the first remote device (e.g., smartphone) 106A through an application programming interface (API) to a cloud database. The second remote device utilizes an API to communicate with the cloud database.

Figure 33A:
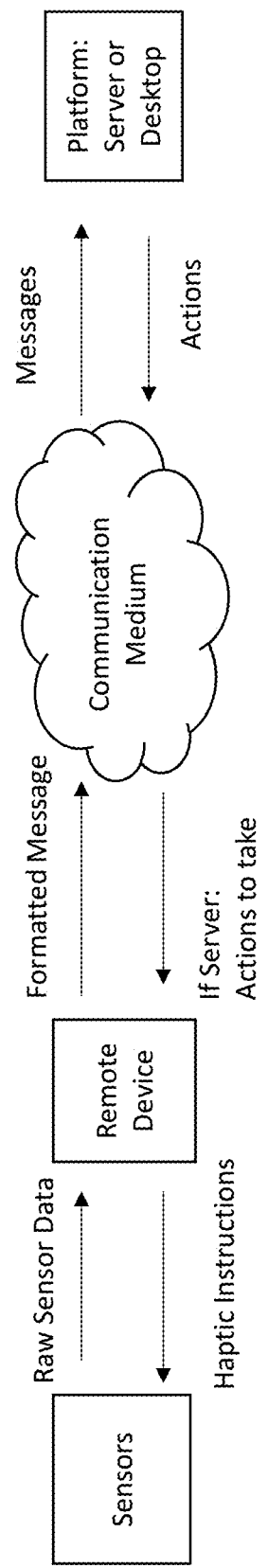
FIG. 33A is a diagram of an illustrative embodiment of a footwear-controlled computing system with associated processes.
Figure 33B:
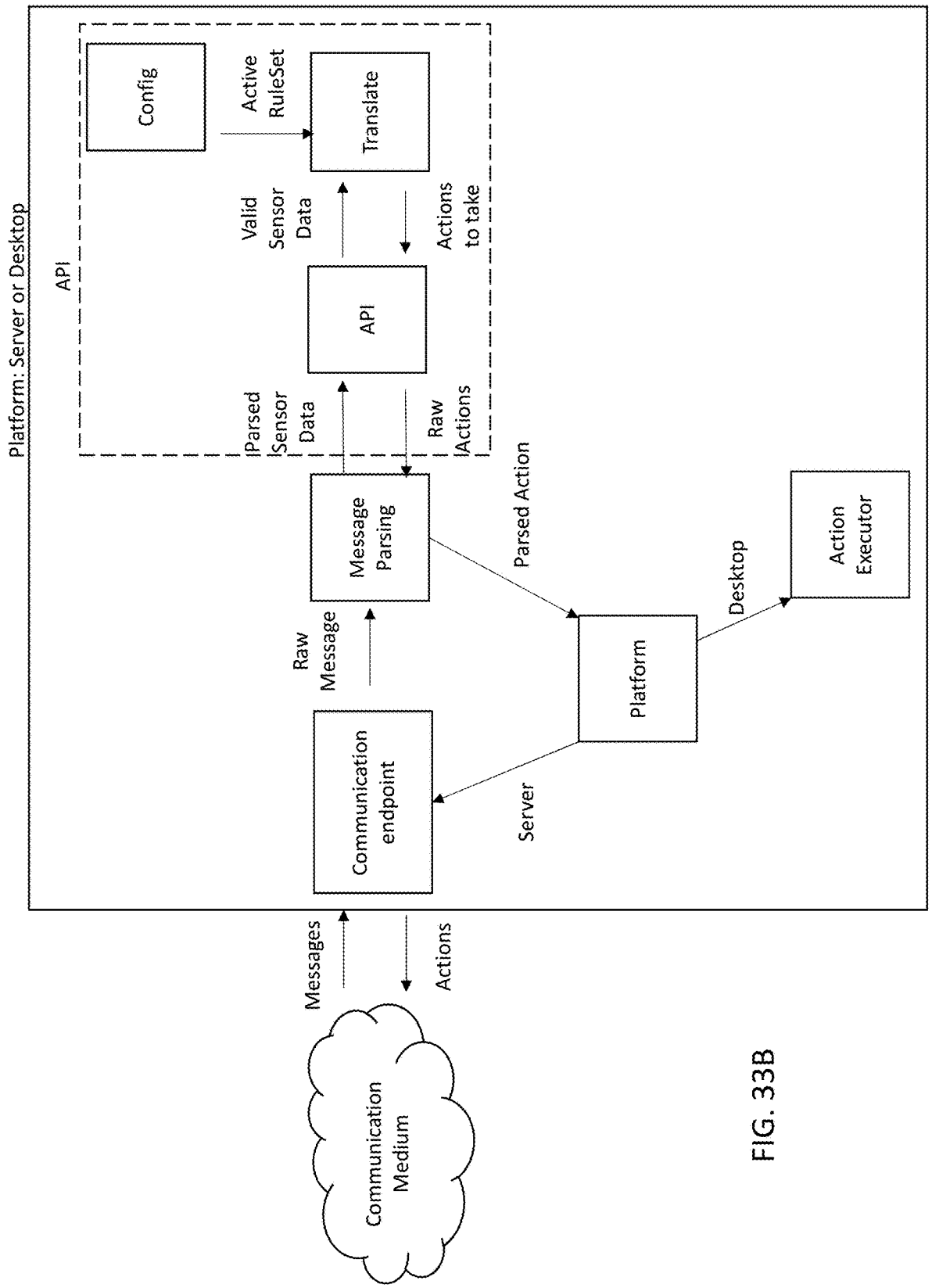
FIG. 33B is a diagram of an illustrative embodiment of a footwear-controlled computing system with associated processes.

FIGS. 33A-33B are diagrams of an illustrative embodiment of a footwear-controlled computing system with associated processes. The system is operable to collect data from the at least one smart footwear article. The system sends the data to a remote device. The remote device includes an application (e.g., mobile application, desktop application) with an application programming interface (API). The system is configured to analyze the user data before the data is sent to the API. The API validates the input and compares it against an active rule set. FIG. 33A shows data transfer between the sensors, remote device, and platform. FIG. 33B shows additional information about the platform. FIG. 33B illustrates data transfer within the platform according to one embodiment of the present invention.

Figure 34:
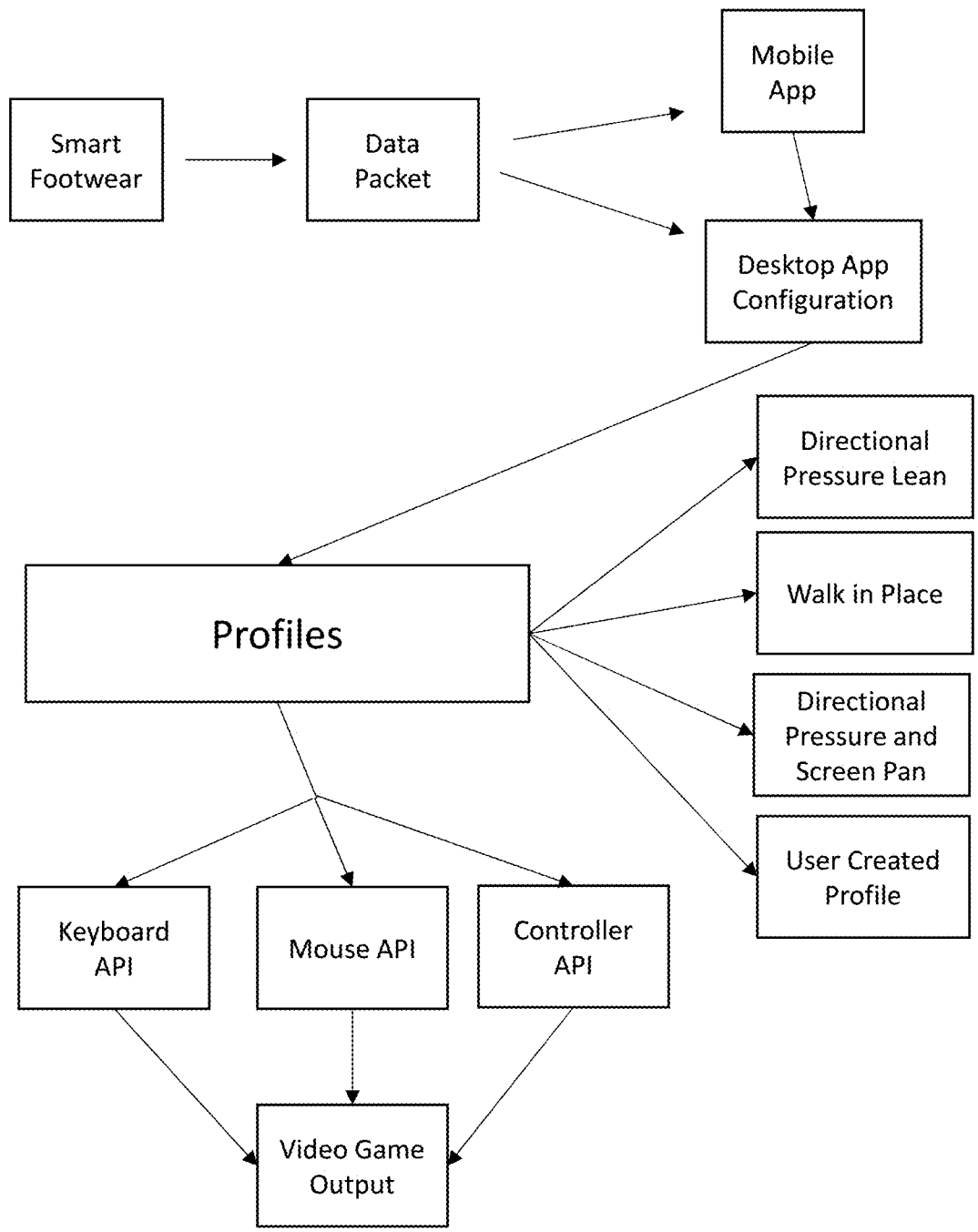
FIG. 34 a diagram illustrating the structure and flow of data from hardware through mobile and PC applications.

FIG. 34 is a diagram illustrating the structure and flow of data from hardware through mobile and PC applications. Smart footwear articles send structured data packets wirelessly to a mobile application (e.g., mobile application used to control mobile virtual reality games) and/or a desktop application. Data captured by the smart footwear articles is transformed into algorithm optimized data sets on the PC application. The smart footwear system uses preferences in a user profile to determine how to interpret a user's movement. If conditions are met, the algorithm optimized data sets are combined with pre-existing and/or custom input device type APIs (e.g., keyboard, mouse, controller). This allows for output actions in video games, virtual or augmented reality, or for other use-cases.

Figure 35:
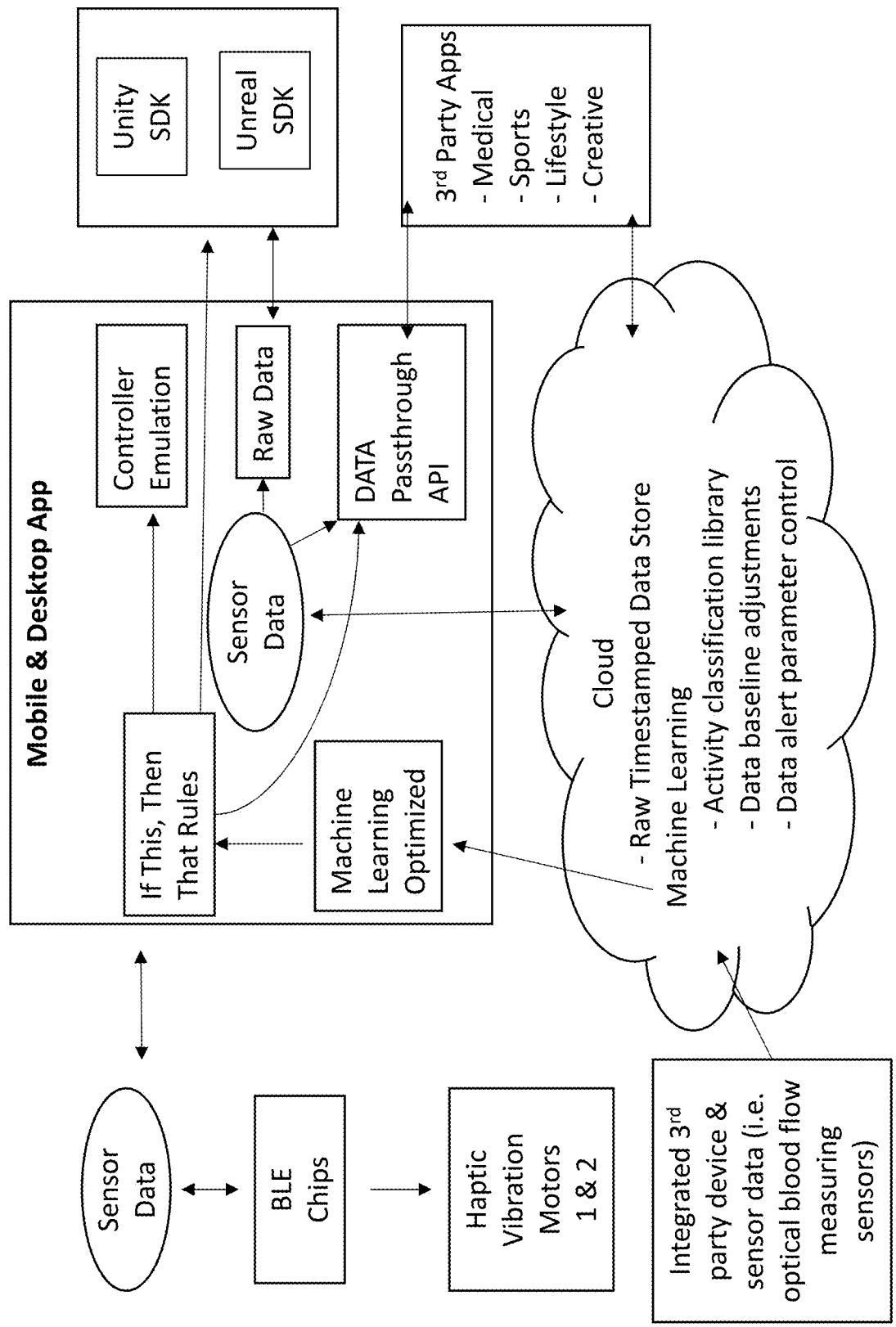
FIG. 35 is a flowchart representation of a software platform for the smart footwear system according to one embodiment of the present invention.

FIG. 35 is a flowchart representation of a software platform for the smart footwear system according to one embodiment of the present invention. The software platform includes a cloud-based server and localized device machine learning. The software is preferably operable for dynamic vibration motor controls. The system is further operable to create a sensor data feedback loop from the smart footwear article.

Figure 36:
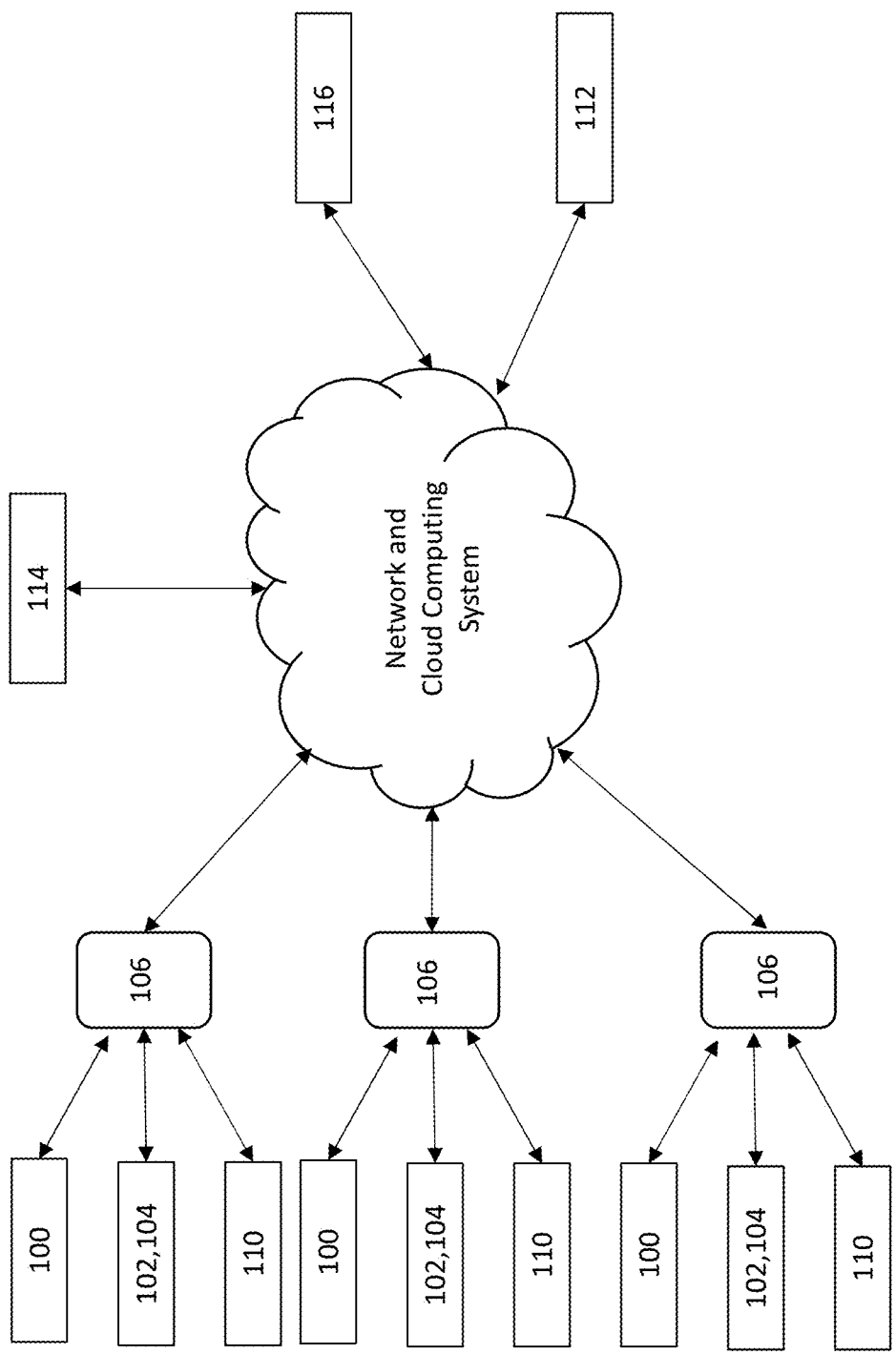
FIG. 36 is an illustration of a network of smart footwear systems according to one embodiment of the present invention

FIG. 36 is an illustration of a network of smart footwear systems. Data from multiple users is operable to be stored on a remote server. The remote server 112 is connected through a network and cloud computing system to a plurality of remote devices 106. Each of the plurality of remote devices 106 is connected to at least one smart footwear article 100, body sensors 102, environmental sensors 104, and/or peripheral devices 110. Additionally, the smart footwear articles are connected to environments 116. External information sources 114 are accessible via the network and cloud computing system. Although one remote server is shown, it is equally possible to have any number of remote servers greater than one.

The present invention relates to software data acquisition and translation method for use with a sensor embedded wearable hardware system. The present system includes six degree of freedoms tracking systems that provide baseline positional data and factoring of footwear embedded force sensing and 9-axis IMU data. A user's feet can be positionally calibrated and tracked continuously. In one embodiment, the system uses a machine learning data signature. The present invention is further operable to create, use, and store individual user (e.g., data signature) profiles. The present invention uses the calibrated data to track other body parts of a user. The present invention uses sensor embedded smart footwear and software to calculate a user's body positioning to generate a control reference for the software.

One embodiment of the smart footwear system includes an input pattern recognition algorithm for controlling a full range of locomotion. The algorithm, or program code, also facilitates managing starts, acceleration, deceleration, stops, and z-axis locomotion. The smart footwear measures force underneath human foot pressure points, human foot pitch, and human foot acceleration.

The smart footwear system is operable to receive directional input from the smart footwear article. The directional input is generated when a user leans in a specific direction, faces a specific direction, or jumps. The system also receives directional input when the user applies pressure to different parts of the smart footwear. The smart footwear system is configured to receive directional input from a user to control: locomotive starts, acceleration, deceleration, stops, curved locomotion, view panning in place (e.g., without changing real world directional facing), dynamic acceleration and deceleration algorithms, dynamic customized sensor calibrations, and dynamic sensor incorporating and negating input methods.

Another embodiment of the present invention includes processes executable by a processor to control a full range of directional locomotion. As previously described, the smart footwear system preferably includes sensors that are embedded into the smart footwear article. In a preferred embodiment, the smart footwear article includes at least one sensor configured to measure force. In another embodiment, the sensors are embedded in an apparatus that is secured to each individual foot (e.g., over footwear). Sensor inputs are used to control a full range of directional locomotion of avatars in virtual environments. Illustrative virtual environments include virtual or augmented reality and video game environments, as well as robots in real environments.

In one embodiment, the smart footwear system includes force sensitive resistors and/or load sensors that are placed under specific pressure point regions of a human or animal foot. In another embodiment, the smart footwear system controls movements in simulated environments in response to pressure exerted by a user's foot in specific patterns. In yet another embodiment, the movement includes curves and full 360-degree view panning while an avatar or robot remains in place (e.g., not having covered any distance directionally). This is an improvement over prior art because generally a user would have to use a controller to see a full 360-degree view around an avatar. In yet another embodiment, a virtual view is panned while a user remains facing forward. For example, a user applies pressure in a forward or reverse direction (e.g., heel or toes) with one foot with applied pressure exceeding a preprogrammed sensor range of the other foot. The smart footwear system is configured to receive variable amounts of force to determine speed of panning and/or a degree of curvature in directional movement.

In one embodiment, the system enables a full range of simulated locomotion to be controlled using multiple input methods, from both sitting and standing positions, while a user remains faced in one direction, or while shifting direction. Directional movement (e.g., locomotion) is preferably controlled while simultaneously enabling a user to pan screen view (simulating directional body facing adjustment) in place.

In another embodiment of the present invention, the smart footwear system includes dynamic input mode switch and manual mode switch configurations. More particularly, the system automatically recognizes when a user is switching a position or initiating a physical movement. The positional change is detected by the smart footwear article. The smart footwear system is configured to detect positional changes (e.g., by the change in pressure on the insole). For example, and not limitation, when a user goes from sitting to standing, it is expected that the amount of pressure on the smart footwear article will increase as a user goes from putting part of their body weight on the smart footwear article while sitting to most, if not all, of their body weight on the smart footwear article when standing. The smart footwear system is configured to adjust output based on which sensors are utilized and how they are read. The smart footwear system is operable to determine when a user is walking in place and when the user is applying directional pressure. The smart footwear system is further operable to determine whether a user is sitting or standing. In an example, the smart footwear system receives pressure data from the smart footwear when a user is sitting down while applying directional pressure to control locomotion. Then, the system is configured to recognize when a user stands up and switches the input mode to walking. In addition to switching to the input mode, the sensors are automatically recalibrated to account for a greater preloaded force resultant from switching from a sitting to a standing position. In specific instances, selected sensor input readings are shut down or ignored (e.g., if below a threshold). When a preprogrammed range of sensor readings is exceeded for a preprogrammed amount of time, the system switches to a different input mode. A new input mode is determined when preprogrammed sensor readings fall within preprogrammed mean ranges. This determination uses percentages and/or fixed number ranges for preprogrammed time intervals.

According to another embodiment, the smart footwear system provides dynamic and manual acceleration and deceleration control. The smart footwear system includes modes to both automatically and manually allow a user to customize simulated acceleration and negative acceleration, as well as locomotion speeds and velocity in virtual reality space. In one embodiment, the system determines base average locomotion acceleration and an average movement speed (or velocity) by comparing leg acceleration and global positioning satellite (GPS) data. The GPS data is preferably received from an embedded device or via a connection to a mobile device (e.g., smartphone). In one embodiment, the system allows this velocity and acceleration control to be adjusted manually to override an automatic setting.

In a preferred embodiment, manual linear and jerk acceleration user interface control is separated from constant locomotion speed interface controls in a software application controller. In one embodiment, manual sensitivity user interface controls affect linear and jerk acceleration and constant locomotion speeds and velocity. In another embodiment, a preprogrammed range of sensor readings are manually or automatically adjusted to selectively control starting, acceleration, constant speeds/velocity, deceleration, and stops.

In another embodiment, the smart footwear system uses automated still and locomotion start detection. The system recognizes when a user is decelerating (i.e., realizing negative acceleration) to a full stop. Once a full stop intention of the user is recognized, the system engages a still detection mode. The still detection mode negates small physical foot and leg muscle movements that would otherwise cause unintended and potentially jittery virtual movement. The system preferably dynamically sets a buffer for sensor readings to determine when the user intends to move once again. In order to once again be virtually locomotive, a user must exceed buffered sensor readings. Sensitivities and tolerances are preferably manually adjustable through a device controlling interface. The still detection mode continues to allow a user to pan a virtual view in place. For example, a virtual character will spin around without covering distance.

Figure 37A:
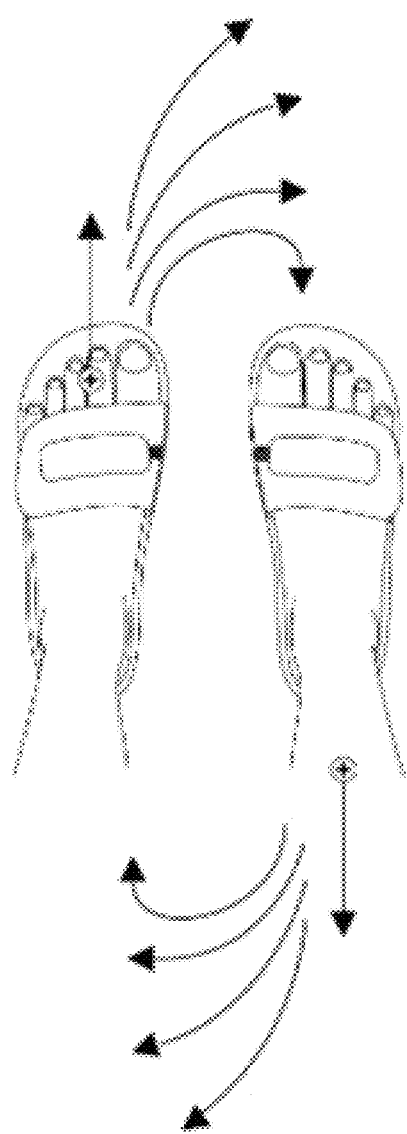
FIG. 37A illustrates directional control enabled by embedded sensors within a pair of smart footwear articles.
Figure 37B:
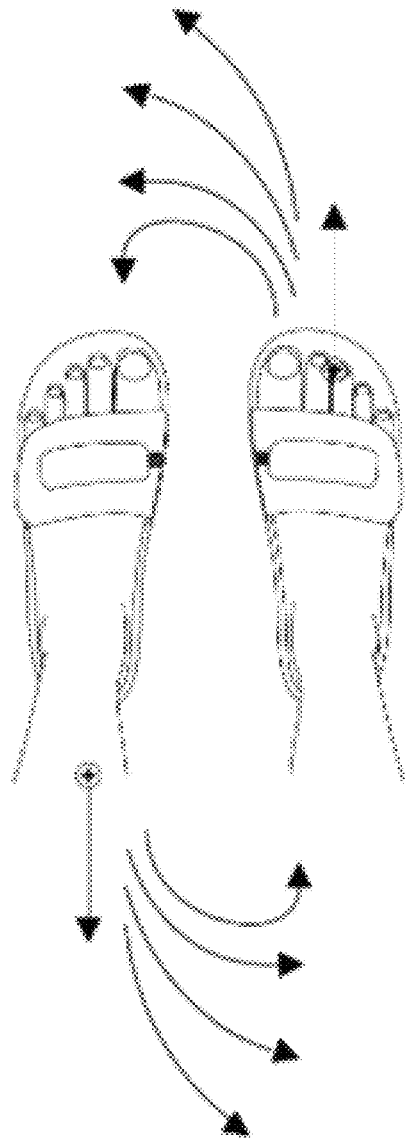
FIG. 37B illustrates directional control enabled by embedded sensors within a pair of smart footwear articles.

FIGS. 37A-37B illustrate directional control enabled by embedded sensors within a pair of smart footwear articles. Force sensors in the smart footwear articles are used to sense dispositional weight. The system is configured to use the dispositional weight to control a turn radius. In one embodiment, the system is configured to increase the turn radius as a user increases the amount of force applied to the smart footwear. FIG. 37A illustrates a right turn and FIG. 37B illustrates a left turn.

Figure 38:
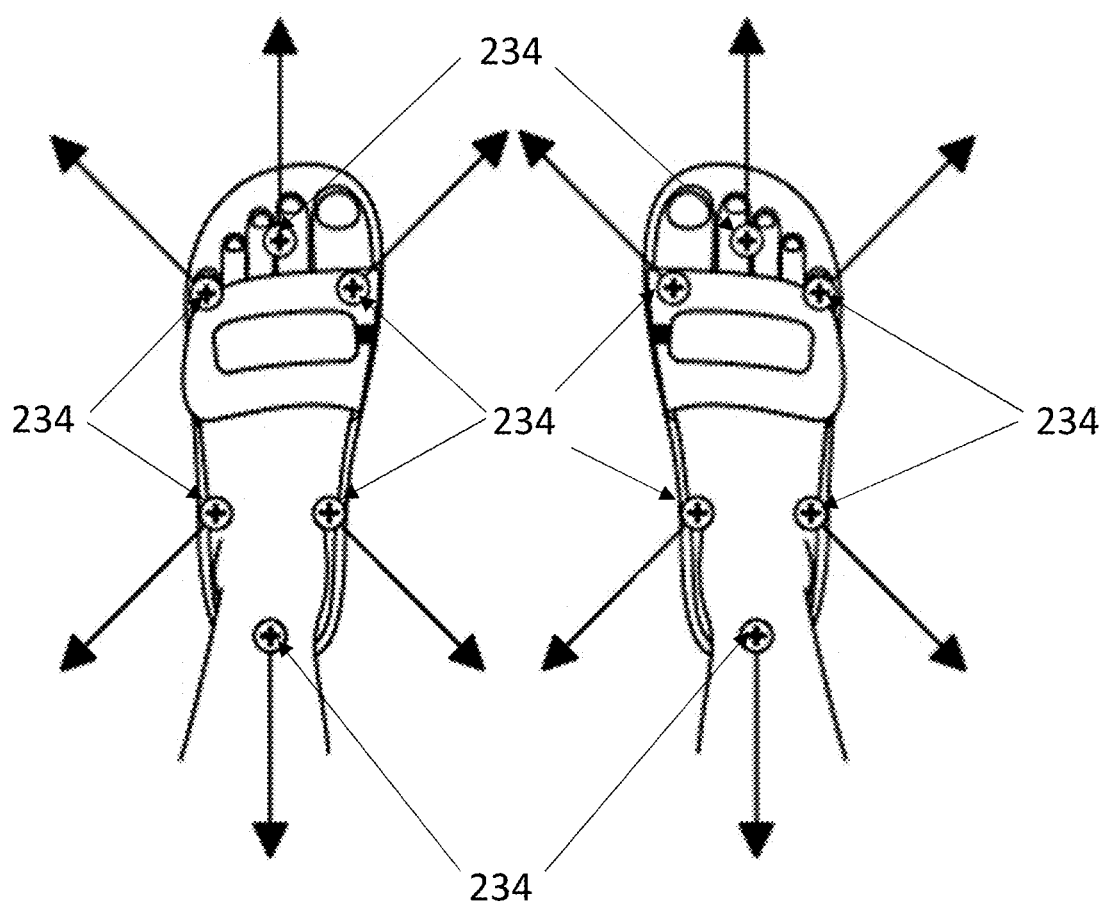
FIG. 38 illustrates a method of directional control according to one embodiment of the present invention.

FIG. 38 illustrates another embodiment of the present invention. The smart footwear system includes at least one smart footwear article 100 with embedded sensors (e.g., force sensors, pressure sensors, motion sensors). The smart footwear article is preferably operable for direction control. The embedded sensors are configured to sense directional inputs from at least one smart footwear article. In a preferred embodiment, at least one of the embedded sensors is operable to measure force exerted on the smart footwear. The embedded sensors are placed under specific pressure point regions of a user's foot. FIG. 38 illustrates the various directional pressure points 234 and the corresponding direction that the pressure points control. Pressure exerted by the foot in specific patterns controls movement on all axes. A virtual view is panned while a user remains facing forward. For example, the smart footwear system is configured to rotate the field of view without moving the avatar or character in the virtual environment when a user applies pressure in a forward or reverse direction (e.g., heel or toes) with one foot, while the other foot applies constant pressure on the smart footwear. The rotation speed and the degree of curvature is determined in response to the amount of pressure exerted by the foot on the smart footwear article.

Figure 39A:
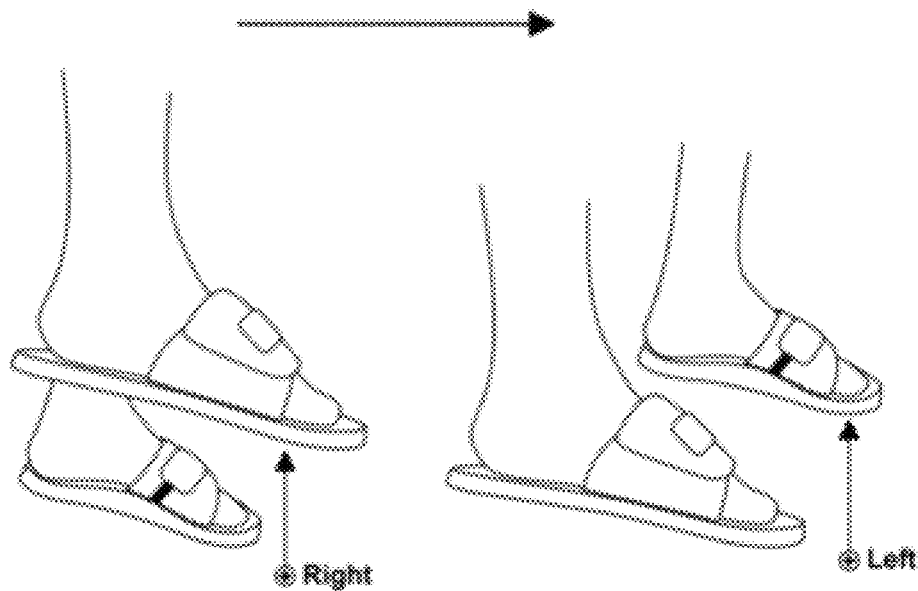
FIG. 39A illustrates directional control enabled by embedded sensors within a pair of smart footwear articles according to another particular embodiment.
Figure 39B:
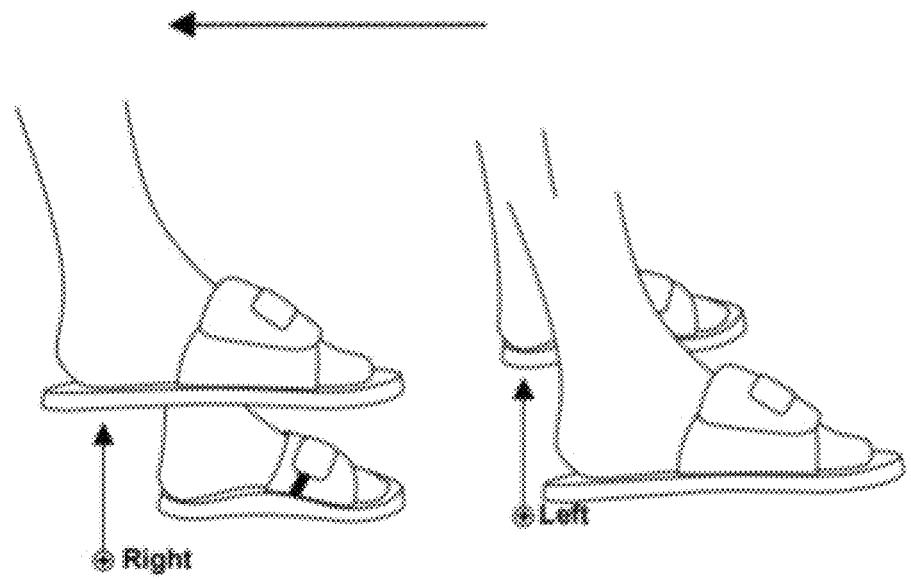
FIG. 39B illustrates directional control enabled by embedded sensors within a pair of smart footwear articles according to another particular embodiment.

FIGS. 39A and 39B illustrate directional control enabled by embedded sensors within a pair of smart footwear articles according to another particular embodiment. The system is operable to track a user's foot movement while in in-place mode. The smart footwear system is configured to track a user's step speed as well as the duration between ground to account for distance. Slower, shallower steps will cause an avatar or a robot to move forward slower than faster, higher steps. In one example, forward pressure on the footwear causes a virtual entity (e.g., a VR character or a robot) to move forward as shown in FIG. 39A. Conversely, steps with pressure on the heels cause the virtual entity to move backwards as shown in FIG. 39B. An algorithmic curve is used by the processor to avoid steps feeling choppy or inducing motion sickness. Advantageously, the algorithmic curve facilitates softer starts and stops. In one embodiment, the left and right directional facing is controlled by turning the body in virtual reality with a mouse or other input device. In another embodiment, the smart footwear system causes the virtual entity to move left and/or right in response to applied force on the smart footwear article. This feature allows a user to virtually move in one direction while still facing another, which is an improvement over prior art that only moves in the direction that a user is facing. In one embodiment, an automatic switch mode automatically switches modes based on a detected movement of the wearer of the footwear.

Figure 40:
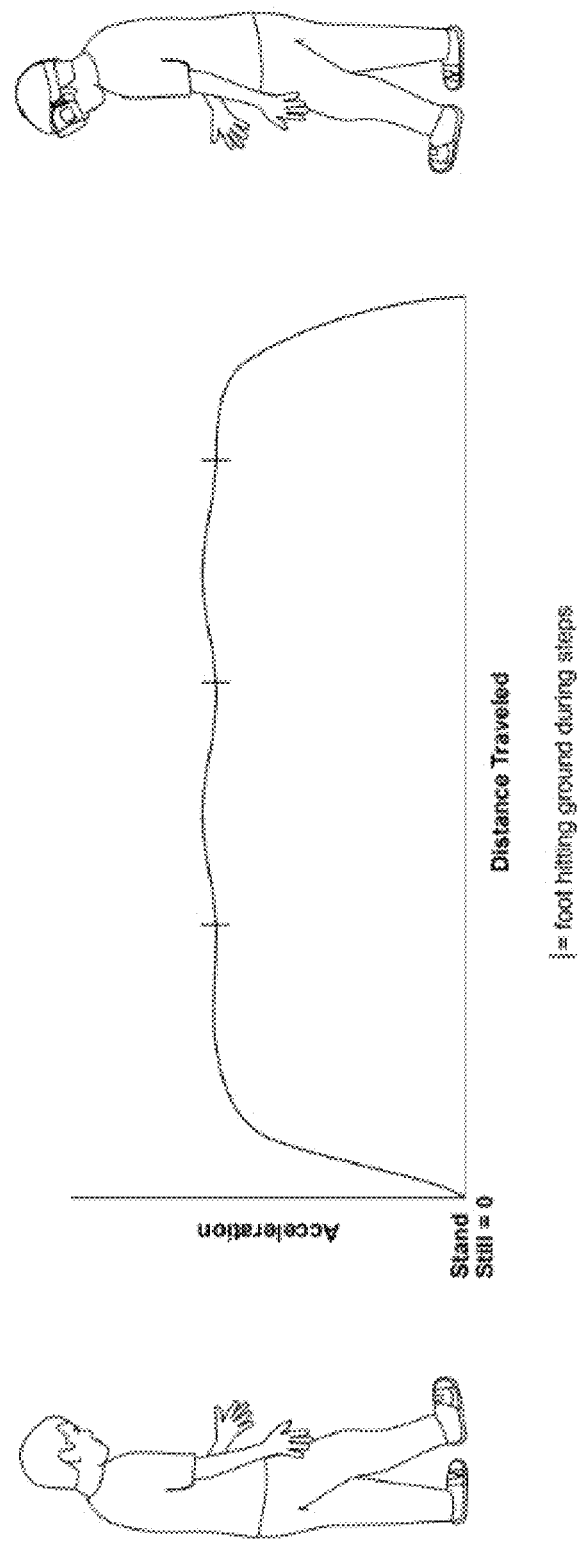
FIG. 40 shows an algorithmic curve illustrating an aspect of simulated walking and running with acceleration and stopping patterns according to one embodiment.

FIG. 40 shows an algorithmic curve illustrating an aspect of simulated walking and running with acceleration and stopping patterns according to one embodiment. The curve is used in conjunction with the in-place stepping mode to represent stopping and accelerating patterns. S curve calculations are used with sensor derived velocity calculations to compute positive and negative acceleration of virtually controlled entities (e.g., an avatar or robot).

In another embodiment of the present invention, the smart footwear system is operable to automatically and/or manually create the algorithmic curve. For instance, the processor analyzes force pressure sensor data and accelerometer data in the footwear along with GPS data for a mobile smartphone app. In one embodiment, the smart footwear system uses machine learning to create an accurate customized simulation for how the in-place step mode translates into first person movements in VR. The algorithmic curve is also used to depict or emulate a more accurate animal gait. The system is configured to receive user input to adjust the sensitivity of the footwear to provide an improved translation of a user's movement with the corresponding action in a virtual environment.

Figure 41:
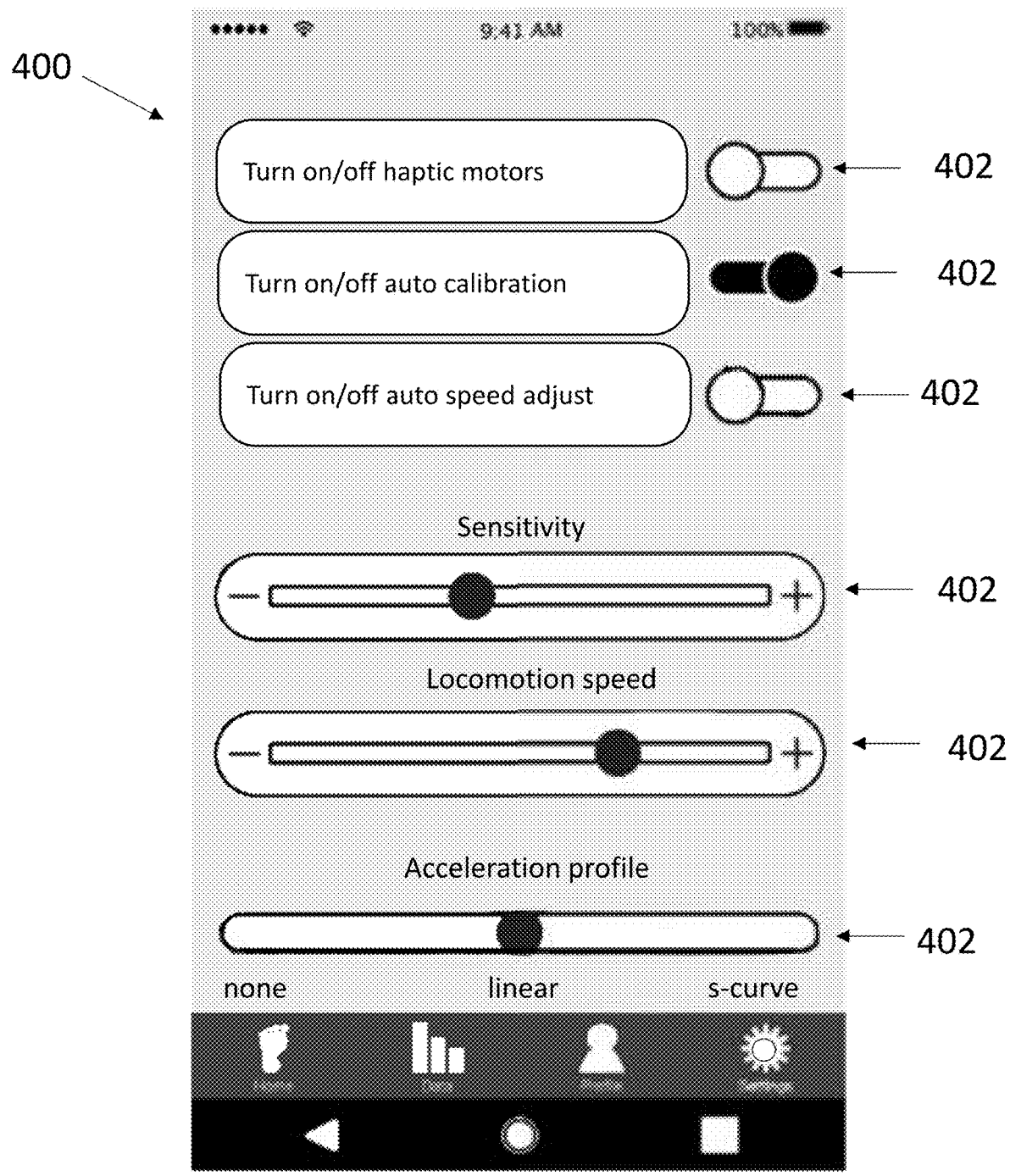
FIG. 41 illustrates a graphical user interface (GUI) that controls the smart footwear characteristics according to one embodiment of the present invention.

FIG. 41 illustrates an example of a graphical user interface (GUI) 400 that controls the smart footwear characteristics according to one embodiment of the present invention. Sensitivities and tolerances are manually adjustable through sliders 402 on the GUI 400. The smart footwear characteristics include turn on/off haptic motors, turn on/off auto calibration, turn on/off auto speed adjustment, sensitivity, locomotion speed, and acceleration profile. Sensitivity adjustment increases or decreases the sensor reading thresholds by which output functions are activated. Locomotion speed adjustment increases or decreases the rate of virtual locomotive acceleration derived from user actions wearing the smart footwear article. In one embodiment, the smart footwear system is configured to switch acceleration profiles. The system is operable to switch between zero acceleration profile (two speeds—0 or 100%), linear acceleration (constant rate of velocity change), or S-Curve, which produces a variable rate of velocity change more like real world human locomotive velocity changes.

As previously described, the system uses a user profile that stores smart footwear system preferences and information about the user, including but not limited to, age, weight, height, gender, medical history (e.g., medications, diseases), fitness (e.g., fitness level, fitness activities), activity goals, stress level, and/or occupational information (e.g., occupation, shift information).

The user profile preferably includes an acceleration profile preference. A user's field of view in a virtual reality environment and the user's height affect a user's perception of how fast the user is moving. In one embodiment, the system accounts for how locomotion should look and feel, as well as for motion sickness tolerance as between users. For example, some users prefer a more realistic S-Curve acceleration and deceleration experience in virtual reality, while other users prefer linear acceleration or zero acceleration (e.g., a stop to full locomotion velocity instantly) in order to avoid motion sickness. This acceleration profile preference is preferably instituted by the specific virtual reality game or through user experience. The smart footwear system includes a user interface (e.g., GUI), wherein the user interface enables a user to customize that specific desired acceleration profile type, and the speed/sensitivity of each profile. A zero-acceleration profile (i.e., 100 percent stop to instant 100 percent full speed) would not include a variable acceleration adjustment, however, in one embodiment, the profile includes the ability to adjust the singular locomotion speed in that profile.

Profiles include a compiled set of interpretations of footwear sensor data that result in intended output functions. The smart footwear system stores and controls profiles at the at least one remote device (e.g., smartphone, tablet, laptop, desktop) where the data is interpreted to result in a specific control or output function. Profiles include activation patterns for controlling the vibration motors. The smart footwear system also stores a user's height, weight, age as well as user-specific historical input data such as user behavior, decisions, and situation data.

The smart footwear system is configured to calculate variably preprogrammed motion trajectories for virtual locomotion based on sensor value inputs for specific input mode types. These calculations are stored in the form of motion trajectory profiles. The motion trajectory profiles are selected using a user interface (e.g., GUI). The motion trajectory profiles include both s-curve acceleration and linear acceleration profiles, as well as a more simplified 100 percent stop to instant 100 percent full speed profile. Manual speed controls adjust the preprogrammed mean variables that control both linear and jerk acceleration, as well as constant virtual locomotion speeds or velocities derived from force sensor and IMU sensor readings.

The present invention is configured to create directional profiles for various users and games. The smart footwear system is operable to change profiles depending on the type of game as well as the type of user. A number of default profiles capture the typical video game movement needs (like forward, backwards, left, right (WASD) movement or panning a screen with the mouse). The smart footwear system is further customizable to create separate profiles for individual users and individual games. Types of movement profiles include: (1) Directional Pressure Lean Profile, (2) Walk in Place Profile, (3) Screen Pan Profile, (4) Directional Pressure Lean and Screen Pan Profile. Directional Pressure Lean Profile includes leaning directionally on the smart footwear article to create a corresponding movement in a virtual environment. For example, leaning forward causes an avatar or a character in the virtual environment to walk forward. A Walk in Place Profile measures the acceleration of the smart footwear to determine when a user is walking in place. The user walking in place triggers the avatar/character in the virtual environment to walk correspondingly. A Screen Pan Profile applies opposite directional pressure on devices will cause screen to pan left/right. A combination of Directional Pressure Lean and Screen Pan Profile is a profile where the smart footwear system is configured where a first smart footwear article (e.g., left) controls directional movement and a second smart footwear article (e.g., right) controls screen panning.

Figure 42A:
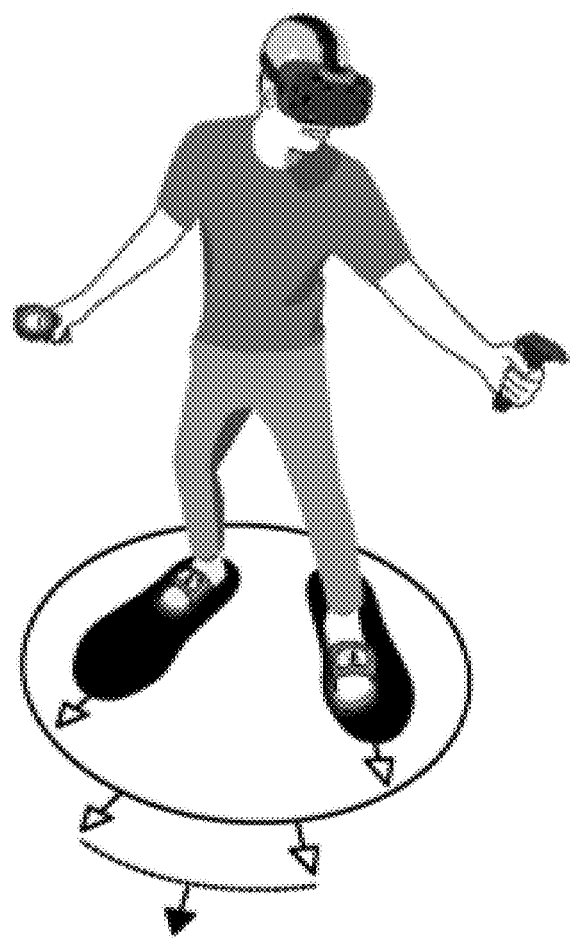
FIG. 42A illustrates a control method according to one embodiment of the present invention.
Figure 42B:
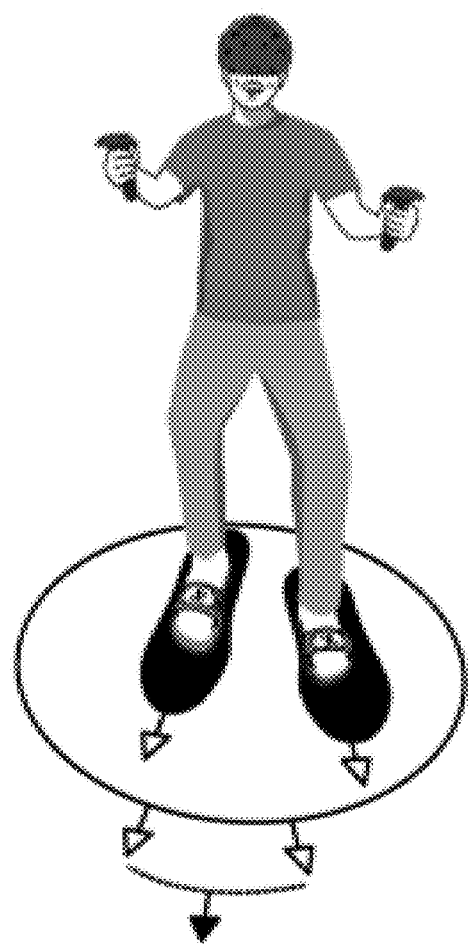
FIG. 42B illustrates a control method according to one embodiment of the present invention.

FIGS. 42A-42B illustrate a control method according to one embodiment of the present invention. The smart footwear system is operable to enable users to lean in a given direction while standing still or walking in place. The system is operable to move an in-game character in the same direction that a user leans. FIG. 42A illustrates a first position and FIG. 42B illustrates a second position.

In yet another embodiment, the present invention includes dynamic, automatic calibration, in addition to manual calibration. The smart footwear system is configured to automatically adjust pre-loaded force to optimize accuracy for users in standing positions versus those in sitting positions, and to accommodate users weighing different amounts. In one embodiment, the processor resets base levels based on sitting, standing, or weight. In yet another embodiment, the system is operable for manual calibration, wherein the manual calibration utilizes a mobile application or other computing interface to immediately reset a preloaded force on pressure sensors to new zero points. A zero point includes a starting point pressure setting. Manual calibration is also used to reset a sensor reading zero point for an IMU inertial motion unit (IMU), accelerometer, and gyroscope, among other sensors.

In one embodiment, the system automatically sets a new preloaded force sensor zero point after a variable time or in response to a mean sensor reading remaining within a set range for a period of time. For example, when automatic calibration is engaged and when a user remains relatively still and balanced for five seconds, the software automatically recalibrates sensors by setting new zero points that are used in input calculations.

The present invention includes a user interface, wherein the system is operable to receive user input through the user interface to calibrate the system. System calibrations include whether a user is sitting/standing, changing directional profiles, and manual or automatic calibration. The system is operable to calibrate within two seconds. Assuming new data packet is sent every ~30 ms: 2 s=2000 ms; 2000 ms/30 (ms/packet)=67 packets. Therefore, a calibrated value is an average of 67 data packets of the sensor values.

Each new sensor value is evaluated against a calculated value by: $(c/s)+t$, where: $c$=calibrated sensor value, $s$=sensitivity, and $t$=tolerance. Sensitivity is based on user input. The system includes a user interface; wherein the user interface includes sliders. The system is operable to change the sensitivity based on slider movements. A sensitivity slider has range from 0.1 to 1. Default value: $s$=0.7. A tolerance is calculated during calibration. A larger sensitivity range enables a greater tolerance and vice versa. Generally, tolerance falls between 0 and 10,000. Each new incoming sensor value is compared against this equation. If the incoming value is greater than the calculated value, then the movement action dictated by the profile is performed. If the incoming value is less than calculated value, no movement action is performed. In an example: x=15000 (incoming sensor value), c=10000, s=0.7, and t=3000. 15000>((10000/0.7)+3000). Then 15000>(14285+3000), and 15000>17285. Thus, it is false (e.g., therefore no movement output). However, if the incoming sensor value is greater than the calculated value then the system is configured to create a movement action output based on the incoming sensor value.

Figure 43A:
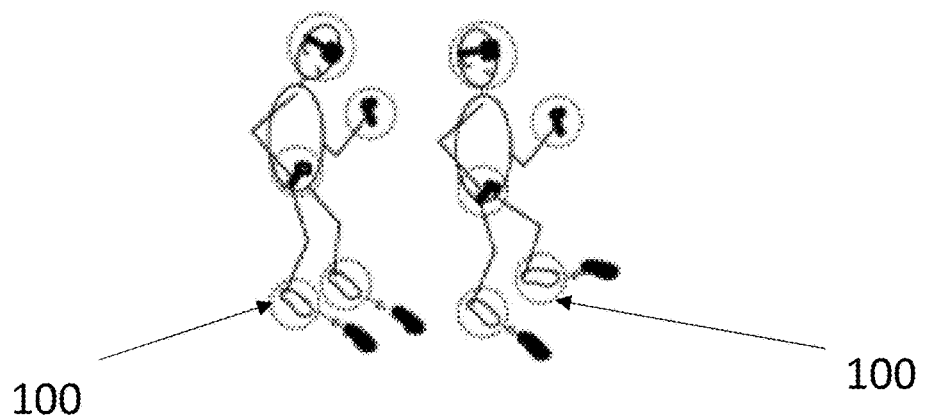
FIG. 43A illustrates a manual user calibration method according to one embodiment of the present invention.
Figure 43B:
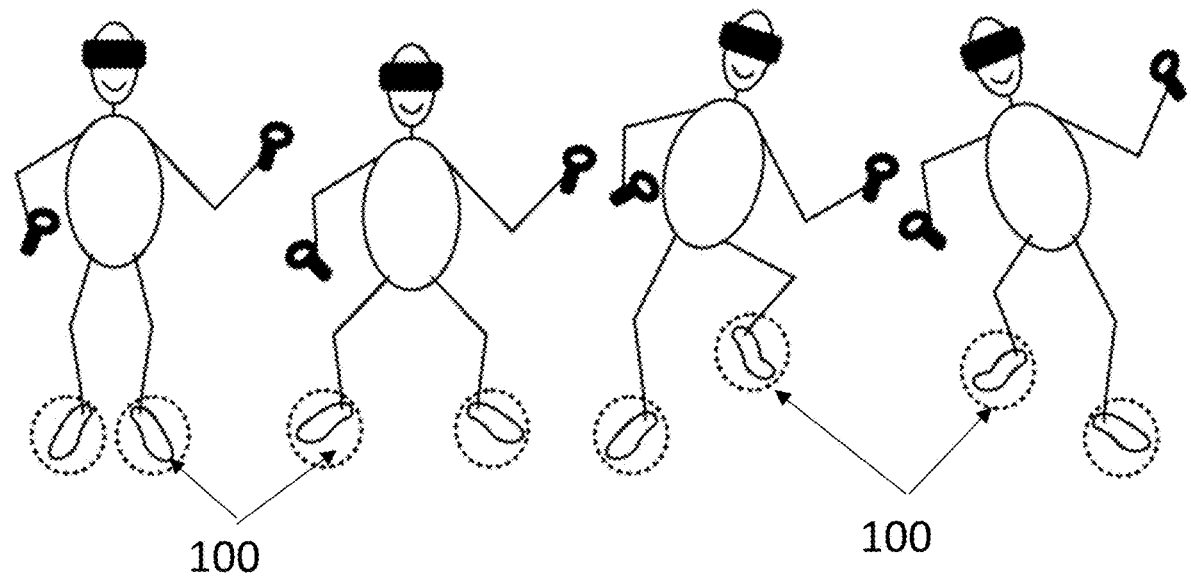
FIG. 43B illustrates different user positions that enable the smart footwear system to calibrate for 3D position tracking.

FIG. 43A illustrates a manual user calibration method according to one embodiment of the present invention. The smart footwear system includes software that instructs the smart footwear 100 user to place their feet in various 3D positions. FIG. 43B illustrates different user positions that enable the smart footwear system to calibrate for 3D position tracking. The system recognizes unique data signatures that enable it to successful track a user's position. By incorporating real feet and body positional tracking data captured with external motion/positional tracking systems, data can be combined with timestamp (e.g., >50 millisecond estimate) matched sensor data (e.g., eight or more high resolution analog pressure sensors and 9-axis IMU data per foot—34 data points total per foot) into a machine learning system. The smart footwear system is configured to determine and accurately estimate the highest probably XYZ foot positions. Through machine learned optimization of these algorithmic junctures and low latency edge computing, the smart footwear system can accurately track a user's 3D foot positioning.

Figure 44:
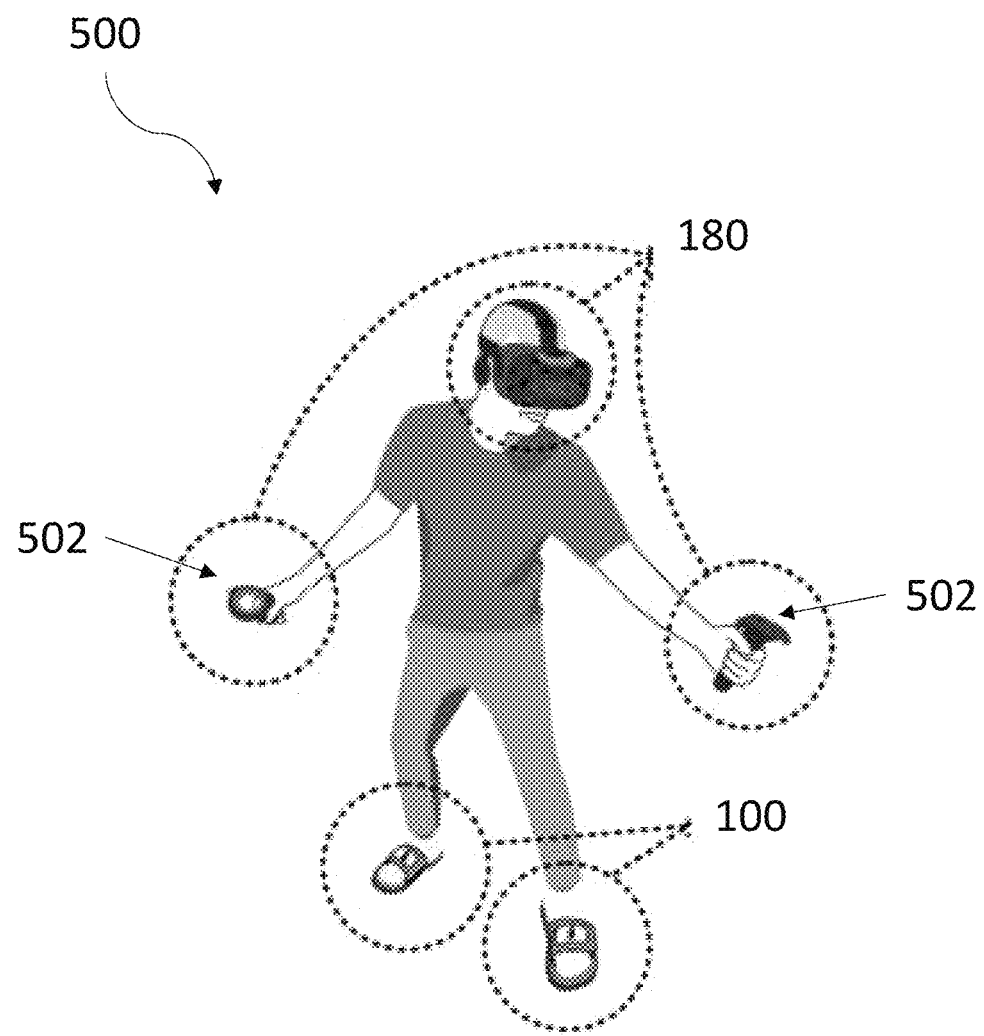
FIG. 44 illustrates a virtual reality system that includes external six degrees of freedom positional tracking.
Figure 45B:
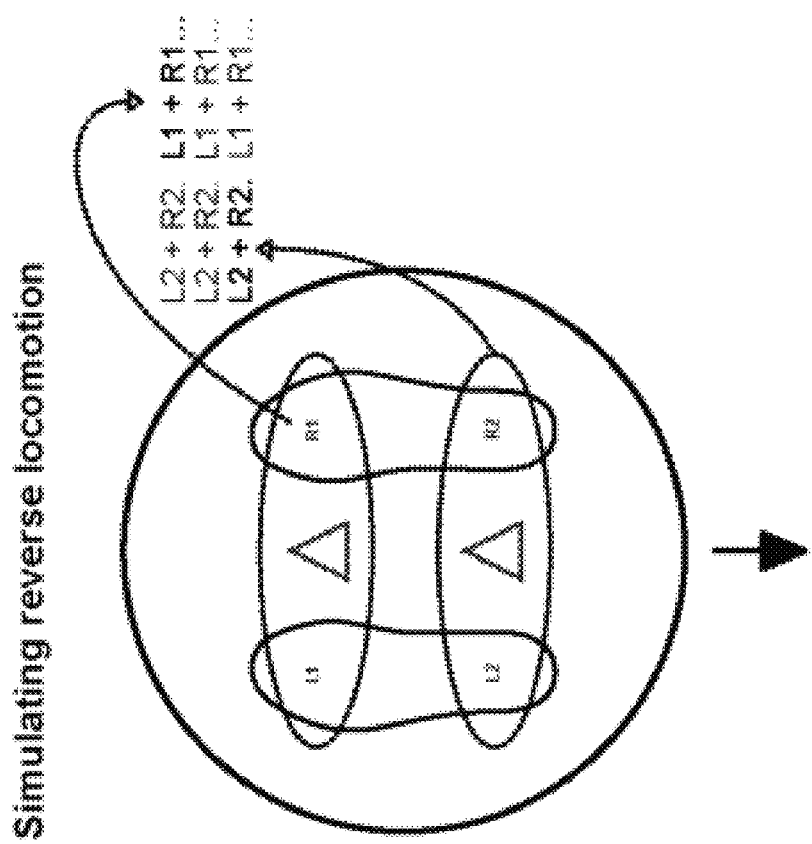
FIG. 45B illustrates a method of simulating reverse locomotion.
Figure 45A:
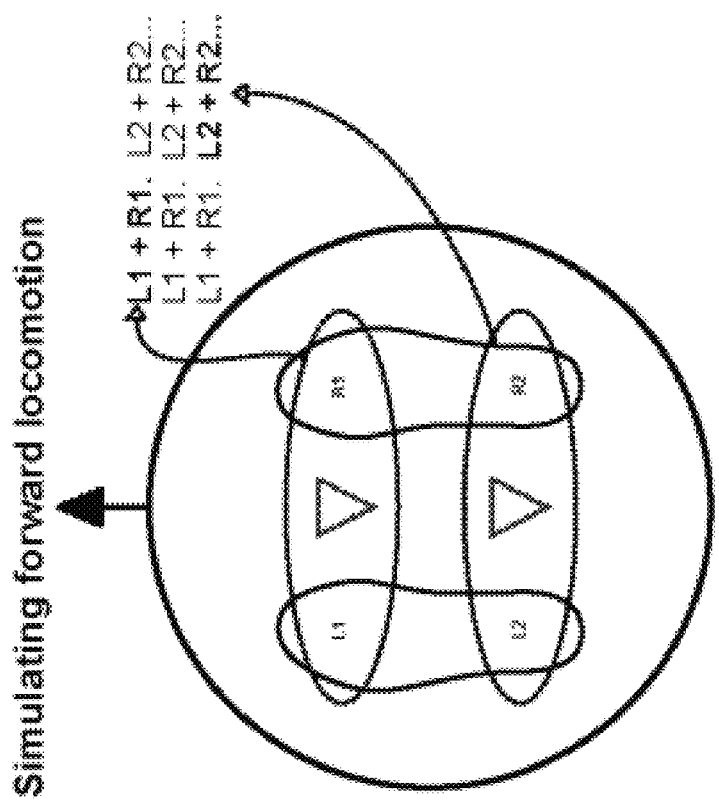
FIG. 45A illustrates a method of simulating forward locomotion.
Figure 45D:
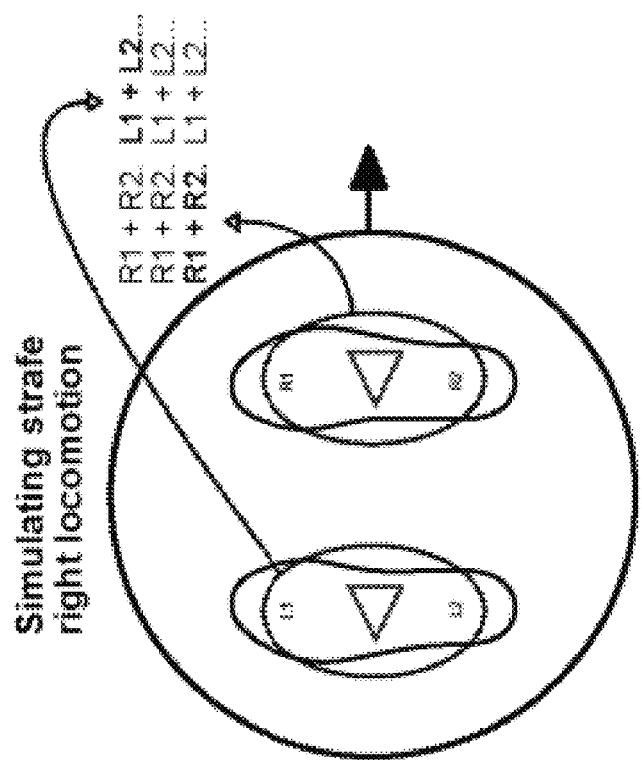
FIG. 45D illustrates a method of simulating strafe right locomotion.
Figure 45C:
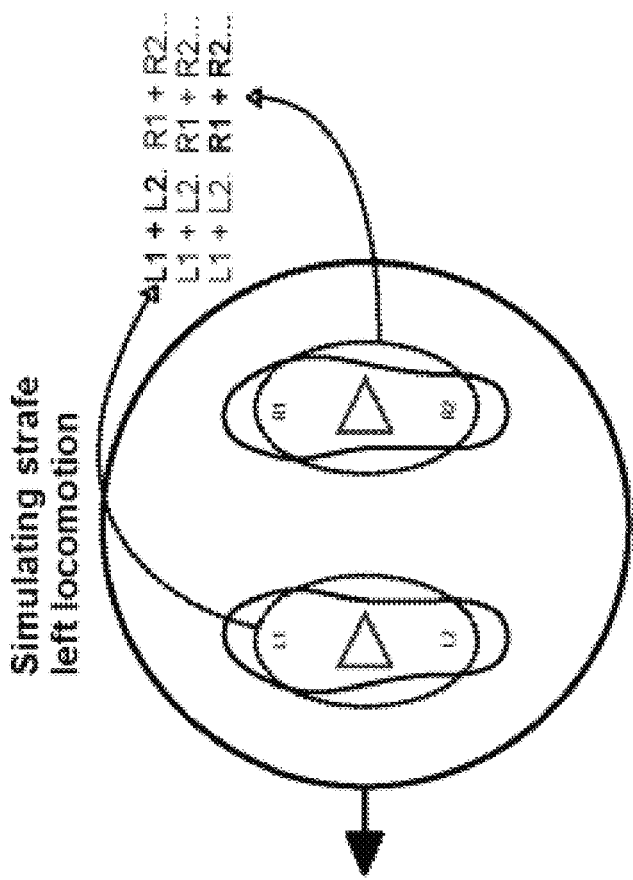
FIG. 45C illustrates a method of simulating strafe left locomotion.
Figure 45E:
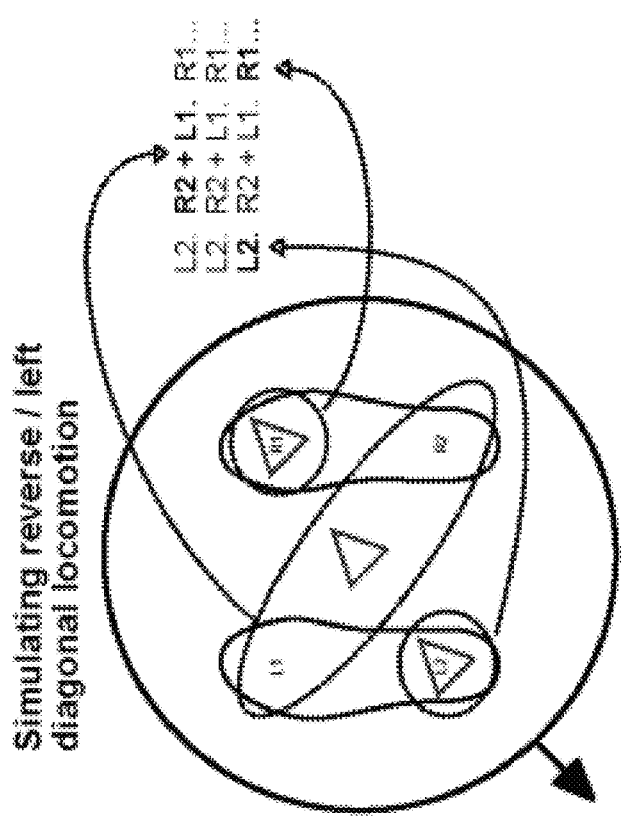
FIG. 45E illustrates a method of reverse/right diagonal locomotion.
Figure 45F:
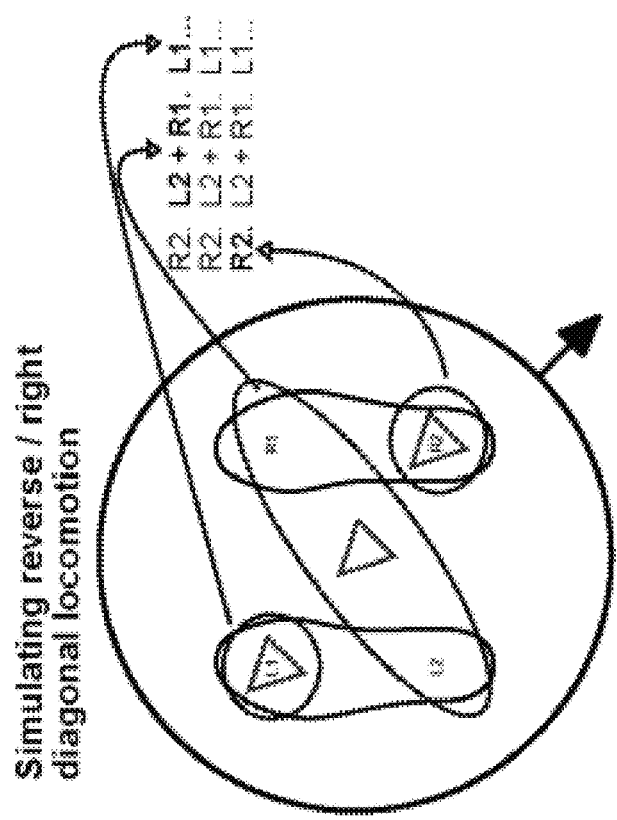
FIG. 45F illustrates a method of reverse/left diagonal locomotion.
Figure 45H:
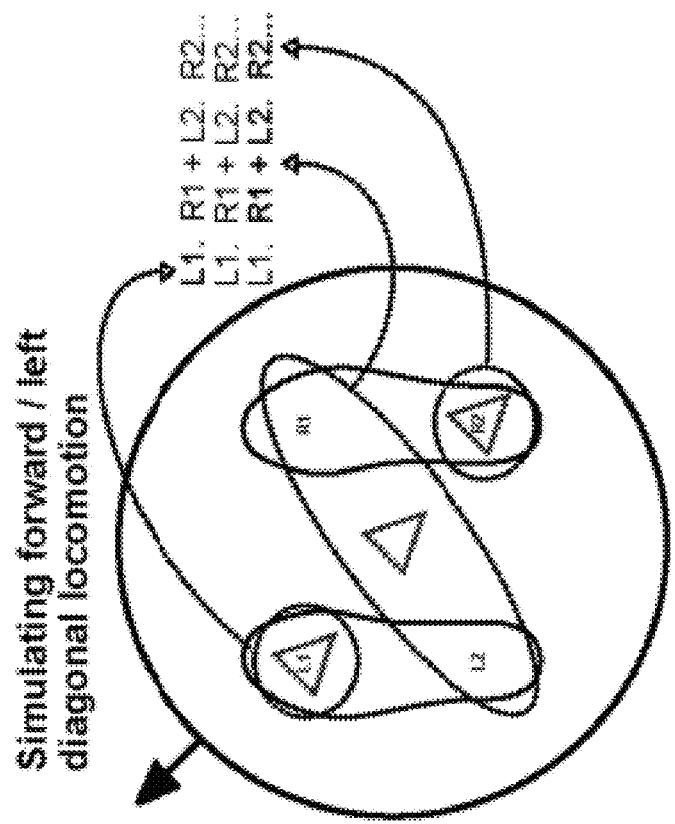
FIG. 45H illustrates a method of simulating forward/left diagonal locomotion.
Figure 45G:
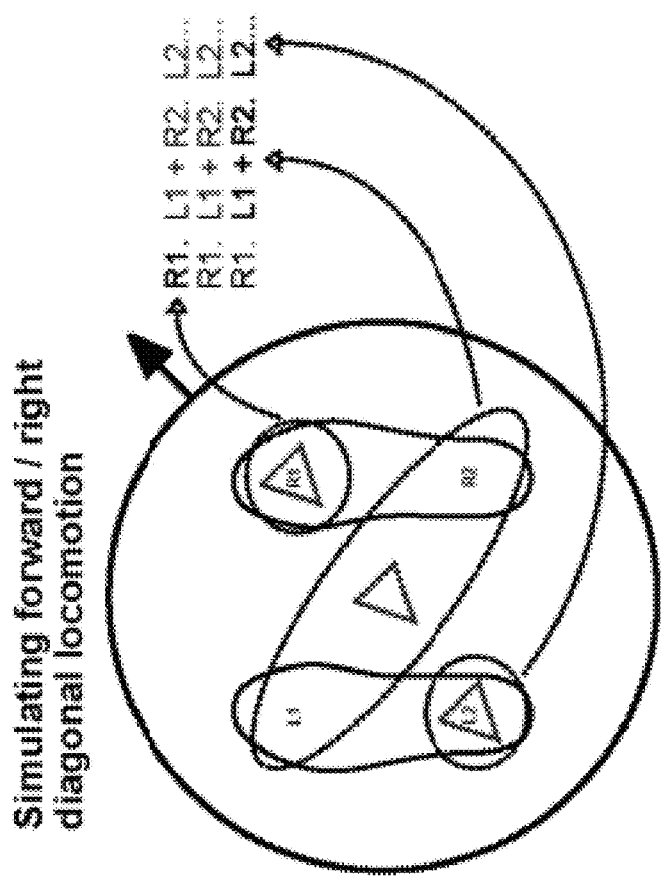
FIG. 45G illustrates a method of forward/right diagonal locomotion.
Figure 45J:
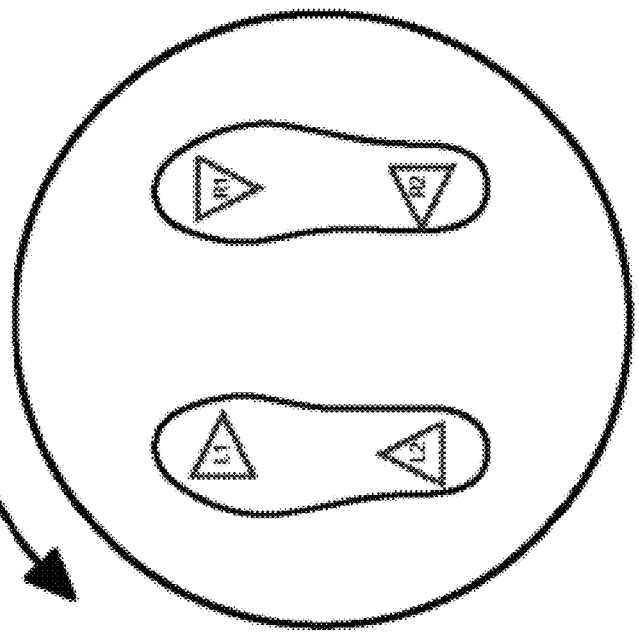
FIG. 45J illustrates a method of simulating in-place panning to the left locomotion.
Figure 45I:
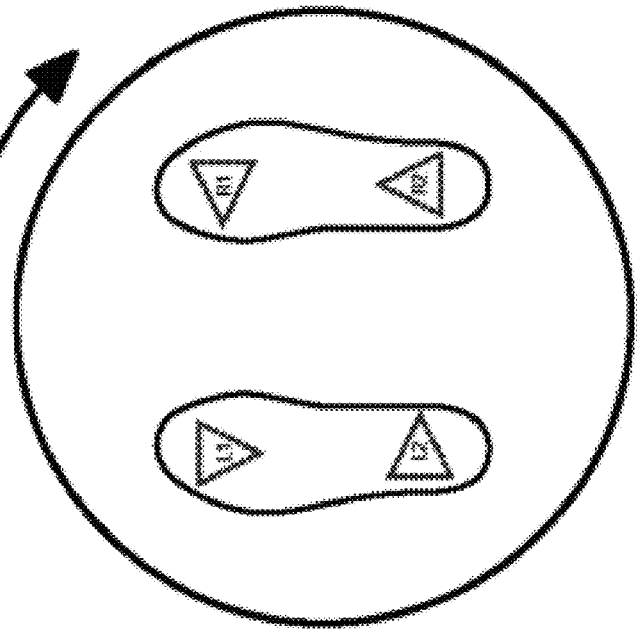
FIG. 45I illustrates a method of simulating in-place panning to the right locomotion.

FIG. 44 illustrates a virtual reality system 500 that includes external six degrees of freedom positional tracking. The virtual reality system 500 includes controllers 502 and a virtual reality headset 180. The virtual reality system 500 is configured to 3D track integrated devices within line-of-sight of the external placed tracking devices. The smart footwear system is configured to use 9 AXIS motion and force sensing modules embedded in the smart footwear 100. The system is preferably configured to stream the sensor data wirelessly to connected devices and systems at latency of a millisecond. In another embodiment, the virtual reality system uses an inside-out tracking method wherein the tracking of the headset and all line-of-sight track of integrated peripherals are done with headset embedded sensors. The smart footwear system of the present invention is operable to use the positional data to create positional estimates for a user's feet.

FIGS. 45A-45J illustrate methods of simulating movement in a virtual reality setting. The smart footwear system is operable for simulating forward locomotion (FIG. 45A), reverse locomotion (FIG. 45B), strafe left locomotion (FIG. 45C), strafe right locomotion (FIG. 45D), reverse/right diagonal locomotion (FIG. 45E), reverse/left diagonal locomotion (FIG. 45F), forward/right diagonal locomotion (FIG. 45G), forward/left diagonal locomotion (FIG. 45H), in-place panning to the right (FIG. 45I), and in-pace panning left movement (FIG. 45J) of an individual.

Figure 46:
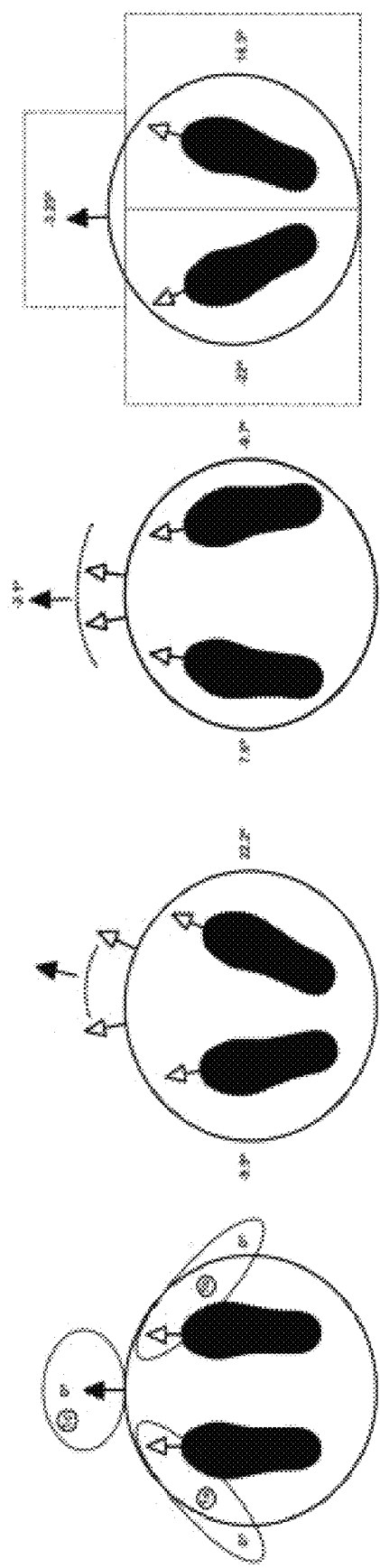
FIG. 46 illustrates how directional locomotion control in VR corresponds to the orientation of a user's feet.

FIG. 46 illustrates how directional locomotion control in VR corresponds to the orientation of a user's feet. Feet orientation of individuals vary from degrees of duck footed posture to pigeon toed posture. One method of determining which direction an individual is facing is from the directional co-efficient of their feet. For VR use, that co-efficient angle forms the baseline from which directional locomotion is then calculated. The directional co-efficient enables the smart footwear system to determine which direction a user wants to move in virtual environments. The system correlates the directional coefficient angle with the applied pressure to determine the rate of speed, turn radius and the direction in which a user wants to move in the virtual environments. In another embodiment, the smart footwear system utilizes the co-efficient angle to determine a person's posture. The smart footwear system is operable to indicate poor posture and provide haptic feedback to correct the posture.

Figures 47A, 47B:
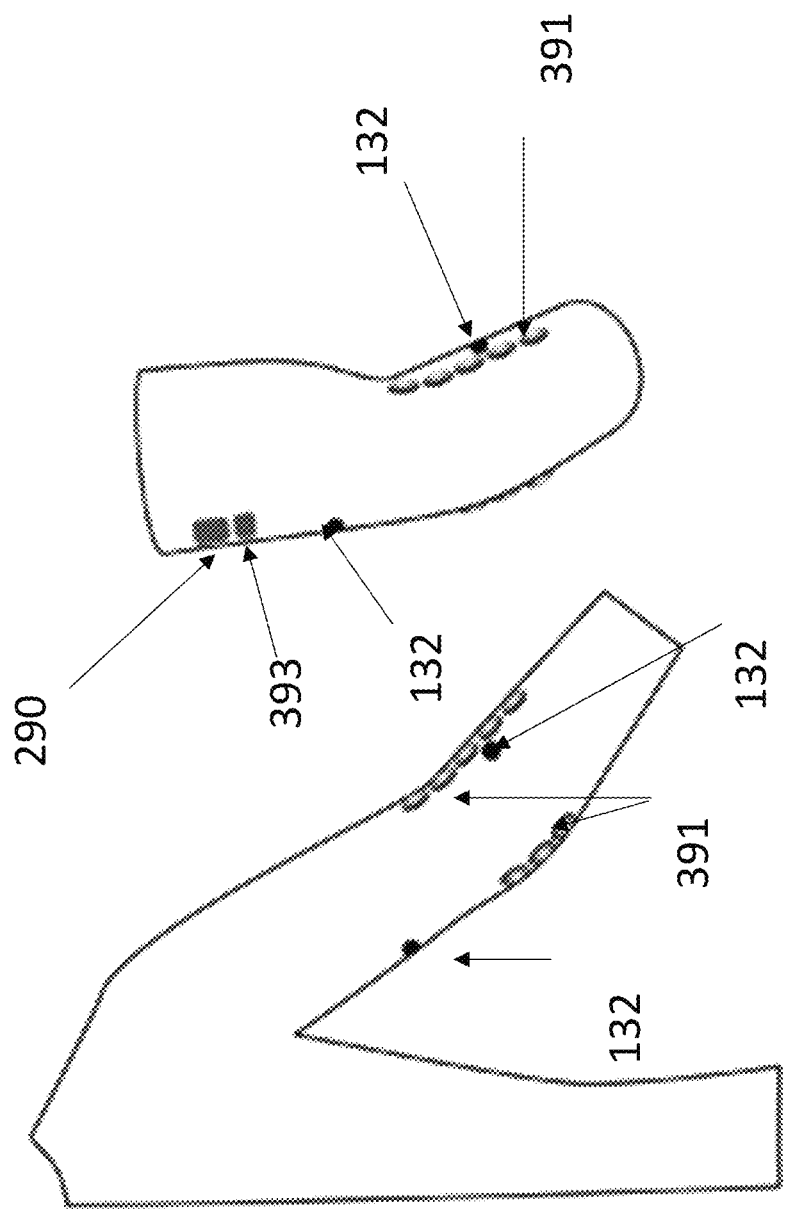
FIG. 47A illustrates a shirt according to one embodiment of the present invention.
FIG. 47B illustrates an armband according to one embodiment of the present invention.

FIG. 47 illustrates a clothing embodiment of the present invention. In one embodiment, the smart footwear system of the present invention is embedded in a shirt. The shirt includes at least one vibration motor 132 and at least one pressure sensor 391. FIG. 47B illustrates an armband embodiment of the present invention. The armband includes at least one pressure sensor 391, at least one battery 290, at least one vibration motor 132, and a printed circuit board chip 393.

In another embodiment, the present invention is operable for military applications. The present invention is operable to determine which way people are facing. The smart footwear system preferably includes an altimeter and an accelerometer. The smart footwear system is configured to use the captured data from the altimeter and accelerometer to determine a person's step count and altitude. This allows for a person to be tracked when they are inside a building. The smart footwear system uses 3D building data as well as entry and exit point data of a building to estimate and track a person while inside a building. The present invention is further operable to determine a person's geolocation without GPS. The present invention captures terrain data and correlates the terrain data with the captured footwear data to determine a person's geolocation. The terrain data includes the slope of a terrain and compass data.

The present invention is further operable for communications. In one embodiment, the smart footwear system is operable for communicating messages to and between soldiers in high stress, loud noise, and extreme physical exertion environments. In one embodiment, the smart footwear system includes a haptic motor on a user's upper torso, back, and/or shoulder. For example, and not limitation, the smart footwear system activates each vibration motor in a circular pattern when the smart footwear article has successfully connected to a remote device (e.g., PC). In yet another embodiment, the smart footwear article includes four vibration motors placed in a square configuration under a user's feet. The smart footwear system is configured to use telemetry data (i.e., step counts, foot facing compass direction and an altimeter from at least one remote device) with terrain slope and surface data to estimate a user's location. The smart footwear system also varies the vibration pulse width to communicate range data. The smart footwear system further varies the vibration duration to indicate threat levels. For example, and not limitation, a strong and fast pulse indicates a high and immediate threat. In another embodiment, the threat sensing and notification system of the present invention is used in a virtual reality environment. The smart footwear system is configured to activate a vibration motor in the direction of a threat. Stronger and faster pulses indicate that the threat is close to the user's virtual character.

The smart footwear system is further operable for emergency and medical applications. In one embodiment, the smart footwear system is configured to activate the left foot haptic motors when a person has a systolic blood pressure of less than 80. The system is further configured to activate all motors when a person's systolic pressure is between 80-90. The smart footwear system activates the right foot haptic motors when a person has a systolic blood pressure over 90. In another embodiment, the smart footwear system is configured to provide a user's exact systolic pressure by vibrating the left foot haptic motors to indicate the tens' place and vibrating the right foot haptic motors to indicate the ones' place.

In yet another embodiment, the smart footwear system is used to improve navigation. In one embodiment, the smart footwear system is operable for integration with mobile GPS through at least one remote device to provide directional navigation using haptic feedback. The smart footwear system includes compass data that is correlated with the direction of a user's feet to determine which direction a user is facing.

In yet another embodiment, the present invention is directed to a software programmable feedback loop method for vibration motor and sensor embedded smart footwear apparatus. This embodiment includes a machine learning feedback loop. The smart footwear captures sensor measurements from a users' feet, processes the data with machine learning algorithms and sends activation commands to the to the haptic vibration motors, wherein the haptic vibration motors are embedded in specific places to stimulate specific responses. This allows for a continuous and personalized optimization. The various vibration motors are used to treatment physical ailments that affect a user's feet. By varying the vibration motor activation strength, time and duration, the present system is configured to stimulate blood flow and alleviate pain. The smart footwear system is further operable to massage a user's feet (e.g. plantar facia muscle).

In one embodiment, the smart footwear system includes a mobile application for analyzing a user while wearing a smart footwear article. The smart footwear system collects data, including, but not limited to, force data, pressure data, time data, and/or motion data. The smart footwear system is further operable as a tracking system. The system is operable to enable a user to search for their shoes/insoles when they cannot locate their shoes. The smart footwear system is configured to send a signal to the smart footwear to determine the smart footwear's location. Then, the smart footwear system is configured to send an alert or message to a user interface, wherein the alert or message indicates the location of the smart footwear. The smart footwear system uses the last recorded location of the smart footwear article and track the smart footwear article as it connects to various network connections. The smart footwear system is also operable to emit a sound from a speaker embedded in the smart footwear article in response to user input on a user interface via at least one remote device.

Location data is created in the present invention using one or more hardware and/or software components. By way of example and not limitation, location data is created using the Global Positioning System (GPS), low energy Bluetooth based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network (e.g., the at least one remote device). A wireless router is also operable to determine identities of devices connected to the wireless network through the router, and thus is operable to determine the locations of these devices through their presence in the connection range of the wireless router.

Figure 48:
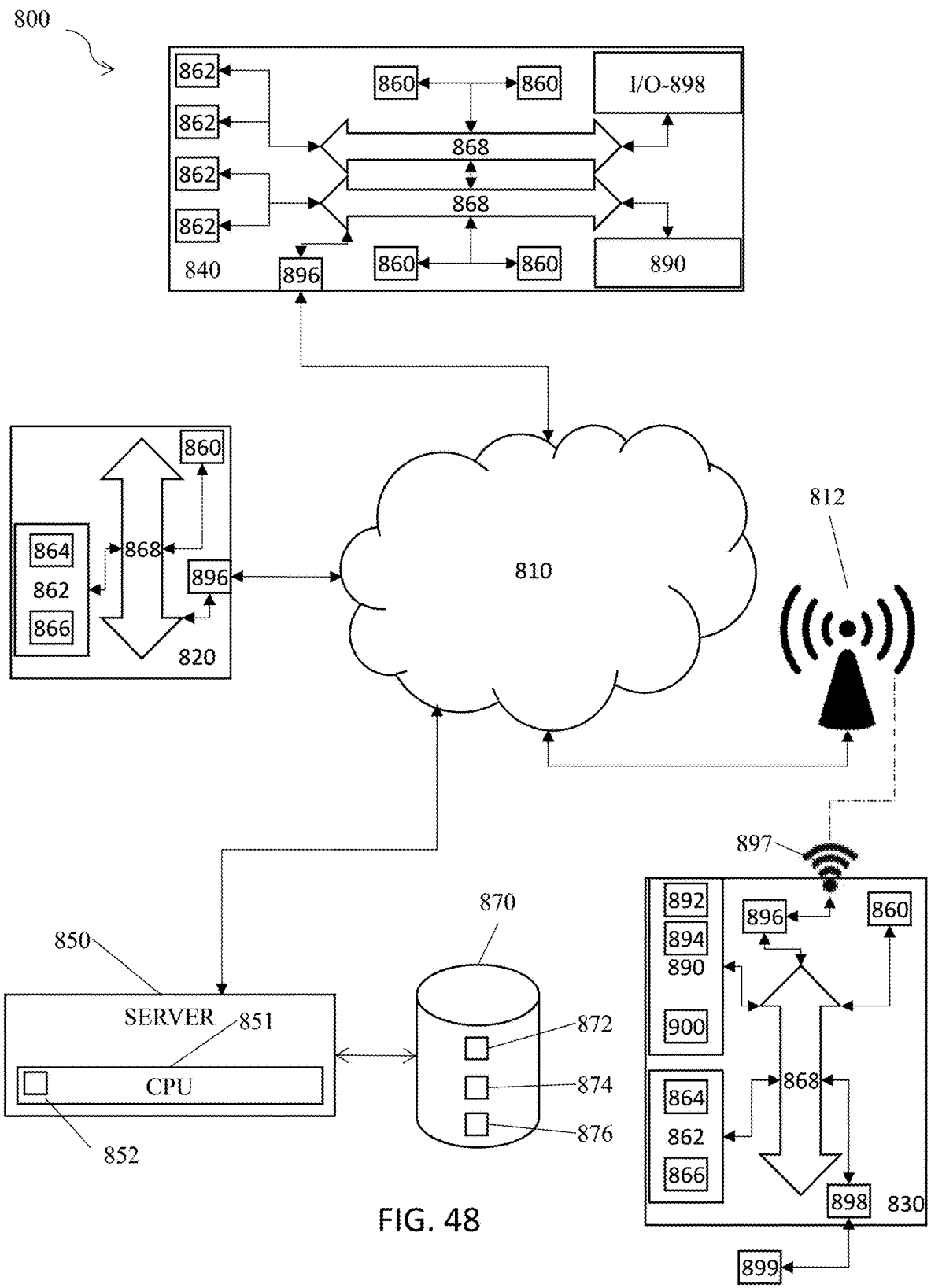
FIG. 48 is a schematic diagram of an embodiment of the invention illustrating a computer system.

FIG. 48 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random-access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 30, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 30, is operable to include other components that are not explicitly shown in FIG. 30, or is operable to utilize an architecture completely different than that shown in FIG. 30. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A smart footwear system comprising:
    at least one smart footwear article; and
    at least one remote device including a software application;
    wherein the at least one smart footwear article includes a top layer, a bottom layer, an electronics housing including a printed circuit board (PCB) and at least one battery, a plurality of sensors, at least one vibration motor, and an electronic circuit;
    wherein the bottom layer includes a plurality of cavities for the electronics housing, the plurality of sensors, and the at least one vibration motor;
    wherein the PCB includes at least one processor, at least one memory, and at least one transceiver, wherein the at least one processor is configured to execute at least one program stored in the at least one memory;
    wherein the PCB is in electrical communication with the at least one battery, the plurality of sensors, and the at least one vibration motor via the electronic circuit;
    wherein the plurality of sensors includes at least one force sensor;
    wherein each sensor of the plurality of sensors is operable to capture sensor data;
    wherein the sensor data includes a magnitude, a duration, and at least one direction of at least one applied force to the at least one smart footwear article;
    wherein the at least one smart footwear article and the at least one remote device are operable to communicate via two-way communication in real-time or near real-time via the at least one transceiver;
    wherein the at least one smart footwear article is operable to transmit the sensor data to the at least one remote device via the at least one transceiver;
    wherein the software application is configured to analyze the sensor data using at least one algorithm;
    wherein the at least one smart footwear article is further configured to detect at least one position change based on the analyzed sensor data; and
    wherein the at least one position change includes moving from a sitting position to a standing position.

2. The smart footwear system of claim 1, wherein the plurality of sensors further includes a motion sensor, an accelerometer, a pressure sensor, a strain gauge, a gyroscope, a geolocation sensor, and/or a temperature sensor.

3. The smart footwear system of claim 1, wherein the at least one force sensor includes a first force sensor constructed to be positioned under a first phalange of a foot; a second force sensor constructed to be positioned underneath a second phalange, a third phalange, and a fourth phalange of the foot; a third force sensor constructed to be positioned under a first metatarsal; a fourth force sensor constructed to be positioned underneath a second metatarsal, a third metatarsal, and a fourth metatarsal; a fifth force sensor constructed to be positioned under a fifth metatarsal; a sixth force sensor constructed to be positioned under an arch of the foot; a seventh force sensor constructed to be positioned under a lateral column of the foot; and an eighth force sensor under a calcaneus of the foot.

4. The smart footwear system of claim 1, wherein the at least one vibration motor includes a first vibration motor constructed to be positioned under a lateral plantar nerve and a second vibration motor constructed to be positioned under a medial plantar nerve.

5. The smart footwear system of claim 1, wherein the at least one smart footwear article further includes a piezoelectric buzzer, and wherein the piezoelectric buzzer is operable to provide audio feedback corresponding to the at least one direction and the magnitude of the at least one applied force to the at least one smart footwear article.

6. The smart footwear system of claim 1, wherein the plurality of sensors includes at least one blood flow measurement sensor to measure blood flow in a wearer's foot, wherein the at least one smart footwear article is operable to transmit blood flow data to the at least one remote device, wherein the at least one remote device is operable to determine that a blood flow in the wearer's foot is below a threshold based on the blood flow data, and wherein the at least one remote device is operable to send an activation signal to one or more of the least one vibration motor to stimulate blood flow in the wearer's foot.

7. The smart footwear system of claim 1, wherein the at least one smart footwear article includes at least one magnet and at least two wireless charging receiver coils, wherein the at least two wireless charging receiver coils include a first receiver coil and a second receiver coil, wherein the first receiver coil is positioned on a top of the electronics housing, wherein the second receiver coil is positioned on a bottom of the electronics housing, wherein the smart footwear system includes a modular wireless charging system, wherein the modular wireless charging system includes a power transmitting unit embedded with at least one corresponding magnet, wherein the wireless modular charging system is operable to attach to the at least one smart footwear article via magnetic attraction between the at least one magnet and the at least one corresponding magnet, and wherein the wireless modular charging system is operable to provide power to the at least one smart footwear article via the first wireless charging receiver coil and/or the second wireless charging receiver coil, and wherein the at least one battery is configured to store the power transferred from the power transmitting unit to the at least one smart footwear article.

8. The smart footwear system of claim 1, wherein the at least one smart footwear article is an insole, and wherein the insole is insertable and removable from a sandal and/or a shoe.

9. The smart footwear system of claim 1, wherein the smart footwear system is operable to analyze a weight distribution of a wearer during a predefined movement, wherein the at least one remote device is operable to analyze the sensor data to determine if the weight distribution differs from a predefined threshold, and wherein the at least one remote device is operable to send an activation signal to one or more of the at least one vibration motor to indicate a direction for the wearer to shift the weight distribution during the predefined movement.

10. The smart footwear system of claim 1, wherein the at least one remote device is operable to send an activation signal to the at least one vibration motor to indicate a direction of a threat, and wherein the at least one remote device is operable to increase or decrease a vibration pulse width and a vibration duration to correspond to a proximity and/or a magnitude of the threat.

11. The smart footwear system of claim 1, wherein the at least one remote device includes a graphical user interface (GUI), and wherein the at least one remote device is operable to change configuration settings of the at least one smart footwear article based on inputs received via the GUI, and wherein the configuration settings include a sensitivity, a locomotion speed, and/or an acceleration profile.

12. The smart footwear system of claim 1, wherein the at least one remote device is operable to send an activation signal to one or more of the at least one vibration motor to indicate an orientation outside of a preset threshold.

13. A smart footwear system comprising:
at least one smart footwear article;
at least one remote device including a software application; and
at least one remote server;
wherein the at least one smart footwear article includes a top layer, a bottom layer, an electronics housing including a printed circuit board (PCB) and at least one battery, a plurality of sensors, at least one vibration motor, and an electronic circuit;
wherein the bottom layer includes a plurality of cavities for the electronics housing, the plurality of sensors, and the at least one vibration motor;
wherein the PCB includes at least one processor, at least one memory, and at least one transceiver, wherein the at least one processor is configured to execute at least one program stored in the at least one memory;
wherein the PCB is in electrical communication with the at least one battery, the plurality of sensors, and the at least one vibration motor via the electronic circuit;
wherein the plurality of sensors includes at least one force sensor;
wherein the plurality of sensors is operable to generate sensor data;
wherein the sensor data includes a magnitude, a duration, and at least one direction of at least one applied force to the at least one smart footwear article;
wherein the at least one smart footwear article and the at least one remote device are operable to communicate via two-way communication in real-time or near real-time via the at least one transceiver;
wherein the at least one remote device and the at least one remote server are operable to communicate via two-way communication in real-time or near real-time;
wherein the at least one smart footwear article is operable to transmit the sensor data to the at least one remote device and/or the at least one remote server;
wherein the software application is configured to analyze the sensor data using at least one algorithm;
wherein the at least one smart footwear article is further configured to detect at least one position change based on the analyzed sensor data; and
wherein the at least one position change includes moving from a sitting position to a standing position.

14. The smart footwear system of claim 13, wherein the at least one vibration motor includes a linear resonant actuator, wherein the at least one remote server includes an auto resonance engine, wherein the auto resonance engine is operable to determine a resonant frequency and amplitude of the at least one vibration motor, wherein the at least one remote server is operable to send an alert or a message to the at least one remote device when a vibration amplitude is outside of a predetermined threshold, and wherein the at least one remote device is configured to increase or decrease the vibration amplitude of the at least one vibration motor based on the determination.

15. The smart footwear system of claim 13, wherein the at least one remote server includes map data, road data, blueprint data for a building, terrain data, and/or slope data, and wherein the smart footwear system is operable to track the at least one smart footwear article using the map data, the road data, the blueprint data for the building, the terrain data, and/or the slope data.

16. A smart footwear system comprising:
at least one smart footwear article;
at least one remote device including a software application; and
at least one remote server;
wherein the at least one smart footwear article includes a top layer, a bottom layer, an electronics housing including a printed circuit board (PCB) and at least one battery, a plurality of sensors, at least one vibration motor, and an electronic circuit;
wherein the bottom layer includes a plurality of cavities for the electronics housing, the plurality of sensors, and the at least one vibration motor;
wherein the PCB includes at least one processor, at least one memory, and at least one transceiver, wherein the at least one processor is configured to execute at least one program stored in the at least one memory;
wherein the PCB is in electrical communication with the at least one battery, the plurality of sensors, and the at least one vibration motor via the electronic circuit;
wherein the plurality of sensors includes at least one force sensor;
wherein the plurality of sensors is operable to generate sensor data;
wherein the sensor data includes a magnitude, a duration, and at least one direction of at least one applied force to the at least one smart footwear article;
wherein the at least one smart footwear article and the at least one remote device are operable to communicate via two-way communication in real-time or near real-time via the at least one transceiver;

wherein the at least one remote device and the at least one remote server are operable to communicate via two-way communication in real-time or near real-time;

wherein the at least one smart footwear article is operable to transmit the sensor data to the at least one remote device and/or the at least one remote server;

wherein the at least one force sensor includes a first force sensor constructed to be positioned under a first phalange of a foot; a second force sensor constructed to be positioned underneath a second phalange, a third phalange, and a fourth phalange of the foot; a third force sensor constructed to be positioned under a first metatarsal; a fourth force sensor constructed to be positioned underneath a second metatarsal, a third metatarsal, and a fourth metatarsal; a fifth force sensor constructed to be positioned under a fifth metatarsal; a sixth force sensor constructed to be positioned under an arch of the foot; a seventh force sensor constructed to be positioned under a lateral column of the foot; and an eighth force sensor under a calcaneus of the foot;

wherein the at least one vibration motor includes a first vibration motor constructed to be positioned under a lateral plantar nerve and a second vibration motor constructed to be positioned under a medial plantar nerve;

wherein the software application is configured to analyze the sensor data using at least one algorithm;

wherein the at least one smart footwear article is further configured to detect at least one position change based on the analyzed sensor data; and wherein the at least one position change includes moving from a sitting position to a standing position.

17. The smart footwear system of claim 7, wherein the at least one smart footwear article is further operable to be inserted into a shoe, wherein the at least one smart footwear article is configured to charge via the modular wireless charging system while inserted into the shoe.

18. The smart footwear system of claim 17, wherein the at least one smart footwear article is further operable to charge via the first receiver coil when inserted into the shoe.

19. The smart footwear system of claim 7, wherein the at least one magnet includes at least two magnets, and wherein the at least two magnets are positioned in a heel portion of the bottom layer of the at least one smart footwear article.

20. The smart footwear system of claim 7, wherein the at least one magnet includes at least two magnets, wherein the at least two magnets include a first magnet and a second magnet, wherein the first magnet is positioned a first distance from a first side of the at least one smart footwear article, wherein the second magnet is positioned a second distance from a second side of the at least one smart footwear article, wherein the first side and the second side are opposite sides of the at least one smart footwear article, wherein the first distance and the second distance are equivalent.

* * * * *